US007827078B2

(12) United States Patent
King et al.

(10) Patent No.: US 7,827,078 B2
(45) Date of Patent: Nov. 2, 2010

(54) METHOD AND SYSTEM FOR MANAGING COMMODITY TRANSACTIONS

(75) Inventors: N. Richard King, Springfield, IL (US); Robert Leach, Springfield, IL (US); Matthew Barham, Virden, IL (US)

(73) Assignee: King Technology, Inc., Springfield, IL (US)

( * ) Notice: Subject to any disclaimer, the term of this patent is extended or adjusted under 35 U.S.C. 154(b) by 1080 days.

(21) Appl. No.: 11/138,232

(22) Filed: May 26, 2005

(65) Prior Publication Data

US 2007/0016459 A1    Jan. 18, 2007

Related U.S. Application Data

(60) Provisional application No. 60/588,019, filed on Jul. 14, 2004, provisional application No. 60/574,917, filed on May 27, 2004.

(51) Int. Cl.
*G06Q 10/00* (2006.01)

(52) U.S. Cl. .............................. 705/28; 705/9; 705/10; 705/26; 705/37; 705/40

(58) Field of Classification Search .................. 705/28
See application file for complete search history.

(56) References Cited

U.S. PATENT DOCUMENTS

| 5,063,507 A | 11/1991 | Lindsey et al. |
| 5,285,383 A | 2/1994 | Lindsey et al. |
| 2003/0149609 A1* | 8/2003 | Kasahara .................. 705/9 |
| 2006/0206423 A1 | 9/2006 | Sternard et al. |

OTHER PUBLICATIONS

Schwartz, Karen. Managing Technology: Streamlining links in the supply chain. Government Executive, p. NA, Mar. 1, 2001.*

* cited by examiner

*Primary Examiner*—F. Zeender
*Assistant Examiner*—Fawaad Haider
(74) *Attorney, Agent, or Firm*—Polsinell Shughart PC

(57) ABSTRACT

The present invention relates to a web based system for handling commodity transactions. The system is an electronic system, and allows for the central filing, storage, issuance, maintenance, cancellation and other actions associated with electronic warehouse receipts, electronic price later credit sales contracts and electronic reports, including status and position reports.

12 Claims, 60 Drawing Sheets

TABLE: COMPANY

| FIELD | DEFINITION |
|---|---|
| ACCOUNT_NUMBER | ACCOUNT NO. FOR THE COMPAMY IN THE SYSTEM |
| ADDRESS | ADDRESS OF COMPANY |
| CCCCODES | CODING CREDIT CORP CODES |
| CITY | CITY OF COMPANY |
| COMPANY_TYPE | TYPE OF COMPANY |
| COMPANY_TYPE_NAME | NAME OF COMPANY |
| COUNTY | COUNTY OF COMPANY |
| FAX | FAX NO. OF COMPANY |
| GRAIN_DEALER_LICENSES | DOES COMPANY HAVE GRAIN DEALER LICENSES (YES/NO) |
| HAS_FEDERAL_LICENSE | DOES COMPANY HAVE A FEDERAL LICENSE (YES/NO) |
| HAS_STATE_LICENSE | DOES COMPANY HAVE A STATE LICENSE (YES/NO) |
| MEMO | SPACE FOR NOTES TO BE ENTERED |
| NAME | NAME OF COMPANY |
| PHONE | TELEPHONE NO. OF COMPANY |
| PL_STATUS | WAREHOUSE LICENSE NUMBERS (SUSPENDED/VOIDED/CANCELLED/OPEN) |
| REG_DATE | DATE REGISTERED IN SYSTEM |
| REG_ID_NO | REGISTRATION IDENTIFICATION NO. OF COMPANY |
| RID | SEQENTIAL ROW INDENTIFIER |
| STATE | STATE OF COMPANY |
| STATUS | STATUS OF COMPANY IN SYSTEM (PENDING/APPROVED/SUSPENDED) |
| TOTAL_CAPACITY | TOTAL STORAGE CAPACITY |
| WAREHOUSE_LICENSES | NOS. OF LICENCES |
| ZIPCODE | ZIP CODE OF COMPANY |

FIG.3

TABLE: PRODUCER

| FIELD | DEFINITION |
|---|---|
| ACCOUNT_NUMBER | ACCOUNT NO. OF PRODUCER IN THE SYSTEM |
| ADDRESS | ADDRESS OF PRODUCER |
| CITY | CITY OF PRODUCER |
| COUNTY | COUNTY OF PRODUCER |
| FAX | FAX NO. OF PRODUCER |
| NAME | NAME OF PRODUCER |
| PHONE | TELEPHONE NO. OF PRODUCER |
| PL_STATUS | STATUS OF PRICE LATER CONTRACTS (SUSPENDED/VOIDED/CANCELLED/OPEN) |
| REG_ID_NO | REGISTRATION IDENTIFICATION NO. OF PRODUCER |
| RID | SEQUENTIAL ROW IDENTIFIER |
| STATE | STATE OF PRODUCER |
| STATUS | STATUS IN EWR APPLICATION (PENDING/APPROVED/SUSPENDED) |
| ZIPCODE | ZIP CODE OF PRODUCER |

FIG.4

TABLE : LOCATION

| FIELD | DEFINITION |
|---|---|
| ADDRESS | ADDRESS OF STORAGE FACILITY |
| CAPACITY | CAPACITY OF STORAGE FACILITY |
| CITY | CITY OF STORAGE FACILITY |
| COMPANY_RID | SEQUENTIAL ROW IDENTIFIER AS PER COMPANY TABLE (FIG.3) |
| COUNTY | COUNTY OF STORAGE FACILITY |
| FAX | FAX NO. OF STORAGE FACILITY |
| INACTIVE | IS STORAGE FACILITY INACTIVE (YES/NO) |
| MEMO | SPACE FOR NOTES TO BE ENTERED |
| NAME | NAME OF STORAGE FACILITY |
| PHONE | TELEPHONE NO. OF STORAGE FACILITY |
| RID | SEQUENTIAL ROW IDENTIFIER |
| STATE | STATE OF STORAGE FACILITY |
| ZIP CODE | ZIP CODE OF STORAGE FACILITY |

FIG.5

TABLE: PRICE LATER (CREDIT SALE) CONTRACTS

| FIELD | DEFINITION |
|---|---|
| ACCEPT_BY_USER_NAME | NAME OF USER ACCEPTING CONTRACT |
| ACCEPT_BY_USER_RID | SEQUENTIAL ROW IDENTIFIER OF USER ACCEPTING CONTRACT |
| ACCEPT_DATE | DATE OF ACCEPTANCE |
| ADVANCES | ADVANCES ON CONTRACT |
| BEGINING_BUSHELS | BEGINNING NUMBER OF BUSHELS ON CONTRACT |
| CLOSE_BY_USER_NAME | USER WHO CLOSED THE CONTRACT |
| CLOSE_BY_USER_RID | SEQUENTIAL ROW IDENTIFIER OF USER WHO CLOSED CONTRACT |
| CLOSE_DATE | CLOSING DATE FOR THE CONTRACT |
| COMPANY_NAME | NAME OF THE COMPANY MAKING THE CONTRACT |
| COMPANY_RID | SEQUENTIAL ROW IDENTIFIER OF COMPANY MAKING THE CONTRACT |
| CONTRACT_CONTROL_NUMBER | CONTRACT CONTROL NUMBER |
| CONTRACT_TYPE | TYPE OF CONTRACT (STANDARD/BASIS) |
| COVERED_BUSHELS | BUSHELS COVERED BY CONTRACT |
| COVERED_DATE | DATES COVERED BY THE PRICE LATER CONTRACT |
| COVERED_GRAIN_TYPE | TYPE OF GRAIN COVERED BY THE CONTRACT |
| COVERED_PL_CONTRACT_NO | NUMBER OF PRICE LATER CONTRACT |
| DELIVERED_BEGIN_DATE | DATE DELIVERY OF GRAIN BEGINS |
| DELIVERED_END_DATE | DATE DELIVERY OF GRAIN ENDS |
| GRAIN_ACCT_CONTROL_NUMBER | GRAIN ACCOUNTING SOFTWARE CONTROL NO. |
| GRAIN_CLASS | CLASS OF GRAIN COVERED UNDER THE CONTRACT |
| GRAIN_DEALER_LICENSE_NUMBER | LICENSE NUMBER OF GRAIN DEALER IN THE CONTRACT |
| GRAIN_GRADE | GRADE OF THE GRAIN COVERED UNDER THE CONTRACT |
| GRAIN_TYPE | TYPE OF GRAIN COVERED BY THE CONTRACT |
| ISSUED_DATE | DATE THE CONTRACT WAS ISSUED |
| ISSUER_USER_NAME | NAME OF ISSUER OF CONTRACT |
| ISSUER_USER_RID | SEQUENTIAL ROW IDENTIFIER OF ISSUER OF CONTRACT |

FIG.6A

| Field | Description |
|---|---|
| LOCATION_NAME | NAME OF LOCATION WHERE GRAIN COVERED BY CONTRACT IS STORED |
| LOCATION_RID | SEQUENTIAL ROW IDENTIFIER FOR LOCATION WHERE GRAIN IS STORED |
| MAX_EST_BUSHELS | MAXIMUM ESTIMATED BUSHELS |
| OTHER_TERMS | OTHER TERMS OF THE CONTRACT |
| PL_BASIS_FUTURE_MONTH | CONTRACT BASIS FOR A FUTURE MONTH |
| PL_BASIS_STARTING_DATE | BASIS CONTRACT STARTING DATE |
| PL_STANDARD_STARTING_DATE | STANDARD CONTRACT STARTING DATE |
| PL_STARTING_BASIS | STARTING BASIS FOR THE CONTRACT |
| PRE_DELIVERY_BEGIN_DATE | PREDELIVERY BEGIN DATE |
| PRE_DELIVERY_END_DATE | PREDELIVERY END DATE |
| PRODUCER_ACCOUNT_NUMBER | ACCOUNT NUMBER IN THE SYSTEM FOR THE GRAIN PRODUCER |
| PRODUCER_NAME | NAME OF GRAIN PRODUCER |
| PRODUCER_RID | SEQUENTIAL ROW IDENTIFIER FOR THE GRAIN PRODUCER |
| PRODUCER_SIGNED_DATE | DATE GRAIN PRODUCER SIGNED CONTRACT |
| RECORD_SIGN_DATE | DATE SIGNED |
| RECORD_SIGN_USER_NAME | USER NAME WHO SIGNED |
| RECORD_SIGN_USER_RID | SEQUENTIAL ROW IDENTIFIER OF USER WHO SIGNED |
| REJECT_BY_USER_NAME | NAME OF USER REJECTING THE CONTRACT |
| REJECT_BY_USER_RID | SEQUENTIAL ROW IDENTIFIER OF USER REJECTING THE CONTRACT |
| REJECT_DATE | DATE CONTRACT WAS REJECTED |
| REMAINING_BUSHELS | REMAINING BUSHELS IN CONTRACT |
| RID | SEQUENTIAL ROW IDENTIFIER |
| SERVICE_CHARGE | SERVICE CHARGE WITH CONTRACT (AMOUNT) |
| SIGNED_BY_PRODUCER_USER_NAME | NAME OF PRODUCER WHO SIGNED THE CONTRACT |
| SIGNED_BY_PRODUCER_USER_RID | SEQUENTIAL ROW IDENTIFIER OF PRODUCER WHO SIGNED THE CONTRACT |
| SOURCE_DOCUMENT_REFERENCE_NUMBER | REFERENCE NUMBER OF SOURCE DOCUMENT |
| VOID_BY_USER_NAME | USER WHO VOIDED THE CONTRACT |
| VOID_BY_USER_RID | SEQUENTIAL ROW IDENTIFIER OF USER WHO VOIDED THE CONTRACT |
| VOID_DATE | DATE CONTRACT WAS VOIDED |

FIG.6B

TABLE: ELECTRONIC WAREHOUSE RECEIPTS (EWR)

| FIELD | DEFINITION |
|---|---|
| ALFLATOXIN | QUALITY FACTOR - ALFLATOXIN |
| CANCELLED_DT | DATE EWR WAS CANCELLED |
| CAR_NO | RAIL CAR NO. THAT CONTAINS GRAIN OF EWR |
| COLLATERAL | COLLATERAL FOR THIS EWR |
| COMMENT | COMMENTS TO BE ENTERED INTO EWR |
| CONTAINER | CONTAINER HOLDING GRAIN FOR THIS EWR |
| CONVERTED_DT | DATE THE RECEIPT WAS CONVERTED FROM PAPER |
| CROP_YEAR | YEAR OF CROP COVERED BY THIS EWR |
| DELIVERY_WH_CITY | CITY OF DELIVERY WAREHOUSE |
| DELIVERY_WH_COUNTY | COUNTY OF DELIVERY WAREHOUSE |
| DELIVERY_WH_STATE | STATE OF DELIVERY WAREHOUSE |
| DOCKAGE_LBS | DOCKAGE (IN POUNDS) |
| DOCKAGE_PCT | DOCKAGE PERCENTAGE |
| EWR_NO | NUMBER OF EWR |
| EWR_PREFIX | PREFIX OF THE LICENSING AUTHORITY |
| FARM_CNTY_CODE | COUNTY CODE OF FARM |
| FARM_ST_CODE | STATE CODE OF FARM |
| FM_PCT | QUALITY FACTOR - FOREIGN MATERIAL PERCENTAGE |

FIG.7A

| | |
|---|---|
| FOR_CBOT_DELIVERY | FOR DELIVERY TO CHICAGO BOARD OF TRADE (YES/NO) |
| FSA_FARM_NO | FSA FARM NUMBER |
| GRADE_STATEMENT | STATEMENT FOR GRADE OF GRAIN |
| GRAIN_CLASS | CLASS OF GRAIN FOR EWR |
| GRAIN_GRADE | GRADE OF GRAIN FOR EWR |
| GRAIN_SUBCLASS | SUBCLASS OF GRAIN FOR EWR |
| GRAIN_TYPE | TYPE OF GRAIN FOR EWR |
| GRAIN_VARIETY | VARIETY OF GRAIN FOR EWR |
| GROSS_BU | GROSS BUSHELS OF GRAIN FOR EWR |
| GROSS_LBS | GROSS POUNDS OF GRAIN FOR EWR |
| HEAT_DMG_PCT | QUALITY FACTOR – PERCENTAGE OF HEAT DAMAGE TO GRAIN OF EWR |
| HOLDER_CITY | CITY OF HOLDER OF EWR |
| HOLDER_COMPANY_NAME | NAME OF HOLDER OF EWR |
| HOLDER_COMPANY_RID | SEQUENTIAL ROW IDENTIFIER HOLDER OF EWR |
| HOLDER_DT | DATE HOLDER BECAME HOLDER OF EWR |
| HOLDER_LOCATION_NAME | NAME OF HOLDER'S STORAGE FACILITY |
| HOLDER_LOCATION_RID | SEQUENTIAL ROW IDENTIFIER OF HOLDER'S STORAGE FACILITY |
| HOLDER_STATE | STATE OF HOLDER |
| INSPECT_CERT_NO | INSPECTION CERTIFICATE NUMBER |
| INSURED | IS HOLDER'S LOCATION INSURED (YES/NO) |
| ISSUED_DT | DATE EWR WAS ISSUED |
| ISSUER_COMPANY_NAME | NAME OF COMPANY ISSUING EWR |
| ISSUER_COMPANY_RID | SEQUENTIAL ROW IDENTIFIER OF COMPANY ISSUING EWR |

FIG. 7B

| Field | Description |
|---|---|
| ISSUER_LOCATION_NAME | NAME OF LOCATION ASSOCIATED WITH ISSUED EWR |
| ISSUER_LOCATION_RID | SEQUENTIAL ROW IDENTIFIER OF LOCATION ASSOCIATED WITH ISSUED EWR |
| ISSUER_USER_NAME | NAME OF ISSUER |
| ISSUER_USER_RID | SEQUENTIAL ROW IDENTIFIER OF ISSUER |
| LEGAL_STMT | LEGAL STATEMENT |
| LOADOUT_CHRG_AMT | AMOUNT OF LOADOUT CHARGES |
| LOADOUT_CHRG_PAID | LOADOUT CHARGES PAID (YES/NO) |
| LOT_NO | LOT NUMBER OF GRAIN OF EWR |
| MOIST_PCT | QUALITY FACTOR – MOISTURE PERCENTAGE OF GRAIN OF EWR |
| NEGOTIABLE | NEGOTIABLE RECEIPT (YES/NO) |
| NET_BU | NET BUSHELS OF GRAIN |
| NET_LBS | NET POUNDS OF GRAIN |
| NONNEG_BALANCE | BALANCE OF GRAIN REMAINING ON EWR |
| OTHER_QF_PCT | QUALITY FACTOR – OTHER QUALITY FACTOR (PERCENTAGE THEREOF) |
| OTHER_SPECIAL_QUAL | OTHER SPECIAL QUALITY OF GRAIN |
| PAPER_NO | PAPER NO. OF THE PAPER RECEIPT THAT IS REPLACING EWR |
| PREPAID_STOR_CHRG_AMT | AMOUNT OF PREPAID STORAGE CHARGES FOR GRAIN OF EWR |
| PREV_HOLDER_COMPANY_NAME | NAME OF COMPANY OF PREVIOUS HOLDER OF THE EWR |
| PREV_HOLDER_COMPANY_RID | SEQUENTIAL ROW IDENTIFIER OF PREVIOUS COMPANY HOLDER OF THE EWR |
| PREV_HOLDER_LOCATION_NAME | LOCATION NAME ASSOCIATED WITH PREVIOUS HOLDER OF EWR |
| PREV_HOLDER_LOCATION_RID | SEQUENTIAL ROW IDENTIFIER OF PREVIOUS COMPANY HOLDER OF EWR |
| PRODUCER_NAME | NAME OF GRAIN PRODUCER ASSOCIATED WITH EWR |
| PROTEIN_PCT | QUALITY FACTOR – PROTEIN PERCENTAGE OF GRAIN OF EWR |

FIG. 7C

| | |
|---|---|
| RCVD_DOCK_PCT | QUALITY FACTOR – DOCKAGE PERCENTAGE OF GRAIN RECEIVED |
| RCVD_GROSS_BU | GROSS AMOUNT OF BUSHELS OF GRAIN RECEIVED |
| RCVD_GROSS_LBS | POUNDS OF GRAIN RECEIVED |
| RCVD_MOIST_PCT | MOISTURE PERCENTAGE OF GRAIN RECEIVED |
| RECEIPT_LAST_MOD_DT | DATE EWR LAST MODIFIED |
| RECEIPT_LAST_MOD_USER_NAME | NAME OF USER WHO MODIFIED EWR |
| RECEIPT_LAST_MODE_RID | SEQUENTIAL ROW IDENTIFIER FOR LAST USER WHO MODIFIED EWR |
| RECEIVED_DT | DATE EWR WAS RECEIVED |
| RECEIVED_FROM | USER EWR WAS RECEIVED FROM |
| RECEIVED_FROM_LOC | NAME OF LOCATION GRAIN RECEIVED FROM |
| RECEIVED_FROM_LOC_RID | SEQUENTIAL ROW IDENTIFIER OF LOCATION GRAIN WAS RECEIVED FROM |
| RECEIVED_FROM_RID | SEQUENTIAL ROW IDENTIFIER OF HOLDER EWR WAS RECEIVED FROM |
| RECEIVED_VIA | WAS GRAIN RECEIVED (TRUCK/BARGE/RAIL CAR) |
| RECEIVING_CHRG_AMT | AMOUNT OF RECEIVING CHARGES |
| RECEIVING_CHRG_PAID | RECEIVING CHARGES PAID (YES/NO) |
| REGISTERED_BOT_DELIVERY | REGISTERED FOR DELIVERY TO BOARD OF TRADE (YES/NO) |
| REMARKS | REMARKS SECTION |
| RID | SEQUENTIAL ROW IDENTIFIER |
| SBK_PCT | QUALITY FACTOR – (SHRUNKEN AND BROKEN PERCENTAGE) |
| STATUS | STATUS OF EWR (OPEN/SUSPENDED/CANCELLED/VOIDED) |
| STORAGE_PD_THRU_DT | DATE GRAIN STORAGE IS PAID THROUGH |
| STORAGE_START_DT | START DATE OF STORAGE |
| STARAGE_TARIFF_RT | TARIFF RATE OF STORAGE |

FIG. 7D

| | |
|---|---|
| SUSPENDED_DT | DATE EWR SUSPENDED |
| TARIFF_CHRG_PER | TARIFF CHARGE FOR UNIT OF GRAIN |
| TEST_WT | QUALITY FACTOR – TEST WEIGHT OF GRAIN |
| TOT_DEFECTS_PCT | QUALITY FACTOR –PERCENTAGE OF TOTAL DEFECTS |
| TOT_DMG_PCT | QUALITY FACTOR –PERCENTAGE OF TOTAL DAMAGE |
| UOM | UNIT OF MEASURE OF GRAIN OF EWR |
| VOIDED_DT | DATE EWR WAS VOIDED |
| VOMITOXIN | QUALITY FACTOR – VOMITOXIN |
| WH_COMPANY_CITY | CITY OF WAREHOUSE COMPANY |
| WH_COMPANY_NAME | NAME OF WAREHOUSE COMPANY |
| WH_COMPANY_RID | SEQUENTIAL ROW IDENTIFIER OF WAREHOUSE COMPANY |
| WH_COMPANY_STATE | STATE OF WAREHOUSE COMPANY |
| WH_LICENSE_NO | LICENSE OF WAREHOUSE COMPANY |
| WH_LOC_CITY | CITY WHERE WAREHOUSE IS LOCATED |
| WH_LOC_NAME | NAME OF WAREHOUSE LOCATION |
| WH_LOC_RID | SEQUENTIAL ROW IDENTIFIER OF WAREHOUSE |
| WH_LOC_STATE | STATE OF LOCATION OF WAREHOUSE |
| WH_NAME | NAME OF WAREHOUSE |
| WH_OPER_IS_DEPOSITER | IS WAREHOUSE OPERATOR THE DEPOSITER (YES/NO) |
| WH_OPER_LIEN_CMNT | WAREHOUSE OPERATOR LIEN COMMENT |
| WH_OPERATOR | WAREHOUSE OPERATOR |

FIG.7E

TABLE: ELECTRONIC WAREHOUSE RECEIPT (EWR) HISTORY

| FIELD | DEFINITION |
|---|---|
| ALFLATOXIN | QUALITY FACTOR – ALFLATOXIN |
| CANCELLED_DT | DATE EWR WAS CANCELLED |
| CAR_NO | RAIL CAR NO. THAT CONTAINS GRAIN OF EWR |
| COLLATERAL | COLLATERAL FOR THIS EWR |
| COMMENT | COMMENTS TO BE ENTERED INTO EWR |
| CONTAINER | CONTAINER HOLDING GRAIN FOR THIS EWR |
| CONVERTED_DT | DATE THE RECEIPT WAS CONVERTED FROM PAPER |
| CROP_YEAR | YEAR OF CROP COVERED BY THIS EWR |
| DELIVERY_WH_CITY | CITY OF DELIVERY WAREHOUSE |
| DELIVERY_WH_COUNTY | COUNTY OF DELIVERY WAREHOUSE |
| DELIVERY_WH_STATE | STATE OF DELIVERY WAREHOUSE |
| DOCKAGE_LBS | DOCKAGE (IN POUNDS) |
| DOCKAGE_PCT | DOCKAGE PERCENTAGE |
| EWR_NO | NUMBER OF EWR |
| EWR_PREFIX | PREFIX OF THE LICENSING AUTHORITY |
| EWR_RID | SEQUENTIAL ROW IDENTIFIER OF EWR |
| FARM_CNTY_CODE | COUNTY CODE OF FARM |
| FARM_ST_CODE | STATE CODE OF FARM |
| FM_PCT | QUALITY FACTOR – FOREIGN MATERIAL PERCENTAGE |

FIG. 8A

| | |
|---|---|
| FOR_CBOT_DELIVERY | FOR DELIVERY TO CHICAGO BOARD OF TRADE (YES/NO) |
| FSA_FARM_NO | FSA FARM NUMBER |
| GRADE_STATEMENT | STATEMENT FOR GRADE OF GRAIN |
| GRAIN_CLASS | CLASS OF GRAIN FOR EWR |
| GRAIN_GRADE | GRADE OF GRAIN FOR EWR |
| GRAIN_SUBCLASS | SUBCLASS OF GRAIN FOR EWR |
| GRAIN_TYPE | TYPE OF GRAIN FOR EWR |
| GRAIN_VARIETY | VARIETY OF GRAIN FOR EWR |
| GROSS_BU | GROSS BUSHELS OF GRAIN FOR EWR |
| GROSS_LBS | GROSS POUNDS OF GRAIN FOR EWR |
| HEAT_DMG_PCT | QUALITY FACTOR - PERCENTAGE OF HEAT DAMAGE TO GRAIN OF EWR |
| HOLDER_CITY | CITY OF HOLDER OF EWR |
| HOLDER_COMPANY_NAME | NAME OF HOLDER OF EWR |
| HOLDER_COMPANY_RID | SEQUENTIAL ROW IDENTIFIER HOLDER OF EWR |
| HOLDER_DT | DATE HOLDER BECAME HOLDER OF EWR |
| HOLDER_LOCATION_NAME | NAME OF HOLDER'S STORAGE FACILITY |
| HOLDER_LOCATION_RID | SEQUENTIAL ROW IDENTIFIER OF HOLDER'S STORAGE FACILITY |
| HOLDER_STATE | STATE OF HOLDER |
| INSPECT_CERT_NO | INSPECTION CERTIFICATE NUMBER |
| INSURED | IS HOLDER'S LOCATION INSURED (YES/NO) |
| ISSUED_DT | DATE EWR WAS ISSUED |
| ISSUER_COMPANY_NAME | NAME OF COMPANY ISSUING EWR |
| ISSUER_COMPANY_RID | SEQUENTIAL ROW IDENTIFIER OF COMPANY ISSUING EWR |

FIG.8B

| | |
|---|---|
| ISSUER_LOCATION_NAME | NAME OF LOCATION ASSOCIATED WITH ISSUED EWR |
| ISSUER_LOCATION_RID | SEQUENTIAL ROW IDENTIFIER OF LOCATION ASSOCIATED WITH ISSUED EWR |
| ISSUER_USER_NAME | NAME OF ISSUER |
| ISSUER_USER_RID | SEQUENTIAL ROW IDENTIFIER OF ISSUER |
| LEGAL_STMT | LEGAL STATEMENT |
| LOADOUT_CHRG_AMT | AMOUNT OF LOADOUT CHARGES |
| LOADOUT_CHRG_PAID | LOADOUT CHARGES PAID (YES/NO) |
| LOT_NO | LOT NUMBER OF GRAIN OF EWR |
| MOIST_PCT | QUALITY FACTOR - MOISTURE PERCENTAGE OF GRAIN OF EWR |
| NEGOTIABLE | NEGOTIABLE RECEIPT (YES/NO) |
| NET_BU | NET BUSHELS OF GRAIN |
| NET_LBS | NET POUNDS OF GRAIN |
| NONNEG_BALANCE | BALANCE OF GRAIN REMAINING ON EWR |
| OTHER_QF_PCT | QUALITY FACTOR - OTHER QUALITY FACTOR (PERCENTAGE THEREOF) |
| OTHER_SPECIAL_QUAL | OTHER SPECIAL QUALITY OF GRAIN |
| PAPER_NO | PAPER NO. OF THE PAPER RECEIPT THAT IS REPLACING EWR |
| PREPAID_STOR_CHRG_AMT | AMOUNT OF PREPAID STORAGE CHARGES FOR GRAIN OF EWR |
| PREV_HOLDER_COMPANY_NAME | NAME OF COMPANY OF PREVIOUS HOLDER OF THE EWR |
| PREV_HOLDER_COMPANY_RID | SEQUENTIAL ROW IDENTIFIER OF PREVIOUS COMPANY HOLDER OF THE EWR |
| PREV_HOLDER_LOCATION_NAME | LOCATION NAME ASSOCIATED WITH PREVIOUS HOLDER OF EWR |
| PREV_HOLDER_LOCATION_RID | SEQUENTIAL ROW IDENTIFIER OF PREVIOUS COMPANY HOLDER OF EWR |
| PRODUCER_NAME | NAME OF GRAIN PRODUCER ASSOCIATED WITH EWR |
| PROTEIN_PCT | QUALITY FACTOR - PROTEIN PERCENTAGE OF GRAIN OF EWR |

FIG.8C

| | |
|---|---|
| RCVD_DOCK_PCT | QUALITY FACTOR - DOCKAGE PERCENTAGE OF GRAIN RECEIVED |
| RCVD_GROSS_BU | GROSS AMOUNT OF BUSHELS OF GRAIN RECEIVED |
| RCVD_GROSS_LBS | POUNDS OF GRAIN RECEIVED |
| RCVD_MOIST_PCT | MOISTURE PERCENTAGE OF GRAIN RECEIVED |
| RECEIPT_LAST_MOD_DT | DATE EWR LAST MODIFIED |
| RECEIPT_LAST_MOD_USER_NAME | NAME OF USER WHO MODIFIED EWR |
| RECEIPT_LAST_MODE_RID | SEQUENTIAL ROW IDENTIFIER FOR LAST USER WHO MODIFIED EWR |
| RECEIVED_DT | DATE EWR WAS RECEIVED |
| RECEIVED_FROM | USER EWR WAS RECEIVED FROM |
| RECEIVED_FROM_LOC | NAME OF LOCATION GRAIN RECEIVED FROM |
| RECEIVED_FROM_LOC_RID | SEQUENTIAL ROW IDENTIFIER OF LOCATION GRAIN WAS RECEIVED FROM |
| RECEIVED_FROM_RID | SEQUENTIAL ROW IDENTIFIER OF HOLDER EWR WAS RECEIVED FROM |
| RECEIVED_VIA | WAS GRAIN RECEIVED (TRUCK/BARGE/RAIL CAR) |
| RECEIVING_CHRG_AMT | AMOUNT OF RECEIVING CHARGES |
| RECEIVING_CHRG_PAID | RECEIVING CHARGES PAID (YES/NO) |
| REGISTERED_BOT_DELIVERY | REGISTERED FOR DELIVERY TO BOARD OF TRADE (YES/NO) |
| REMARKS | REMARKS SECTION |
| RID | SEQUENTIAL ROW IDENTIFIER |
| SBK_PCT | QUALITY FACTOR - (SHRUNKEN AND BROKEN PERCENTAGE) |
| STATUS | STATUS OF EWR (OPEN/SUSPENDED/CANCELLED/VOIDED) |
| STORAGE_PD_THRU_DT | DATE GRAIN STORAGE IS PAID THROUGH |
| STORAGE_START_DT | START DATE OF STORAGE |
| STARAGE_TARIFF_RT | TARIFF RATE OF STORAGE |

FIG.8D

| | |
|---|---|
| SUSPENDED_DT | DATE EWR SUSPENDED |
| TARIFF_CHRG_PER | TARIFF CHARGE FOR UNIT OF GRAIN |
| TEST_WT | QUALITY FACTOR – TEST WEIGHT OF GRAIN |
| TIME_STAMP | TIME AND DATE STAMP OF ISSUANCE OF EWR FROM SYSTEM |
| TOT_DEFECTS_PCT | QUALITY FACTOR –PERCENTAGE OF TOTAL DEFECTS |
| TOT_DMG_PCT | QUALITY FACTOR –PERCENTAGE OF TOTAL DAMAGE |
| UOM | UNIT OF MEASURE OF GRAIN OF EWR |
| VOIDED_DT | DATE EWR WAS VOIDED |
| VOMITOXIN | QUALITY FACTOR – VOMITOXIN |
| WH_COMPANY_CITY | CITY OF WAREHOUSE COMPANY |
| WH_COMPANY_NAME | NAME OF WAREHOUSE COMPANY |
| WH_COMPANY_RID | SEQUENTIAL ROW IDENTIFIER OF WAREHOUSE COMPANY |
| WH_COMPANY_STATE | STATE OF WAREHOUSE COMPANY |
| WH_LICENSE_NO | LICENSE OF WAREHOUSE COMPANY |
| WH_LOC_CITY | CITY WHERE WAREHOUSE IS LOCATED |
| WH_LOC_NAME | NAME OF WAREHOUSE LOCATION |
| WH_LOC_RID | SEQUENTIAL ROW IDENTIFIER OF WAREHOUSE |
| WH_LOC_STATE | STATE OF LOCATION OF WAREHOUSE |
| WH_NAME | NAME OF WAREHOUSE |
| WH_OPER_IS_DEPOSITER | IS WAREHOUSE OPERATOR THE DEPOSITER (YES/NO) |
| WH_OPER_LIEN_CMNT | WAREHOUSE OPERATOR LIEN COMMENT |
| WH_OPERATOR | WAREHOUSE OPERATOR |

FIG.8E

TABLE: DAILY POSITION

| FIELD | DEFINITION |
|---|---|
| client_no | CLIENT NUMBER |
| Grain | TYPE OF GRAIN |
| Id | COMPANY IDENTIFICATION NUMBER |
| negotiable | NEGOTIABLE (YES/NO) |
| nonnegotiable | NONNEGOTIABLE (YES/NO) |
| CompOwnedOblig | COMPANY OWNED OBLIGATION |
| DailyPositionDtlRecId | UNIQUE ROW IDENTIFIER |
| DailyPositionRecId | IDENTIFICATION NO. IN DAILY POSITION TABLE RECORD |
| GrainType | TYPE OF GRAIN |
| InhouseInv | IN HOUSE INVENTORY |
| MeasurementUnit | MEASUREMENT UNIT FOR GRAIN |
| NegOblig | NEGOTIABLE OBLIGATIONS |
| NonNegOblig | NONNEGOTIABLE OBLIGATIONS |
| OpenStorageOblig | OPEN STORAGE OBLIGATIONS |
| RedepositedInv | REDEPOSITED INVENTORY |
| TotalInv | TOTAL INVENTORY |
| TotalOblig | TOTAL OBLIGATIONS |
| DailyPositionRec(HEADING FOR SUBFIELD) | |
| CompanyId | IDENTIFICATION NO. AS PER COMPANY TABLE (FIG.3) |
| DailyPositionRecId | UNIQUE ROW IDENTIFIER |
| LicenseNumber | LICENSE NO. OF COMPANY |
| PersonName | NAME OF PERSON MAKING REPORT |
| ReportDate | DATE OF REPORT |
| Title | TITLE OF PERSON MAKING REPORT |

FIG.9

TABLES: LONG SHORT MARKET POSITION REPORT
TABLE I: LONG/SHORT MARKET POSITION

| FIELD | DEFINITION |
| --- | --- |
| GrainType | TYPE OF GRAIN |
| LaterReceivedPrice | PRICE LATER RECEIVED |
| LaterShippedPrice | PRICE LATER SHIPPED |
| MarketPositionDtlRecId | UNIQUE ROW IDENTIFIER |
| MarketPositionRecId | REFERENCE TO MARKET POSITION |
| MeasurementUnit | UNIT OF MEASUREMENT FOR THE GRAIN |
| MiscLongPosition | MISCELLANEOUS LONG POSITION |
| MiscShortPosition | MISCELLANEOUS SHORT POSITION |
| NetLongShortPosition | NET LONG/SHORT POSITION |
| OpenCashPurchaseContracts | OPEN CASH PURCHASE CONTRACTS |
| OpenCashSalesContracts | OPEN CASH SALES CONTRACTS |
| OpenFuturePurchases | OPEN FUTURE PURCHASES |
| OpenFutureSales | OPEN FUTURE SALES |
| ReceiptedInv | RECEIPTED INVENTORY |
| RegPositionLimits | REGULAR POSITION LIMITS |
| UnReceiptedInv | UNRECEIPTED INVENTORY |

TABLE II: MARKET POSITION RECORD

| FIELD | DEFINITION |
| --- | --- |
| CompanyId | IDENTIFICATION NO. OF COMPANY IN THE SYSTEM |
| GrnDlrLicenseNumber | GRAIN DEALER LICENSE NO. |
| MarketPositionRecId | UNIQUE ROW IDENTIFIER |
| PersonName | NAME OF PERSON MAKING REPORT |
| Remarks | SECTION FOR REMARKS |
| ReportDate | DATE OF REPORT |
| Title | TITLE OF PERSON MAKING REPORT |

FIG.10

TABLE: WORKING CAPTIAL

| FIELD | DEFINITION |
|---|---|
| AcctPayableAsset | ACCOUNTS PAYABLE ASSETS |
| AcctPayableLiab | ACCOUNTS PAYABLE LIABILITIES |
| AcctReceivableAsset1 | ACCOUNTS RECEIVABLE ASSETS |
| AcctReceivableAsset2 | ACCOUNTS RECEIVABLE ASSETS |
| AcctReceivableAsset3 | ACCOUNTS RECEIVABLE ASSETS |
| AcctReceivableAsset4 | ACCOUNTS RECEIVABLE ASSETS |
| AcctReceivableLiab1 | ACCOUNTS RECEIVABLE LIABILITIES |
| AcctReceivableLiab2 | ACCOUNTS RECEIVABLE LIABILITIES |
| AcctReceivableLiab3 | ACCOUNTS RECEIVABLE LIABILITIES |
| AcctReceivableLiab4 | ACCOUNTS RECEIVABLE LIABILITIES |
| AdvPaidAsset | ADVANCE PAID ASSETS |
| AdvPaidLiab | ADVANCE PAID LIABILITIES |
| AdvReceivedAsset | ADVANCE RECEIVED ASSETS |
| AdvReceivedLiab | ADVANCE PAID LIABILITIES |
| CashOnHandAsset | CASH ON HAND-ASSETS |
| CashOnHandLiab | CASH ON HAND-LIABILITIES |
| CCCCode | COMMODITY CREDIT CORP. CODE |
| CompanyId | COMPANY IDENTIFICATION NO. IN THE SYSTEM |
| CustPrePaidAsset | CUSTOMER PREPAID ASSETS |
| CustPrePaidLiab | CUSTOMER PREPAID LIABILITIES |
| CustPrePaidOtherAsset | CUSTOMER PREPAID OTHER ASSETS |
| CustPrePaidOtherLiab | CUSTOMER PREPAID OTHER LIABILITIES |
| EncumbranceAsset | ENCUMBRANCE ASSETS |
| EncumbranceLiab | ENCUMBRANCE LIABILITIES |
| GrBarleyAsset | BARLEY ASSETS |
| GrBarleyLiab | BARLEY LIABILITIES |
| GrCanolaAsset | CANOLA ASSETS |
| GrCanolaLiab | CANOLA LIABILITIES |
| GrCornAsset | CORN ASSETS |
| GrCornLiab | CORN LIABILITIES |
| GrFlaxseedAsset | FLAXSEED ASSETS |
| GrFlaxseedLiab | FLAXSEED LIABILITIES |
| GrnDirLicenseNo | GRAIN DEALER LICENSE NO. |
| GrOatsAsset | OATS ASSETS |
| GrOatsLiab | OATS LIABILITIES |
| GrOther1 | OTHER GRAINS |
| GrOther2 | OTHER GRAINS |
| GrOther3 | OTHER GRAINS |
| GrOther4 | OTHER GRAINS |

FIG.11A

| | |
|---|---|
| GrOtherAsset1 | OTHER GRAINS ASSETS |
| GrOtherAsset2 | OTHER GRAINS ASSETS |
| GrOtherAsset3 | OTHER GRAINS ASSETS |
| GrOtherAsset4 | OTHER GRAINS ASSETS |
| GrOtherLiab1 | OTHER GRAINS LIABILITIES |
| GrOtherLiab2 | OTHER GRAINS LIABILITIES |
| GrOtherLiab3 | OTHER GRAINS LIABILITIES |
| GrOtherLiab4 | OTHER GRAINS LIABILITIES |
| GrReceivablesAsset | GRAIN RECEIVABLES ASSETS |
| GrReceivablesLiab | GRAIN RECEIVABLES LIABILITIES |
| GrRiceAsset | RICE ASSETS |
| GrRiceLiab | RICE LIABILITIES |
| GrRyeAsset | RYE ASSETS |
| GrRyeLiab | RYE LIABILITIES |
| GrSorghumAsset | SORGHUM ASSETS |
| GrSorghumLiab | SORGHUM LIABILITIES |
| GrSoybeansAsset | SOYBEANS ASSETS |
| GrSotbeansLlab | SOYBEANS LIABILITIES |
| GrSunflowerSeedAsset | SUNFLOWER SEED ASSETS |
| GrSunflowerSeedLiab | SUNFLOWER SEED LIABILITIES |
| GrTritacaleAsset | TRITACALE ASSETS |
| GrTritacaleLiab | TRITACALE LIABILITIES |
| GrWheatAsset | WHEAT ASSETS |
| GrWheatLiab | WHEAT LIABILITIES |
| LicenseType | LICENSE TYPE |
| LongTermNotesAsset | LONG TERM NOTES ASSETS |
| LongTermNotesLiab | LONG TERM NOTES LIABILITIES |
| MarginAcct1 | MARGIN ACCOUNT |
| MarginAcct2 | MARGIN ACCOUNT |
| MarginAcct3 | MARGIN ACCOUNT |
| MarginAcctAsset1 | MARGIN ACCOUNT ASSETS |
| MarginAcctAsset2 | MARGIN ACCOUNT ASSETS |
| MarginAcctAsset3 | MARGIN ACCOUNT ASSETS |
| MarginAcctLiab1 | MARGIN ACCOUNT LIABILITIES |
| MarginAcctLiab2 | MARGIN ACCOUNT LIABILITIES |
| MarginAcctLiab3 | MARGIN ACCOUNT LIABILITIES |
| Misc1 | MISCELLANEOUS |
| Misc2 | MISCELLANEOUS |
| Misc3 | MISCELLANEOUS |
| MiscAsset1 | MISCELLANEOUS ASSETS |
| MiscAsset2 | MISCELLANEOUS ASSETS |
| MiscAsset3 | MISCELLANEOUS ASSETS |

FIG.11B

| | |
|---|---|
| MiscLiab1 | MISCELLANEOUS LIABILITIES |
| MiscLiab2 | MISCELLANEOUS LIABILITIES |
| MiscLiab3 | MISCELLANEOUS LIABILITIES |
| NetCashAsset | NET CASH ASSETS |
| NetCashLiab | NET CASH LIABILITIES |
| NetContractAsset | NET CONTRACT ASSETS |
| NetContractLiab | NET CONTRACT LIABILITIES |
| NetEquityAsset | NET EQUITY ASSETS |
| NetEquityLiab | NET EQUITY LIABILITIES |
| NetWCAsset | NET WORKING CAPITAL ASSETS |
| NetWCLiab | NET WORKING CAPITAL LIABILITIES |
| OtherPayables1 | OTHER PAYABLES |
| OtherPayables2 | OTHER PAYABLES |
| NetPayablesAsset1 | NET PAYABLES ASSETS |
| NetPayablesAsset2 | NET PAYABLES ASSETS |
| NetPayablesLiab1 | NET PAYABLES LIABILITIES |
| NetPayablesLiab2 | NET PAYABLES LIABILITIES |
| PLGrReceivedAsset | PRICE LATER GRAIN RECEIVED ASSETS |
| PLGrReceivedLiab | PRICE LATER GRAIN RECEIVED LIABILITIES |
| PLGrShippedAsset | PRICE LATER GRAIN SHIPPED ASSETS |
| PLGrShippedLiab | PRICE LATER GRAIN SHIPPED LIABILITIES |
| ProcessedGrAsset | PROCESSED GRAIN ASSETS |
| ProcessedGrDesc | PROCESSED GRAIN DESCRIPTION |
| ProcessedGrLiab | PROCESSED GRAIN LIABILITIES |
| Remarks | SPACE FOR REMARKS |
| ReportDate | DATE OF REPORT |
| ShortTermInvAsset1 | SHORT TERM INVESTMENT ASSETS |
| ShortTermInvAsset2 | SHORT TERM INVESTMENT ASSETS |
| ShortTermInvAsset3 | SHORT TERM INVESTMENT ASSETS |
| ShortTermInvDesc1 | SHORT TERM INVESTMENT DESCRIPTION |
| ShortTermInvDesc2 | SHORT TERM INVESTMENT DESCRIPTION |
| ShortTermInvDesc3 | SHORT TERM INVESTMENT DESCRIPTION |
| ShortTermInvLiab1 | SHORT TERM INVESTMENT LIABILITIES |
| ShortTermInvLiab2 | SHORT TERM INVESTMENT LIABILITIES |
| ShortTermInvLiab3 | SHORT TERM INVESTMENT LIABILITIES |
| ShortTermNotesAsset | SHORT TERM NOTES ASSETS |
| ShortTermNotesLiab | SHORT TERM NOTES LIABILITIES |
| Title | TITLE |
| TotalAsset | TOTAL ASSETS OF REPORTING ENTITY |
| TotalLiab | TOTAL LIABILITIES OF REPORTING ENTITY |
| UserName | NAME OF USER (PERSON) MAKING REPORT |
| WarehouseLicenseNo | WAREHOUSE LICENSE NO. |
| WorkingCapitalRecid | UNIQUE ROW IDENTIFIER |

FIG.11C

TABLE: GRAIN ASSETS vs. LIABILITIES

| FIELD | DEFINITION |
|---|---|
| AdvancesPaid | ADVANCES PAID |
| AdvancesReceived | ADVANCES RECEIVED |
| Balance | BALANCE |
| CashonHand | CURRENT AMOUNT OF CASH |
| CCCCode | COMMODITY CREDIT CORP. CODE |
| CompanyId | COMPANY IDENTIFICATION IN SYSTEM |
| GrainAssetsLiabilitiesRecID | UNIQUE ROW IDENTIFIER |
| GrainPayables | GRAIN PAYABLES |
| GrnAssetOther | OTHER GRAIN ASSETS |
| GrnAssetOtherValue | OTHER GRAIN ASSET VALUE |
| GrnDlrLicenseNumber | LICENSE NO. OF GRAIN DEALER |
| GrnInventory | PRESENT INVENTORY OF GRAIN |
| GrnLiabilitiesOther | OTHER GRAIN LIABILITIES |
| GrnLiabilitiesOtherValue | OTHER VALUE FOR GRAIN LIABILITY |
| GrnReceivables | GRAIN RECEIVABLES |
| HedgingAccts | HEDGING ACCOUNTS |
| LicenseType | TYPE OF LICENSE |
| PersonName | NAME OF PERSON MAKING REPORT |
| PriceLaterReceived | RECEIVED PRICE LATER |
| PriceLaterShipped | SHIPPED PRICE LATER |
| ReconciledAccountValue | RECONCILED ACCOUNT VALUE |
| ReconciledAcctNumber | RECONCILED ACCOUNT NUMBER |
| ReportDate | DATE OF REPORT |
| StorageObligations | STORAGE OBLIGATIONS |
| Title | TITLE OF PERSON MAKING REPORT |
| TotalGrnAssets | TOTAL GRAIN ASSETS |
| TotalGrnLiabilities | TOTAL GRAIN LIABILITIES |
| WarehouseLicenseNum | WAREHOUSE LICENSE NUMBER |

FIG.12 eGrain ONLINE >>Price Later On-Line Management<< — 342

Left navigation:
- Price Later
- Account Setup
- Customer List
- Reporting Service
- EWR
- Email Us
- Terms & Definitions
- Help
- Logout

Tabs: PL Reports | Issue PL | Purchase PL Contracts | Assign Contract Number Sequence | Open Contracts | View Closed Contracts | View Void Contracts | Setup Rates Codes | View Transferred Contracts (1)

Price Later Contract Issuing Form:

Source Document #: [ ]
Location: [ ]   Grain Dealer Lic #: 123456789
Producer Account #: PRD00000050   Name: Matt Barham Farms, Inc.
Bushels: 15000   Grade: # 2   Type: CORN   Class: N/A

- ⦿ Grain was Delivered between the dates of [ ] and [ ]
- ○ Grain covered by this contract was delivered from storage of [ ]
- ○ Pre-Delivery: Grain to be delivered between the dates of [ ] and [ ]

Maximum estimated bushels: [ ]

THE PURCHASE PRICE SHALL DETERMINE AS FOLLOWS:
- ⦿ Price Later (Standard). Price by [ ]
- ○ Basis: sell at (+ or −) [ ] $ [0]. for CBOT Futures month  Price by [ ]
- ☐ this contract covers [ ] bushels of [ ] previously covered by Price Later Contract [ ]

SERVICE CHARGE: Spring A
$.15 initial and $.04 per month
ADVANCES:
OTHER ITEMS:

[Issue] (358)   [Cancel] (352)   [Edit] (354)

356 — You are about to ISSUE a Price Later Contract to your customer. Please Verify all the information. If Correct, please Press 'Issue' to proceed, otherwise press 'Edit' to modify it or "Cancel" to cancel it.

FIG.18A eGrain ONLINE >>Price Later On-Line Management<<

| PL Reports | Issue PL | Purchase PL Contracts | Assign Contract Number Sequence | Open Contracts |
|---|---|---|---|---|
| View Closed Contracts | View Void Contracts | Setup Rates Codes | View Transferred Contracts (1) | |

Search for open contracts by:

| Customer ID | Producer Account No. | Producer Name | Contract Control No. | | Search |
|---|---|---|---|---|---|

Open Contract List: The list can be sorted by clicking on the column header.
An X in the column represents a signed contract                                    Export to Excel

| | | | | Contract Control No. | S | Producer Account No. | Customer ID | Producer Name | Grain Type | Contract Type | Remaining Balance |
|---|---|---|---|---|---|---|---|---|---|---|---|
| View | Sign Void | Basis Settlement | Change Terms | 100050 | X | PRD00000004 | FRM00234 | Producer B | CORN | STANDARD | 15000 |
| View | Sign Void | Basis Settlement | Change Terms | 100051 | | PRD00000027 | | Earl Miller | CORN | STANDARD | 1000 |
| View | Sign Void | Basis Settlement | Change Terms | 100052 | X | PRD00000027 | | Earl Miller | CORN | BASIS | 500 |
| View | Sign Void | Basis Settlement | Change Terms | 100053 | | PRD00000030 | | Bob Leach Farms | CORN | BASIS | 2500 |
| View | Sign Void | Basis Settlement | Change Terms | 100054 | X | PRD00000022 | 12124 | Bill Smith | CORN | STANDARD | 2000 |
| View | Sign Void | Basis Settlement | Change Terms | 100055 | | PRD00000023 | | Producer B | CORN | STANDARD | 3500 |
| View | Sign Void | Basis Settlement | Change Terms | 100056 | | PRD00000004 | FRM00234 | Producer Corp. A | CORN | STANDARD | 10000 |
| View | Sign Void | Basis Settlement | Change Terms | 100057 | | PRD00000013 | FRM2323 | Earl Miller | CORN | STANDARD | 5000 |

Price Later
Account Setup
Customer List
Reporting Service
EWR
Email Us
Terms & Definitions
Help
Logout

FIG.19

Figure 21:
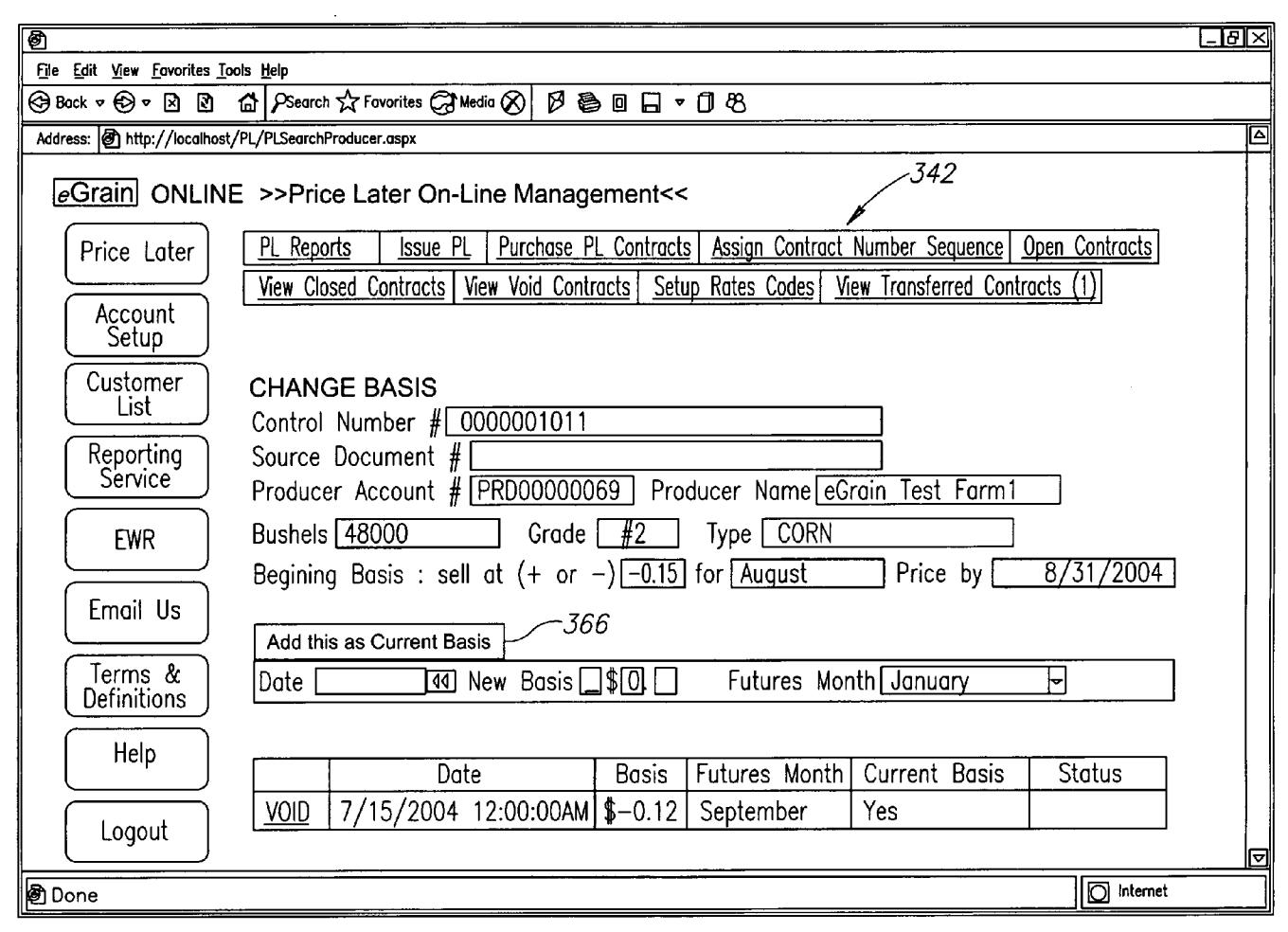

FIG. 21 eGrain ONLINE >>Price Later On-Line Management<<  ─342

| PL Reports | Issue PL | Purchase PL Contracts | Assign Contract Number Sequence | Open Contracts |
|---|---|---|---|---|
| View Closed Contracts | View Void Contracts | Setup Rates Codes | View Transferred Contracts (1) | |

POST SETTLEMENTS

Control Number # 100008
Source Document # 67432123
Producer Account # PRD00000053    Producer Name James Barham Farms, Inc.
Bushels 4500    Grade #2    Type CORN ─369
Remaining Balance 1000

368─ | Post this Settlement | Transfer to New Contract | ☐ Transfer to New Company

| | Date | Settlement Sheet # | Check Number | Price | Amount Paid | Bushels Settled | Unit Price | Bushels Settled | Amount Paid | Remaining Balance |
|---|---|---|---|---|---|---|---|---|---|---|
| ◁◁ | | | | | | | $ | | $ | |
| VOID | 7/16/2004 | 1 | 458 | $2.50 | $2500.00 | | | 1000 | | 3500 |
| VOID | 7/16/2004 | 2 | 459 | $2.50 | $2500.00 | | | 1000 | | 3500 |
| VOID | 7/16/2004 | 3 | 460 | $2.50 | $2500.00 | | | 1000 | | 1500 |
| VOID | 7/16/2004 | 4 | 461 | $2.50 | $1000.00 | | | 500 | | 1000 |

Sidebar: Price Later | Account Setup | Customer List | Reporting Service | EWR | Email Us | Terms & Definitions | Help | Logout

[eGrain] ONLINE >>Electronic Warehouse Receipt On-Line Management<<

| EWR Home | Reports | Balances | Examiner EDI |

Show In Report
- ☑ Issuer
- ☑ Issuer User
- ☑ Receipt #
- ☑ EWR Type
- ☑ Grain Type
- ☑ Net Bushels
- ☑ Date Issued
- ☑ Date Modified
- ☑ For the Account Of
- ☑ Producer EWR Type [Corn ▼]

Grain Type [Corn ▼]

EWR Status [Corn ▼]

For the Accounts Of
- ○ All
- ○ Name [_____]

Issuing Warehouse
- ○ All
- ○ Specific Warehouse [St. Thomas ▼]

Dates (MM/DD/YYYY)
- ☐ Issued    From [__] To [__]
- ☐ Canceled  From [__] To [__]
- ☐ Voided    From [__] To [__]

[Generate Report] — 542

Sidebar buttons: Price Later | Account Setup | Customer List | Reporting Service | EWR | Email Us | Terms & Definitions | Help | Logout

Daily Position Report

Warehouse Name: Harrys VI    Warehouse License Number: 1234

Report is for close of business (date): 7/10/2004

Tabs: Daily Position | Long/Short Marketing | Grain Assets Vs Liabilities | Working Capital | Exit Reporting

| COMMODITY | Unit | 1. In-house Inventory | 2. Re-deposited/ Forwarded Inventory | 3. Total Inventory | 4. Negotiable Warehouse receipt Obligations | 5. Non-Negotiable Warehouse receipt Obligations | 6. Un-receipted Open Storage (to other) Obligations | 7. Un-receipted Company-Owned Obligations | 8. Total Receipted & Un-receipted Storage Obligations |
|---|---|---|---|---|---|---|---|---|---|
| Barley | bu. | 10 | 10 | 20 | 5 | 5 | 5 | 5 | 20 |
| Canola | bu. | 30 | 40 | 70 | 1 | 1 | 1 | 1 | 4 |
| Corn | bu. | 100 | 200 | 300 | 50 | 50 | 50 | 50 | 200 |
| Flaxseed | bu. | | | | | | | | |
| Oats | bu. | | | | | | | | |
| Rice | bu. | | | | | | | | |
| Rye | bu. | | | | | | | | |
| Sorghum | bu. | | | | | | | | |
| Soybeans | bu. | | | | | | | | |
| Sunflwr Seed | bu. | | | | | | | | |
| Wheat | bu. | 1000 | 1000 | 2000 | 100 | 100 | 100 | 100 | 400 |
| Triticale | bu. | | | | | | | | |
| Other | bu. | | | | | | | | |

I, (name) Joe S. Warehouseman (title.. Owner, Corp. Office or General Manager) General Manager, hereby certify to the Illinois Department of Agriculture, subject to penalties of applicable laws for knowing false representations and similar offenses, that the information I am submitting in this report is, to the best of my knowledge and belief, true and correct.

Note: The person whose name appears here must be the same person submitting this report. Questions should be directed to the Illinois Department of Agriculture, Bureau of Warehouses. Ph 217/782-2895

(when the submit button is selected, the Illinois Department of Agriculture is notified by e-mail that it is available for review.)

SUBMIT — 556

Side buttons: Price Later | Account Setup | Customer List | Reporting Service | EWR | Email Us | Terms & Definitions | Help | Logout

FIG. 42

*eGrain* ONLINE >>On-Line Report Management<<

| Daily Position | Long/Short Marketing | Grain Assets Vs Liabilities | Working Capital | Exit Reporting |

Daily Position Report

○ New Report
◉ Search Report

Warehouse License No: [    ]  From Date: [    ]  To Date: [    ]  [Search] — 559

| License Number | ReportDate | SubmittedBy | Title | |
|---|---|---|---|---|
| 1234 | 07/10/04 | Harry Smith | President | View |
| 12345 | 07/10/04 | Harry Smith | President | View |
| 12345 | 07/10/04 | Harry J. Smith | President | View |
| 12345 | 07/10/04 | Harry J. Smith | President | View |
| 44512 | 07/10/04 | Harry Smith | President | View |

558, 560, 562, 562

Buttons: Price Later | Account Setup | Customer List | Reporting Service | EWR | Email Us | Terms & Definitions | Help | Logout

FIG. 43

Daily Position Report

Warehouse Name: Harrys VI
Warehouse License Number: 1234
Report is for close of business (date): 7/10/2004

| COMMODITY | Unit | 1. In-house Inventory | 2. Re-deposited/Forwarded Inventory | 3. Total Inventory | 4. Negotiable Warehouse receipt Obligations | 5. Non-Negotiable Warehouse receipt Obligations | 6. Un-receipted Open Storage (to other) Obligations | 7. Un-receipted Company-Owned Obligations | 8. Total Receipted & Un-receipted Storage Obligations |
|---|---|---|---|---|---|---|---|---|---|
| Barley | bu. | 10.00 | 10.00 | 20.00 | 5.00 | 5.00 | 5.00 | 5.00 | 20.00 |
| Canola | bu. | 30.00 | 40.00 | 70.00 | 1.00 | 1.00 | 1.00 | 1.00 | 4.00 |
| Corn | bu. | 100.00 | 200.00 | 300.00 | 50.00 | 50.00 | 50.00 | 50.00 | 200.00 |
| Other | bu. | 1000.00 | 1000.00 | 2000.00 | 100.00 | 100.00 | 100.00 | 100.00 | 400.00 |

I, Joe S. Warehouseman General Manager, hereby certify to the Illinois Department of Agriculture, subject to penalties of applicable laws for knowing false representations and similar offenses, that the information I am submitting in this report is, to the best of my knowledge and belief, true and correct.

FIG. 44

METHOD AND SYSTEM FOR MANAGING COMMODITY TRANSACTIONS

CROSS-REFERENCES TO RELATED APPLICATIONS

This application is related to and claims priority from U.S. Provisional Patent Application Ser. No. 60/588,019, entitled: METHOD AND SYSTEM FOR MANAGING COMMODITY TRANSACTIONS, filed Jul. 14, 2004, and U.S. Provisional Patent Application Ser. No. 60/574,917, entitled: METHOD AND SYSTEM FOR MANAGING COMMODITY TRANSACTIONS, filed May 27, 2004, both of these U.S. Provisional Patent Applications are incorporated by reference herein.

TECHNICAL FIELD

The present invention relates to systems for handling commodity transactions. In particular, the present invention is directed to an electronic central filing system associated with grain, and in particular, to electronic warehouse receipts, price later (credit sales) contracts and company position reports.

BACKGROUND OF THE INVENTION

Grain is a commodity whose transfer is burdensome, as it is paper intensive. Currently, all processes for handling and storing grain warehouse receipts, price later (credit sales) contracts and other documents are all papers that must be transferred among the various users and authorities, from the government and private sectors.

The current paper warehouse receipt system is cumbersome, costly and inefficient. Paper warehouse receipts (also known as warehouse receipts or receipts), serve as evidence of title to an amount of a commodity, such as grain. These paper receipts, must be accounted for at all times, and stored for years after their cancellation. Each specific paper receipt must be transferred between the warehouse, grain owners and lien holders, to assure the control and protection afforded by physically possessing these receipts.

Should a paper receipt become lost, business is slowed, as the receipt holder must resort to affidavits and other legal expenses to recreate the lost receipt. Additionally, since the receipts are paper, they can be forged and counterfeited. As a result, warehouses expend substantial sums of money in securing unused receipts, to prevent fraudulent use of these receipts. Conversely, during periods of heavy activity, warehouses may run out of paper receipts, causing a slowdown in business.

Also, paper receipts must be transferred between holders manually. This results in increased handling costs. Paper receipts, since only one is issued, must be viewed at in-person meetings, and are therefore, not available at all times.

Similar to paper receipts, price later contracts are also currently paper only. These contracts must be accounted for at all times, and stored for years after their cancellation. Paper contracts are highly regulated, and since they require signatures of the buyer and the seller, copies must be filed separately for licensing authorities to periodically review. Selling transactions need to be documented on the grain dealer copy, and in some cases, on the licensing authority's copy of the contract as well.

Paper contracts are burdensome, as grain dealers must store, safeguard and account for used and unused contracts, to insure against fraud. Also, paper contracts can be counterfeited and signatures forged and fraudulently obtained. Additionally, since the paper contracts are typically standard contracts, they are custom printed, and relatively expensive. Should a provision of the law change, these standard contracts must be rewritten, whereby these unused contracts must be properly disposed of.

Should a paper contract become lost, the process of recreating the contract, with its expenses must be undertaken.

Also, dealers and buyers may run out of paper contracts during times of peak business. This slows down business, while new blank contracts are being printed or otherwise obtained. By using paper contracts, grain dealers and buyers must have paper contracts at all of their locations. This is simply cumbersome.

Also, as a result of the contracts being paper, parties must meet in-person to sign the contracts. This is time consuming for both parties involved. Should a contract be amended, the parties must again meet in person to sign the amendment or amended contract.

Moreover, in the cases of paper receipts and paper contracts, should authorities and other regulators wish to examine these documents, they need to make an arrangement with the holder and come to the holder's place of business at preset hours, to make the examinations. This limits access to these documents and can halt business until the regulators or authorities have traveled to the document storage site and completed their review.

SUMMARY OF THE INVENTION

The present invention overcomes the contemporary art of paper warehouse receipts and paper contracts with an electronic system for creating and managing warehouse receipts and price later credit sales contracts, also referred to hereinafter as price later contracts. Price Later (PL) contracts are also known as, and are the collective name in this document for, Delayed Price Contracts, Deferred Pricing Contracts, DP (for Delayed or Deferred Price) Contracts, No Price Established Contract, NPE (No Price Established) Contract, depending on the U.S. State or territory where they are administered.

The system includes an electronic central filing system for warehouse receipts and price later contracts. The system is maintained by parties capable of providing electronic warehouse receipts (EWRs) and electronic price later contracts, and these providers are approved by a regulatory authority, such as the United States Department of Agriculture (USDA), and are responsible for the storage, filing, safeguarding and accounting of these electronic documents. Additionally, the providers must meet preselected criteria of the USDA.

The documents produced from the system are in accordance with Federal Regulations for format and content, and since they are electronic, can be easily updated should a regulation be modified. As the system is accessible by regulating authorities, the documents can be checked at any time for compliance with all regulations.

These documents are in electronic form and accessible by all parties including warehousers, producers, farm managers, commercial and government lenders and government authorities, such as licensing and regulating authorities. Access is typically over a network, such as the Internet, whereby these documents can be accessed at any time. For example, Federal and State regulators need not travel to personally inspect these documents, and examine them during business hours, but can access these documents remotely and on-line at any time. This allows for less interruptions in the flow of business for the producers, warehouses, and lenders.

As these documents are electronic and the processes of transfer associated therewith are paperless, security is improved, and there is reduced paper consumption and increased efficiency with the system, as all necessary documents are accessible electronically. Access is typically over a network such as the Internet, and is at all times (twenty-four hours a day except when the system is down for maintenance). As these documents are stored on a database, as part of a centralized filing system, they will not be lost. This eliminates the legal problems associated with recreating and verifying the existence of lost receipts or contracts. Additionally, it relieves all parties from having to store and safeguard originals of warehouse receipts and contracts.

By providing electronic access to all documents, business flows smoother. Stoppages do not occur due to waiting for additional blank paper copies of receipts or contracts to arrive from a printers (or to be printed), waiting for regulators to come on-site for document inspections, or for the documents themselves, when in transit.

Since the system is web-based, and run over a public and wide area network (wide area public network), such as the Internet, users do not need any special software or modifications to their existing apparatus or computer systems, when handling electronic receipts and contracts. Also, the receipts or contracts can be transferred to paper if the parties desire, with the transfer to paper noted in the system to avoid any potential duplications.

The system is such that it can monitor creation of electronic documents. It can check electronically that the document is complete and that information is not missing, prior to the documents being entered into the system. This ensures that only complete documents are in the system. For example, if the document is incomplete, the requisite parties to the document are prompted to complete the document with the missing information or else it will not become effective as it will not be entered into the system.

The system is also such that it can handle other records associated with the electronic receipts and contacts. These other records would also be accessible on-line, over the Internet, as are the electronic warehouse receipts (EWRs) and electronic price later contracts.

With respect to warehouse receipts, the present invention provides multiple benefits to all parties involved with the transactions associated with these receipts. These parties include the warehouse or warehouseman, producers and farm managers, local and national United States Department of Agriculture (USDA) Offices, commercial and government lenders, and government authorities, both federal and state, banks and other agricultural lenders.

At the warehouse or through the warehouseman, the present invention eliminates the need for storing, filing, safeguarding and accounting for used receipts, as well as unused or blank receipts. This eliminates the problems associated with receipts being lost, or unused receipts falling into the hands of potential forgers and counterfeiters. Warehousers no longer have concerns over running low on receipts, and unused receipts falling into unscrupulous hands, as the warehouser has access to electronic receipts on an as needed basis. Moreover, the warehousers can electronically control issuance and maintenance of all necessary electronic warehouse receipts. In the case of multiple warehouses, each warehouse can pull electronic receipts from a single, typically central, data base, such that there is no need to estimate the number of blank receipts needed to be stored at each particular warehouse. Moreover, by having access to unlimited supplies of electronic receipts, business will not be slowed as warehouses will never run out of issueable receipts.

Warehousers can easily monitor and control access to issued receipts, as well as the issuance of receipts, by controlling their computer system. A system administrator for the warehouse or warehouses can control the entire security process by controlling the computer system for the one or more warehouses, when multiple warehouses are part of a single computer system.

The electronic warehouse receipt (EWR), functions similarly to a paper warehouse receipt, as it serves as evidence of title to an amount of a commodity, such as grain. The electronic warehouse receipts, issued by the system of the invention, are official for all transactions on the system of the invention, as these EWRs have (or will have) approval all requisite governmental or regulatory authorities.

Moreover, the EWRs are in conformance with industry standards, such as those of the Association of American Warehouse Control Officials (AAWCO). The AAWCO is an association of state and federal grain warehouse regulating officials.

The system of the invention allows for a significant number of loan deficiency payment (LDP) transactions to occur during the busy harvest season. The USDA has indicated its allowance of electronic warehouse receipts (EWRs) to be issued for warehouse delivered grain, allowing producers to electronically prove beneficial interest to the county Farm Service Agency (FSA) office and be eligible to receive LDP payments. This eliminates the need for warehouses and/or their customers, typically producers and farm managers, to photocopy delivery sheets and other documents to prove beneficial interest.

The system allows for electronic transfer of receipts when a warehouse pays off an FSA loan. This eliminates the need to physically deliver a check to the county FSA Office and pick up the receipt. Rather, funds can be sent electronically, for example, by wire, or by mail, and upon receipt of the funds, the receipt can be electronically transferred back to the warehouse. This allows for a cost effective and timely cancellation of the electronic warehouse receipt (EWR).

The system allows for electronic warehouse receipts to be issued to holders, with the holders being subsequently notified of the issuance of the receipt by electronic mail or the like.

The system is such that electronic warehouse receipts can be surrendered back to the warehouse and cancelled within minutes. This immediate cancellation allows for the immediate shipping of grain. This reduces or eliminates demurrage costs on barges or rail cars by not having to wait for paper receipts to be returned before the grain is shipped.

The system allows producers to provide the warehouse with power of attorney to handle electronic warehouse receipts. In this way, those producers that do not wish to work electronically personally can benefit from the system of the invention.

The system allows for warehouses to issue electronic receipts for collateral purposes. This way, their lender immediately assumes control of the electronic receipt and transfers funds to the warehouse account within minutes.

The system also streamlines the process for warehouses that enter into repurchase agreements with lenders and other businesses. Title to grain is immediately confirmed upon the issuance of an electronic warehouse receipt and this results in funds being transferred quickly into the warehouse account. When grain is repurchased by the warehouse, title can be quickly returned to the warehouse.

The system of the invention benefits producers and farm managers by eliminating the need for custodial arrangements when they are out of the area. With transfer of documents being electronic, participation in government programs, such as loan programs, is simple and streamlined. This is because all documents are electronic and electronically sent over a network, such as the Internet, to the requisite government office, eliminating the need to manually gather, collect and deliver these documents.

The system of the invention benefits government offices that run loan programs, as data necessary for granting loans is already in the system and needs to only be downloaded. Loan documentation needs only to be uploaded into the system, allowing the process for a loan to move rapidly. By accessing the electronic warehouse receipts from a central system, beneficial interest in grain is easily proven. Similarly, the warehouse receipt of interest can be easily accessed, to see if it has been subjected to any security interests or other encumbrances.

The system of the invention benefits commercial lenders, as they can verify over the Internet, that a security interest has been placed on an electronic warehouse receipt in their favor. This speeds up processing of the loan for the receipt holder. As paper documents have been eliminated, there are no longer costs associated with shipping paper warehouse receipts to the warehouse or producer when the loan is repaid. There is no longer a need to designate a custodian of paper warehouse receipts. Additionally, the chances of two lenders lending money on the same warehouse receipt is virtually eliminated.

Federal and state licensing authorities benefit from the system of the invention by having all electronic warehouse receipts instantly accessible and easily accounted for. All warehouse receipts in the system can be listed in real time, available to the regulators as soon as entered into the system, and downloadable to the computer system of the regulators. This allows for easy access and quick inspection of electronic warehouse receipts in the system.

As the receipts are in a centralized system, they can be compared to other receipts that may be counterfeit or fraudulent. Also, since electronic, with status of the receipt indicated with the receipt, regulators do not have to hand stamp cancelled receipts.

An embodiment of the invention is directed to a method for conducting electronic transactions of warehouse receipts. The method includes, issuing at least one electronic warehouse receipt corresponding to at least one amount of at least one commodity, and permitting the transfer of the at least one electronic warehouse receipt from one holder of the at least one electronic warehouse receipt to another holder of the at least one electronic warehouse receipt. The holders of the at least one electronic warehouse receipt are associated with at least one node along a network. The method also includes, maintaining the at least one electronic warehouse receipt in storage media in electronic communication with the network, and providing access to the at least one electronic warehouse receipt to at least one user, the at least one user associated with at least one node along the network, by placing the at least one node into electronic communication with the storage media over the network.

Another embodiment of the invention is directed to a method for conducting electronic transactions of warehouse receipts, typically over a network, such as the Internet or other wide area or public network. The method includes, obtaining at least one electronic warehouse receipt; designating a holder of the at least one electronic warehouse receipt, the designated holder associated with at least one node along a network; receiving input from the holder of the at least one electronic warehouse receipt as to action taken on the at least one electronic warehouse receipt; and, maintaining the at least one electronic warehouse receipt in storage media in electronic communication with the network.

Another embodiment of the invention is directed to a method for conducting electronic transactions of price later contracts, typically over a network, such as the Internet or other wide area or public network. The method includes, obtaining at least one electronic price later contract; designating a holder of the at least one electronic price later contract, the designated holder associated with at least one node along a network; receiving input from the holder of the at least one electronic price later contract as to action taken on the at least one electronic price later contract; and, maintaining the at least one electronic price later contract in storage media in electronic communication with the network.

Another embodiment of the invention is directed to a method for conducting electronic transactions of commodities, such as those associated with grain. The method includes, electronically maintaining a database of users associated with nodes along a network, such as the Internet; electronically maintaining a database of at least one electronic document template associated with at least one commodity transaction, and at least one list of the users associated with nodes along a network permitted to receive the at least one electronic document template; and, receiving at least one electronic document created from the at least one electronic document template. The method also includes, electronically maintaining the at least one electronic document in at least one storage media; and, electronically maintaining a database of users with access to the at least one electronic document over the network, each of the users associated with at least one node along the network. The at least one electronic document template is for any one of price later contracts, warehouse receipts, daily position reports, market position reports, working capital reports and assets versus liabilities reports.

Another embodiment of the invention is directed to a system for conducting electronic transactions of warehouse receipts over a network, for example, the Internet, wide area network or public network. The system includes, a first component for issuing at least one electronic warehouse receipt corresponding to at least one amount of at least one commodity; a second component for permitting the transfer of the at least one electronic warehouse receipt from one holder of the electronic warehouse receipt to another holder of the electronic warehouse receipt, and the holders of the at least one electronic warehouse receipt are associated with at least one node along a network. There is a storage media for maintaining the at least one electronic warehouse receipt, the storage media in electronic communication with the network. There is also a third component for providing access to the at least one electronic warehouse receipt to at least one user, the at least one user associated with at least one node along the network. The third component is also designed for placing the at least one node into electronic communication with the storage media over the network.

Another embodiment of the invention is directed to a system for conducting electronic transactions of warehouse receipts over a network, for example, the Internet. The system includes, a storage device for storing at least one electronic warehouse receipt, and a processor. The processor is programmed to designate a holder of the at least one electronic warehouse receipt; receive input from the holder of the at least one electronic warehouse receipt as to action taken on the at least one electronic warehouse receipt; and, update the at least one electronic warehouse receipt as to the action taken on the at least one electronic warehouse receipt. The action taken on the at least one electronic warehouse receipt includes, transferring, suspending, voiding or canceling the electronic warehouse receipt.

Another embodiment of the invention is directed to a system for conducting electronic transactions of price later contracts over a network, for example, the Internet. The system includes a storage device for storing at least one electronic warehouse receipt and a processor. The processor is programmed to, designate a holder of the at least one electronic price later contract; receive input from the holder of the at least one electronic price later contract as to action taken on the at least one electronic price later contract; and, update the at least one price later contract as to the action taken on the at least one electronic price later contract receipt. The action taken on the electronic price later contract may include, changing terms of the price later contract, changing the basis of the price later contract, settling, or voiding the price later contract.

Another embodiment is directed to a system for conducting electronic transactions of commodities over a network, such as the Internet. The system includes, a storage device for storing at least one electronic document template and at least one electronic document created from the electronic document template, and a processor. The processor is programmed to, send the at least one electronic document template to at least one user, the at least one user permitted to receive the at least one electronic document template, receive the at least one electronic document created from the at least one electronic document template, and, provide at least one user with access to the at least one electronic document over the network, if the at least one user is permitted access to the electronic document. The at least one electronic document template may be for price later contracts, warehouse receipts, daily position reports, market position reports, working capital reports and assets versus liabilities reports.

Another embodiment of the invention is directed to a system for managing at least one commodity, for example, grain. The system includes, a server, accessible over a network, for example, the Internet. The server includes, components for creating electronic warehouse receipts associated with a predetermined amount of the at least commodity; components for providing access to at least one electronic warehouse receipt from a plurality of nodes along the network; and, components for permitting modification of the accessed at least one electronic warehouse receipt. There is also at least one data base accessible by the server, the data base for storing electronic warehouse receipts and information concerning the at least one commodity. The server also includes at least one component for indicating the transfer of electronic warehouse receipts between holders of the electronic warehouse receipts, when an electronic warehouse receipt has been modified by its existing holder for a new holder.

BRIEF DESCRIPTION OF THE DRAWINGS

Attention is now directed to the drawing figures, where like or corresponding numerals or characters indicate corresponding or like components. In the drawings:

FIG. 3 is a table of fields for the Company database file of FIG. 2;

FIG. 4 is a table of fields for the Producer database file of FIG. 2;

FIG. 5 is a table of fields for the Location database file of FIG. 2;

FIGS. 6A-6B are a table of fields for the Price Later (Credit Sales) Contracts database file of FIG. 2;

FIGS. 7A-7E are a table of fields for the Electronic Warehouse Receipts (EWRs) database file of FIG. 2;

FIGS. 8A-8E are a table of fields for the Electronic Warehouse Receipt (EWR) History database file of FIG. 2;

FIG. 9 is a table of fields for the Daily Position Report database file of FIG. 2;

FIG. 10 depicts tables of fields for the Long/Short Market Position Report database file of FIG. 2;

FIGS. 11A-11C are a table of fields for the Working Capital database file of FIG. 2;

FIG. 12 is a table of fields for the Grain Assets vs. Grain Liabilities database file of FIG. 2;

FIGS. 17-24 are screen displays or screen shots as seen by a user of various stages in the process of handling Price Later Contracts in the system in an accordance with an embodiment of the invention;

FIGS. 27-34 are screen displays or screen shots as seen by a user of various stages in the process of handling Electronic Warehouse Receipts (EWRs) in the system in an accordance with embodiments of the invention;

FIG. 38 is a screen display or screen shot as seen by a user of various stages in the process of generating Account Management reports for Price Later Contracts in the system, in accordance with embodiments of the invention;

FIG. 39 is a screen display or screen shot as seen by a user of various stages in the process of generating Account Management reports for Electronic Warehouse Receipts (EWRs) in the system, in accordance with embodiments of the invention;

FIGS. 41A-41C are screen displays or screen shots used in obtaining the various Reporting Services reports, in accordance with embodiments of the invention; and, FIGS. 42-44 are screen displays or screen shots as seen by a user of various aspects of a generated daily position report, in accordance with embodiments of the invention.

DETAILED DESCRIPTION

The present invention relates to systems, that are typically web based, in that communication is between nodes and a home server, over the World Wide Web (WWW) on a network such as the Internet. These typically web based systems are designed for handling commodity transactions. In particular, the present invention is directed to an electronic central filing system associated with grain, and in particular, to electronic warehouse receipts, price later credit sales contracts and reports.

The present invention is directed to grain that is a commingled with other similar grain, and not identity preserved (IP), upon being placed in a warehouse, or other agricultural storage facility, silo, elevator, or the like (collectively, and as used throughout this document, a "warehouse"). The grains referred to in this document may include wheat, canola, barley, corn, flaxseed, oats, rice, rye, sorghum, soybeans, sunflower and tritacale. Additionally, the present invention can also be used with organic grains, that are identity preserved, in accordance with United States Department of Agriculture (USDA) Regulations. While grain has been described, the invention can also be used for, or easily modified for, managing transactions in other commingled commodities, that are not identity preserved, including agricultural commodities stored in warehouses, elevators, silos, agricultural storage facilities and the like.

Figure 1:
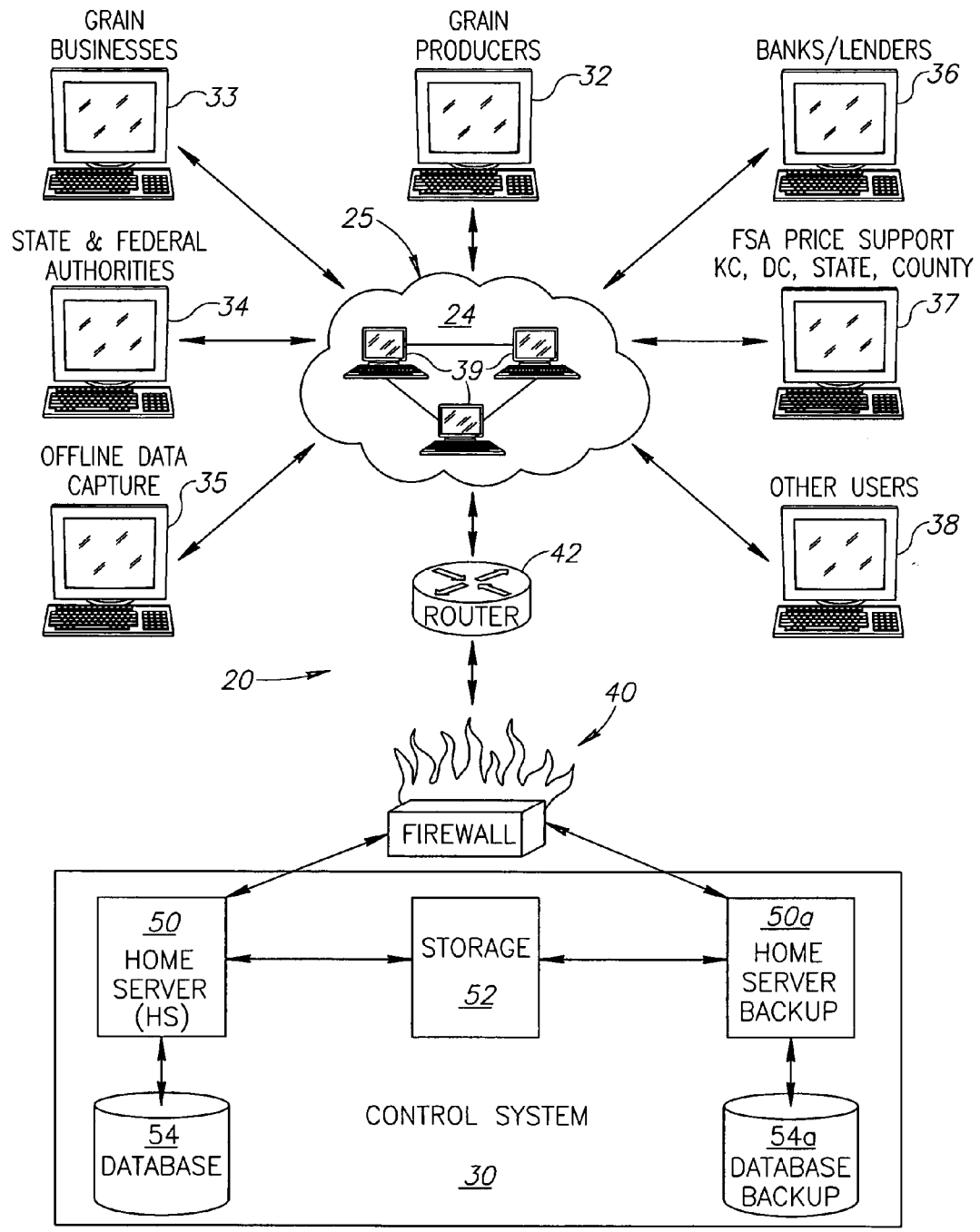
FIG. 1 is a schematic diagram of the system of the invention.

FIG. 1 shows an exemplary system 20 for facilitating an embodiment of the invention. The system 20 is formed of various servers and server components, that are linked to a network 24, such as a wide area network (WAN), that may be, for example, the Internet 25.

The system 20 includes a control system 30, that is electronically linked, over the network 24 to server-based nodes 32-38 (the servers 39 shown in the network 24). Each of the nodes 32-38 supports multiple users (through their computers or other computer type devices, referred to herein as users), and is representative of exemplary classes of these multiple users of the system 20. Each class of users includes one or more users, and typically includes large numbers, of individuals, businesses, government agencies, other entities, and the like. A firewall 40 typically separates the control system 30 from the network 24, and a router 42 is typically positioned intermediate the network 24 and the firewall 40.

The control system 30 typically includes a primary home server (HS) 50 (also known hereinafter as the home server 50) and at least one redundant or back up home server 50a. For description purposes, the home server 50 and its backup server 50a are referred to collectively as the home server 50, except where indicated otherwise. The servers that are used for home servers 50, 50a include multiple components for performing the requisite functions as detailed below, and the components may be based in hardware, software, or combinations thereof. The home servers 50, 50a may also have internal storage media and are typically associated with a shared external storage media (storage device) 52.

The home servers 50, 50a of the system 20 are linked (electronically either directly or indirectly) to an endless number of other servers and the like, via the Internet 25, for example, to the servers 39 that accommodate the nodes 32-38. These servers 39 perform the requisite functions detailed below in facilitating the passage of data between these servers 39 and the home servers 50, 50a, and these servers 39.

While various servers have been listed, this is exemplary only, as the present invention can be performed on an endless numbers of servers and associated components, that are in some way linked (electronically) to a network, such as the Internet 25. Additionally, all of the aforementioned servers include components for accommodating various server functions, in hardware, software, or combinations thereof, and typically include storage media, either therein or associated therewith. Also in this document, the aforementioned servers, storage media, and components may be linked (electronically) to each other or to a network, such as the Internet 25, either directly or indirectly.

The home servers 50, 50a are typically of an architecture that includes components, for example, for storing templates for, creating, handling, canceling and other related actions thereon, with electronic warehouse receipts (EWRs), price later credit sales contracts, user generated reports and company position reports. The architecture also includes components and/or modules for providing numerous additional server functions and operations, for example, comparison and matching functions, policy and/or rules processing, various search and other operational engines. The home servers 50, 50a, each include various processors, such as microprocessors, for performing the aforementioned server functions and operations and storage media, either internal or associated therewith, databases, such as the primary database 54, and the backup database 54a, additional databases (not shown), caches, and the like. The databases may include other data structures for data (for example, file) storage and manipulation. Like the home servers 50, 50a above, for description purposes, the primary database 54 and its backup database 54a, are referred to collectively as the database 54, except where indicated otherwise.

An exemplary server for the Home Server 50, may be based on a Microsoft® Windows® Advance Server Platform, using Microsoft® SQL 2000, as its primary database engine. An exemplary server for the backup or redundant home server 50a would be a duplicate of the primary server 50.

The nodes 32-38 are shown as represented by computers, but as stated above, are representative of multiple users that electronically link to the network 24 and the control system 30, through computers, work stations or other computer type devices.

The node 32 is representative of grain producers, such as a farmers, and the like.

The node 33 is representative of grain businesses, such as a warehouses, and other agricultural storage facilities (storage facilities) such as, elevators, silos, and the like. This node 33 is representative of a point where electronic warehouse receipts (EWRs), Price Later Contracts or other electronic document such as reports administered by the system 20, in the control system 30, are issued to various other users on the system 20. Alternately, the node 33 for the grain business may issue other indication or proof of receipt of grain from grain producers, such as paper warehouse receipts, scale tickets, paper price later contracts, etc. This node 33 may also be representative of other grain businesses, such as grain dealers, grain buyers, grain sellers, and the like. In many instances, the warehouses are also at least one of, grain dealers, grain buyers, grain sellers, and the like.

Node 34 is representative of Federal and State Authorities, such as, Federal and State licensing authorities, regulators and inspectors and law enforcement authorities. Node 35 is representative of entities that are authorized onto the system 20 for offline data capture. These entities may include registered users of the system 20 (in particular, the control system 30), who do not want to be connected over the Internet 25 with the control system 30 in a batch environment.

Node 36 is representative of banks and lending agencies. Node 37 is representative of government agencies that provide loans to grain producers, such as the Farm Service Agency (FSA) (a branch of the United States Department of Agriculture), in the Kansas City (KC) or Washington, D.C. (DC) office, State and County Farm service offices. Node 38 is representative of other users, such as exchanges, boards of trade, and the like.

All of the nodes 32-38 have various access to the system 20 and the control system 30 in accordance with rules and policies set in the control system 30. The rules and policies are typically set in the control system 30 by the administrator or other similar individual associated with the control system 30, and are detailed below.

Figure 2:
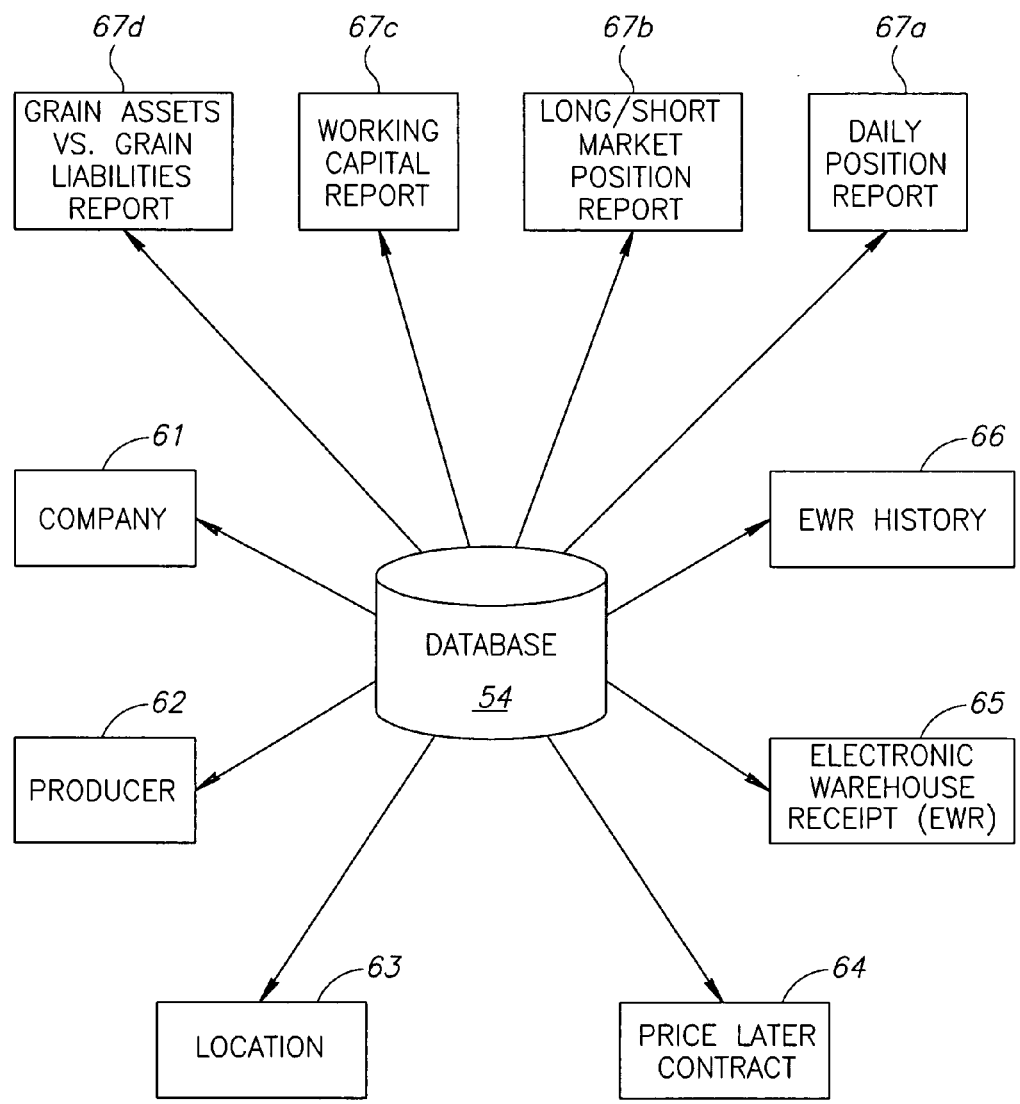
FIG. 2 is detailed schematic diagram of the database of the system of the invention as broken into files.

The detailed operation of a grain transaction is detailed in FIG. 2, which details an exemplary structure for the databases 54 and its backup database 54*a*, associated with their respective servers 50, 50*a*. As the backup database 54*a* is redundant to the primary database 54 (and similar and typically identical thereto), the databases 54, 54*a* will be described with respect to the primary database 54.

The database 54 is typically formed from nine files 61-67*d*. The nine files include a Company file 61, a Producer file 62, a Location file 63, a Price Later Contract file 64, an Electronic Warehouse Receipt (EWR) file 65, an Electronic Warehouse Receipt (EWR) History file 66, a Daily Position Report File 67*a*, a Long/Short Market Position Report file 67*b*, a Working Capital Report 67*c* file, and a Grain Assets vs. Grain Liabilities Report file 67*d*. Each of the database files 61-67*d* includes a left column for the field, provided as an integer, and are not case sensitive, although they may be made to be case sensitive. The right column is a definition of the field, in accordance with and corresponding to the exemplary fields listed below.

The Company database file 61 is represented by the exemplary table of FIG. 3. This file allows for records to be created of all users (registrants) of the system 20 (represented, for example, by nodes 33-38) except grain producers (for example, represented by node 32), who have a separate database file 62 designated in the database 54 (and the database backup 54*a*).

Every company, entity, or other user, that uses the system 20 (an accordingly, accesses the control system 30), and is registered into the control system 30, has its data placed into a table unique to that company, and is identifiable by that table. The exemplary table includes fields for information (or data) including, the account number (No.) for the company in the system, the address of the company, Commodity Credit Corporation (Corp.) codes (the Commodity Credit Corp. (CCC) is part of the Farm Service Agency (FSA) of the USDA), the city of the company, the type of company, the name of the company, the county of the company, the facsimile (Fax) number of company, does the company have grain dealer licenses (Yes/No), does the company have a federal license (Yes/No), does the company have a state license (Yes/No), space for notes to be entered, the name of the company, the telephone number of the company, the status of Price Later Contract(s) of the company, the date the company registered in the system, the Registration Identification Number (No.) of the Company, Sequential Row Identifier, U.S. state of the company, the status of the company in the system (Pending/Approved/Suspended), the total storage capacity, any warehouse license numbers, and, the Zip Code of the company.

The Producer database file 62 is represented by the exemplary table of FIG. 4. Every grain producer or the like (represented by node 32), that uses the system 20, and is registered into the system 20, has its data placed into a table unique to that producer, and is identifiable by that table. The exemplary table includes fields for information (or data) including, the account number of the producer in the control system 30, the address of the producer, the city of the producer, the county of the producer, the fax number of the producer, the name of the producer, the telephone number of the producer, the status of Price Later Contract(s) of the producer (Suspended/Voided/Cancelled/Open), the Registration Identification No. of the producer, Sequential Row Identifier, U.S. State of the producer, status in EWR Application (Pending/Approved/Suspended), and the Zip Code of the Producer.

The Location database file 63 is represented by the exemplary table of FIG. 5. The fields in this file include multiple fields for storage facilities. These fields include, for information (or data), for example, the address of the storage facility, the capacity of the storage facility, the city of the storage facility, Sequential Row Identifier (RID) as per the Company Table (FIG. 3), the county of the storage facility, the facsimile (Fax) Number of the storage facility, the active or inactive status of the storage facility, space for notes to be entered, the name of the storage facility, the telephone number (No.) of the storage facility, Sequential Row Identifier, the U.S. state of the storage facility, and, the Zip Code of the storage facility.

The Price Later (Credit Sales) Contract (Price Later Contract) database file 64 is represented by the exemplary table of FIGS. 6A and 6B. Price Later Contacts in the system 20, have data organized in a table unique to that particular price later credit sales contract. The fields in the file 64 are exemplary and subject to change, should federal, state laws, or local laws, or regulations change with regard to price later contracts. If the laws and/or regulations change, the fields can be modified, added, or subtracted.

With price later contracts, mandatory fields include those for: 1) Bushels—the number of bushels of grain for which the contract is being written; 2) Grade/Class/Grain—these components are used to describe the commodity the price later contract is being written for; 3) Delivery Options—one of three types of delivery options (truck, barge, rail) must be written into the contract; 4) Pricing Options—either standard or basis must be written into the contract, and 5) Service Charges—any additional charges associated with the contract; 6) Advances—any advances provided as part of the contract must be written into the contract; and, 7) Other Terms—free form fields that are important to the contact that should be written in to the contract.

The exemplary table of FIGS. 6A and 6B includes fields, based on the above listed seven fields. These fields, for example, include fields for information (or data) such as: the name of the user accepting the Price Later Contract (the contract), Sequential Row Identifier of the user accepting the contract, date of acceptance of the contract, advances on the contract, the beginning number of bushels on the contract, the user who closed the contract, Sequential Row Identifier of the user who closed the contract, the closing date for the contract, the name of the company making the contract, Sequential Row Identifier of the company making the contract, the contract Control Number, the type of the Contract (Standard or Basis type), the bushels covered by the contract, the dates covered by the contract, the type of grain covered by the contract, the number of the contract, the date delivery of grain (on the contract) begins, the date delivery of the grain (on the contract) ends, Grain Accounting Software Control Number (No.), the class of the grain covered under the contract, the license number of the Grain Dealer in the contract, the grade of the grain covered under the contract, the type of grain covered by the contract, the date the contract was issued, the name of the issuer of the contract, Sequential Row Identifier of the issuer of the contract, the name of the location where the grain covered by the contract is stored, the Sequential Row Identifier for the location where the grain is stored, the maximum estimated bushels, other terms of the contract, the contract basis for a Future Month, the Basis Contract starting date, the Standard Contract starting date, the starting basis for the contract, the Pre Delivery beginning date, the Pre Delivery ending date, the account number in the system (control system 30) for the grain producer, the name of the grain producer, the Sequential Row Identifier for the grain producer, the date the grain producer signed the contract, the date signed, the name of the user who signed the contract, the Sequential Row Identifier of the user who signed the contract, the name of user rejecting the contract, the Sequential Row Identifier of the user rejecting the contract, the date the contract was rejected, the remaining bushels in the contract, the Sequential Row Identifier, the service charge with the contract (an amount), the name of the producer who signed the contract, the Sequential Row Identifier of the producer Who Signed the Contract, the Reference Number of the source document, the user who voided the contract, the Sequential Row Identifier of the user who voided the contract, and, date the contract was voided.

The Electronic Warehouse Receipt (EWR) database file 65 is represented by the exemplary table of FIGS. 7A-7E. The exemplary table includes fields for information (or data) including: a Quality Factor—Alflatoxin, the date the Electronic Warehouse Receipt (EWR) was cancelled, the rail car number (No). that contains the grain of the subject EWR, collateral for the EWR, comments to be entered into the EWR, the container holding grain for this EWR, the date the EWR was converted from paper (a traditional warehouse receipt), the year of the crop covered by this EWR, the city of the delivery warehouse, the county of the delivery warehouse, the U.S. state of the delivery warehouse, Dockage (in Pounds), Dockage Percentage, the number of the EWR, the prefix of the licensing authority, the County Code of the Farm, the State Code of the Farm, the Quality Factor—Foreign Material Percentage, the status of delivery of the EWR to a Board of Trade or exchange, such as the Chicago Board of Trade (CBOT), the FSA Farm Number, the statement for the grade of the grain, the class of the grain for the EWR, the grade of the Grain for the EWR, the subclass of the grain for the EWR, the type of grain for the EWR, the variety of the grain for the EWR, the gross bushels of the grain for the EWR, Gross Pounds of the grain for the EWR, the Quality Factor—Percentage of Heat Damage to Grain of the EWR, the city of the holder of the EWR, the name of the holder of the EWR, the Sequential Row Identifier of the holder of the EWR, the date the holder became the holder of the EWR, the name of the holder's storage facility, the Sequential Row Identifier of the holder's storage facility, the U.S. state of the holder, the Inspection Certificate number, the insured status of the holder's location, the date the EWR was issued, the name of the company issuing the EWR, the Sequential Row Identifier of the company issuing the EWR, the name of the location associated with the issued EWR, the Sequential Row Identifier of the location associated with the issued EWR, the name of the Issuer, the Sequential Row Identifier of the issuer, a legal statement, the amount of the Loadout Charges, Loadout Charges Paid (Yes/No), the lot number of the grain of the EWR, the Quality Factor—Moisture Percentage of the grain of the EWR, Negotiable Receipt (Yes/No), Net Bushels of grain, Net Pounds of grain, the balance of the grain remaining on the EWR, the Quality Factor—Other Quality Factor (percentage thereof), any other special quality of the grain, the paper number (No.) of the paper receipt that is replacing the EWR, the amount of prepaid storage charges for the grain of the EWR, the name of the company of the previous holder of the EWR, the Sequential Row Identifier of the previous company holder of the EWR, the location name associated with the previous holder of the EWR, the Sequential Row Identifier of the previous Company Holder of the EWR, the name of the grain producer associated with the EWR, the Quality Factor—Protein Percentage of the grain of the EWR, the Quality Factor—Dockage Percentage of the grain received, the gross amount of bushels of grain received, pounds of the grain received, moisture percentage of the grain received, the date the EWR was last modified, the name of the user who modified the EWR, the Sequential Row Identifier for the last user who modified the EWR, the date the EWR was received, the user the EWR was received from, the name of the location the grain was received from, the Sequential Row Identifier of the location the grain was received from, the Sequential Row Identifier of the holder the EWR was received from, how the grain was received (Truck/Barge/Rail Car), the amount of receiving charges, were receiving charges paid (Yes/No), the status of the EWR as registered for delivery to a Board of Trade or Exchange, such as the Chicago Board of Trade (CBOT), a remarks section, Sequential Row Identifier, the Quality Factor—Shrunken and Broken Percentage, the status of the EWR (Open/Suspended/Cancelled/Voided), the date grain storage is paid through, the start date of storage, the tariff rate of storage, the date the EWR was suspended, the tariff charge for a unit of grain, the Quality Factor—Test Weight of the grain, the Quality Factor—Percentage of Total Defects, the Quality Factor—Percentage of Total Damage, the unit of measure of the grain of EWR, the date the EWR was voided, the Quality Factor —Vomitoxin, the city of the warehouse company, the name of the warehouse company, the Sequential Row Identifier of the warehouse company, the U.S. state of the warehouse company, the license number of the warehouse company, the city where the warehouse is located, the name of the warehouse location, the Sequential Row Identifier of the warehouse, the name of the warehouse, is the warehouse operator the depositor (Yes/No), the warehouse operator lien comment, and the warehouse operator.

The Electronic Warehouse Receipt (EWR) History database file 66 is represented by the exemplary table of FIGS. 8A-8E. The exemplary table includes fields for information (or data) including, a Quality Factor—Alflatoxin, the date the EWR was Cancelled, the rail car number (No.) that contains the grain of the subject EWR, collateral for the EWR, comments to be entered into the EWR, the container holding grain for this EWR, the date the EWR was converted from paper (a traditional warehouse receipt), the year of the crop covered by this EWR, the city of the delivery warehouse, the county of the delivery warehouse, the U.S. state of the delivery warehouse, Dockage (in Pounds), Dockage Percentage, the number of the EWR, the prefix of the licensing authority, the Sequential Row Identifier for the EWR, the County Code of the Farm, the State Code of the Farm, the Quality Factor—Foreign Material Percentage, the status of delivery of the EWR to a Board of Trade or exchange, such as the Chicago Board of Trade (CBOT), the FSA Farm Number, the statement for the grade of the grain, the class of the grain for the EWR, the grade of the Grain for the EWR, the subclass of the grain for the EWR, the type of grain for the EWR, the variety of the grain for the EWR, the gross bushels of the grain for the EWR, Gross Pounds of the grain for the EWR, the Quality Factor—Percentage of Heat Damage to Grain of the EWR, the city of the holder of the EWR, the name of the holder of the EWR, the Sequential Row Identifier of the holder of the EWR, the date the holder became the holder of the EWR, the name of the holder's storage facility, the Sequential Row Identifier of the holder's storage facility, the U.S. state of the holder, the Inspection Certificate number, the insured status of the holder's location, the date the EWR was issued, the name of the company issuing the EWR, the Sequential Row Identifier of the company issuing the EWR, the name of the location associated with the issued EWR, the Sequential Row Identifier of the location associated with the issued EWR, the name of the Issuer, the Sequential Row Identifier of the issuer, a legal statement, the amount of the Loadout Charges, Loadout Charges Paid (Yes/No), the lot number of the grain of the EWR, the Quality Factor—Moisture Percentage of the grain of the EWR, Negotiable Receipt (Yes/No), Net Bushels of grain, Net Pounds of grain, the balance of the grain remaining on the EWR, the Quality Factor—Other Quality Factor (percentage thereof), any other special quality of the grain, the paper number (No.) of the paper receipt that is replacing the EWR, the amount of prepaid storage charges for the grain of the EWR, the name of the company of the previous holder of the EWR, the Sequential Row Identifier of the previous company holder of the EWR, the location name associated with the previous holder of the EWR, the Sequential Row Identifier of the previous Company Holder of the EWR, the name of the grain producer associated with the EWR, the Quality Factor—Protein Percentage of the grain of the EWR, the Quality Factor—Dockage Percentage of the grain received, the gross amount of bushels of grain received, pounds of the grain received, moisture percentage of the grain received, the date the EWR was last modified, the name of the user who modified the EWR, the Sequential Row Identifier for the last user who modified the EWR, the date the EWR was received, the user the EWR was received from, the name of the location the grain was received from, the Sequential Row Identifier of the location the grain was received from, the Sequential Row Identifier of the holder the EWR was received from, how the grain was received (Truck/Barge/Rail Car), the amount of receiving charges, were receiving charges paid (Yes/No), the status of the EWR as registered for delivery to a Board of Trade or Exchange, such as the Chicago Board of Trade (CBOT), a remarks section, Sequential Row Identifier, the Quality Factor—Shrunken and Broken Percentage, the status of the EWR (Open/Suspended/Cancelled/Voided), the date grain storage is paid through, the start date of storage, the tariff rate of storage, the date the EWR was suspended, the tariff charge for a unit of grain, the Quality Factor—Test Weight of the grain, the time and date stamp (timestamp) of the issuance of the EWR from the system (control system 30), the Quality Factor—Percentage of Total Defects, the Quality Factor—Percentage of Total Damage, the unit of measure of the grain of EWR, the date the EWR was voided, the Quality Factor—Vomitoxin, the city of the warehouse company, the name of the warehouse company, the Sequential Row Identifier of the warehouse company, the U.S. state of the warehouse company, the license number of the warehouse company, the city where the warehouse is located, the name of the warehouse location, the Sequential Row Identifier of the warehouse, the name of the warehouse, is the warehouse operator the depositor (Yes/No), the warehouse operator lien comment, and the warehouse operator.

The Daily Position Report database file 67a is represented by the exemplary table of FIG. 9. The exemplary table includes fields for information (or data) including, client number, grain, company identification (ID) number, if the position is negotiable (Yes/No), if the position is non-negotiable (Yes/No), company owned obligation, unique row identifier, the identification No. in the Daily Position Table Record, the type of grain, in house inventory, measurement unit for the grain, negotiable obligations, non-negotiable obligations, open storage obligations, redeposited inventory, total inventory, total obligations identification No. as Per the Company Table (FIG. 3), Unique Row Identifier, license No. of company, name of person making the report, the date of the report, and, the title of the person making the report.

The Long/Short Market Position Report database file 67b is represented by the exemplary tables (Table I and Table II) of FIG. 10. Table I, the first exemplary table, includes fields for information (or data) including, the type of grain, price later received, price later shipped, Unique Row Identifier, references to the market position, unit of measurement for the grain, miscellaneous long position, miscellaneous short position, Net Long/Short Position, open cash purchase contracts, open cash sales contracts, open future purchases, open future sales, receipted inventory, regular position limits, and, unreceipted inventory.

Table II, the second exemplary table, includes fields for information (or data) including, identification No. of the Company in the system (control system 30), grain dealer license No., Unique Row Identifier, name of the person making the report, section for remarks, the date of the report, and, the title of the person making the report.

The Working Capital Report database file 67c is represented by the exemplary table of FIGS. 11A-11C. The exemplary table includes fields for information (or data) including, accounts payable assets, accounts payable liabilities, accounts receivable assets, accounts receivable liabilities, advance paid assets, advance paid liabilities, advance received assets, advance received liabilities, cash on hand—assets, cash on hand—liabilities, Commodity Credit Corp. code, company identification number in the system (the control system 30), customer prepaid assets, customer prepaid liabilities, customer prepaid other assets, customer prepaid other liabilities, encumbrance assets, encumbrance liabilities, barley assets, barley liabilities, canola assets, canola liabilities, corn assets, corn liabilities, flaxseed Assets, flaxseed Liabilities, grain dealer license No., oats assets, oats liabilities, other grains, other grains assets, other grains liabilities, grain receivables assets, grain receivables liabilities, rice assets, rice liabilities, rye assets, rye liabilities, sorghum assets, sorghum liabilities, soybeans assets, soybeans liabilities, sunflower seed (or sunflower) assets, sunflower seed liabilities, tritacale assets, tritacale liabilities, wheat assets, wheat liabilities, license type, long term notes assets, long term notes liabilities, margin accounts, margin accounts assets, margin accounts liabilities, miscellaneous, miscellaneous assets, miscellaneous liabilities, net cash assets, net cash liabilities, net contract assets, net contract liabilities, net equity assets, net equity liabilities, net working capital assets, net working capital liabilities, other payables, net payables assets, net payables liabilities, Price Later grain received assets, Price Later grain received liabilities, Price Later grain shipped assets, Price Later grain shipped liabilities, processed grain assets, processed grain description, processed grain liabilities, space for remarks, date of the report, short term investment assets, short term investment description, short term investment liabilities, short term notes assets, short term notes liabilities, title, total assets of the reporting entity, total liabilities of the reporting entity, name of the user (person) making the report, the warehouse license number (No.), and, the Unique Row Identifier.

The Grain Assets vs. Gain Liabilities Report database file 67d is represented by the exemplary table of FIG. 12. The exemplary table includes fields for information (or data) including, advances paid, advances received, balances, current amount of cash, Commodity Credit Corp. (CCC) code, company identification in the system (control system 30), Unique Row Identifier, grain payables, other grain assets, other grain asset value, license No. of the grain dealer, present inventory of grain, other grain liabilities, other value for grain liability, grain receivables, hedging accounts, type of license, name of the person making the report, received Price Later, shipped Price Later, reconciled account value, reconciled account number, date of the report, storage obligations, title of the person making the report, total grain assets, total grain liabilities, and, warehouse license number.

The fields in the database files 61-67*d* are exemplary, and subject to change, should federal, state laws, or local laws, or customary industry practices change with regard to price later contracts, EWRs and reports. Similarly, should the laws or customary industry practices change, the fields can be modified, added, or subtracted to accommodate changes in the laws and regulations or industry customs, associated with the requisite grain.

Overview of the System

Figure 13A:
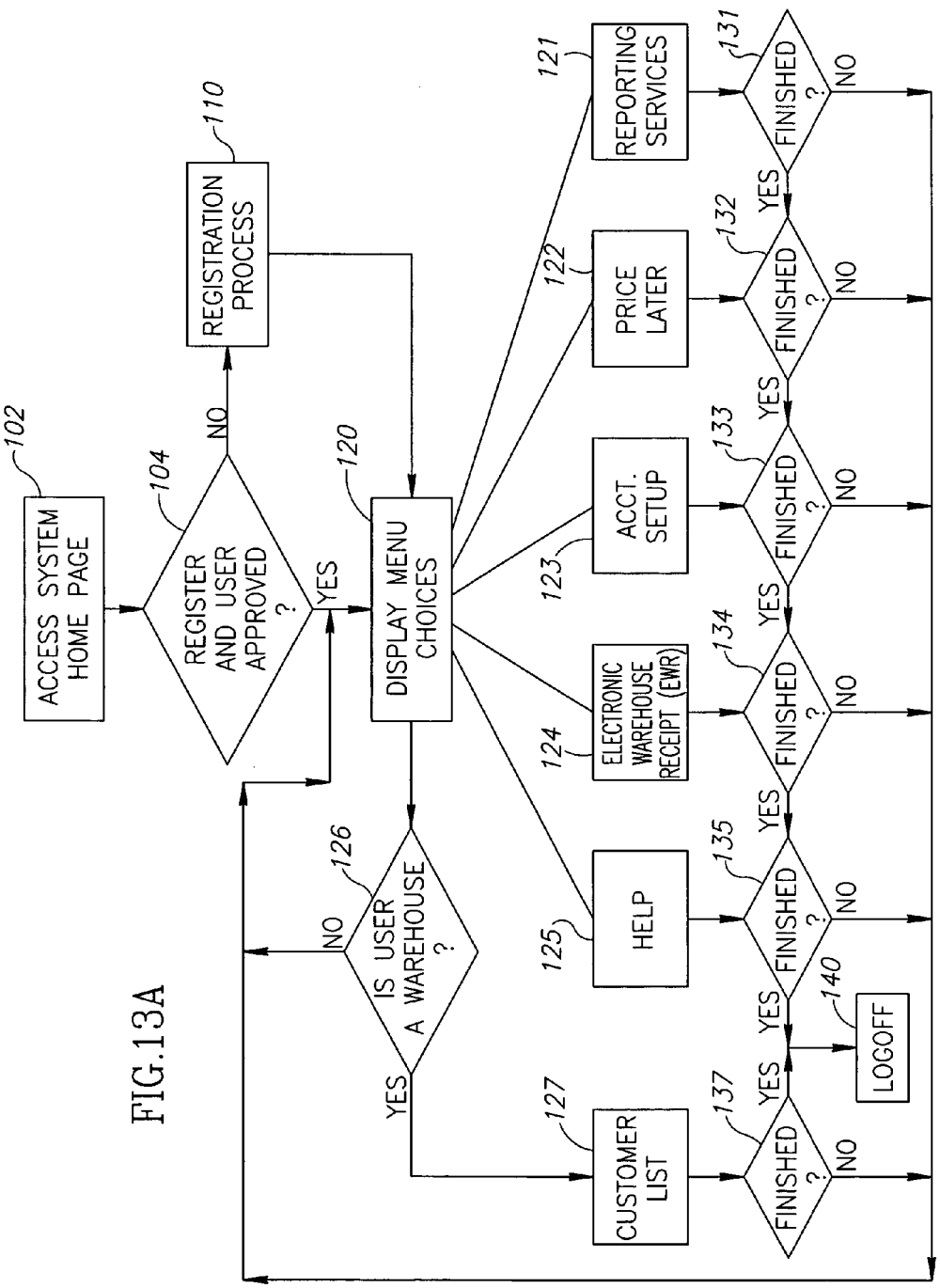
FIG. 13A is a flow diagram of the overall process performed by the system in accordance with an embodiment of the invention.
Figure 13B:
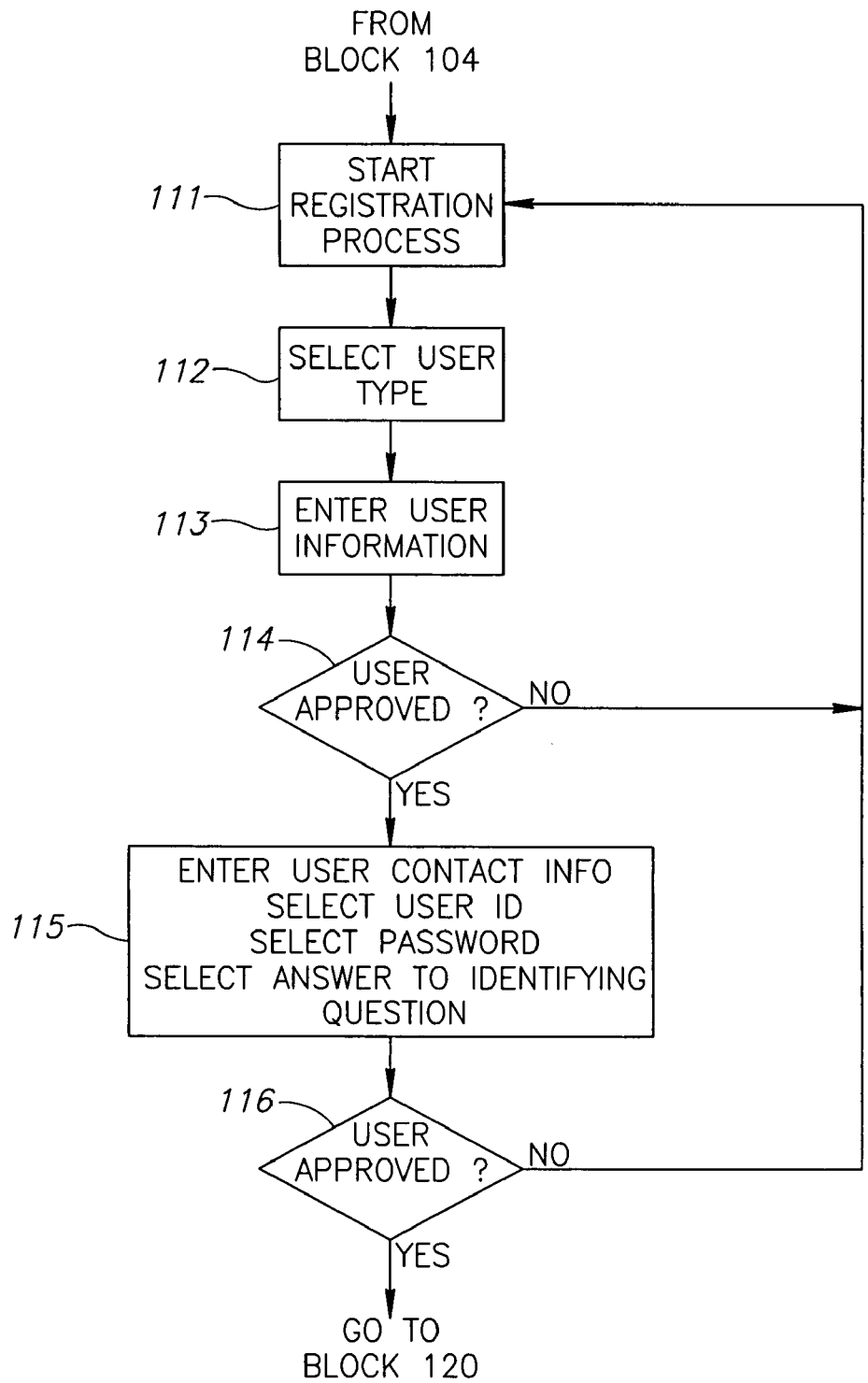
FIG. 13B is a detailed flow diagram for the registration process (block 110) of FIG. 13A.

FIG. 13A is a flow diagram that includes the flow diagram of the registration process of FIG. 13B. Initially, the user, as represented, for example, by their respective nodes 32-38, accesses the control system 30, and typically the home server 50, over the network 24, such as the Internet 25, at block 102. The user inputs data, that matches stored data in the control system 30, to see if the user is registered with the control system 30 and approved for access to the control system 30, at block 104. If the user is not registered, or registered but not approved, because there is not a match of user inputted data against the stored data in the control system, the user must go through a registration process, at block 110, to obtain access to the system. This registration process, including its approval process for a user, is described below.

Figure 14:
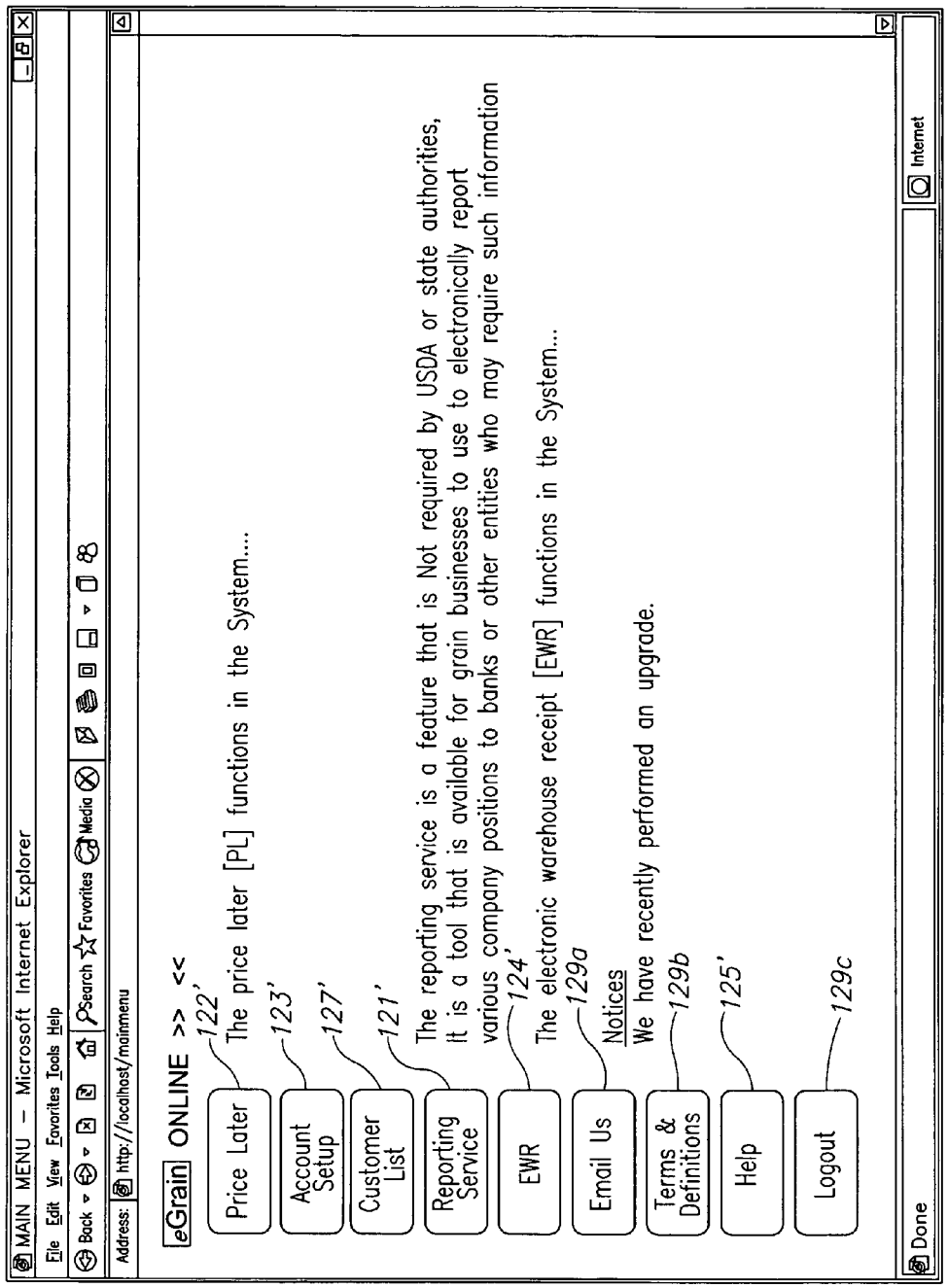
FIG. 14 is an on-screen display or screen shot of the menu choices displayed to a user of the system of the invention.

If the user is registered and approved, the process moves to block 120, where the user receives a screen display or screen shot with menu choices, for example, as shown in FIG. 14. The user choices include Reporting Services, at block 121, Price Later Contracts, at block 122, Account Setup, at block 123, Electronic Warehouse Receipts (EWRs), at block 124, and Help, at block 125. If the user is a warehouse, as per the decision block 126, the user may access customer lists, of block 127, stored in the control system 30.

These decision blocks correspond to buttons in the main menu of FIG. 14, for reporting services 121', Price Later Contracts 122', Account Setup 123', EWRs 124', help 125', and customer lists 127'. This main menu screen display of menu choices also includes buttons for e-mail 129*a*, terms and definitions 129*b*, and, logging out 129*c*. These buttons 121'-125', 127', and 129*a*-129*c* cover links (hyperlinks) for screen displays or screen shots for the activated functions. The buttons are pushed or activated and their links (hyperlinks) accessed when the user activates or "clicks" their mouse or other pointing device on the requisite button 121'-125', 127', and 129*a*-129*c*. Hereinafter, any activation of a button, link (hyperlinks) or the like in an on screen menu, screen display template, or other computer generated image appearing on the computer screen by a mouse or other pointing device, is referred to as a "click", or any other variation thereof.

If the user is not registered, the process moves to block 110, as detailed immediately above and below. The user remains in block 110, and the subprocesses therein in blocks 111-116, until registered and approved by the control system 30.

The control system 30 recognizes (typically by rules and policies programmed into the home server 50) the type of the entity for the user accessing the control system 30, for example, the types of users as per the nodes 32-38 of FIG. 1. Accordingly, when the user makes his selection, as per block 120, the menu choices of blocks 121-125 and 127 will link to templates and/or electronic documents relevant to the specific user, for which he is entitled to make transactions in or have access to, and the extent of such access (as detailed below).

The user then selects the desired menu choice of blocks 121-125 and 127, and a corresponding display screen appears. This display screen provides a template of all options available to the particular user for the menu choice selected. For example, should block 122 be selected, the screen display of FIG. 17 (detailed below) appears, and the process of issuing the Price Later Contract begins, as detailed below. Similarly, should block 124 be selected, the screen display of FIG. 27 (detailed below) appears, and the process of issuing the EWR, begins, as detailed below. Should block 121 be selected, the screen display of FIG. 40 (detailed below) appears, and the process of creating the desired report begins, as detailed below.

Once the user has completed the process associated with the requisite menu choice, there is a decision block 131-135 and 137, to see if the user is finished. If the user is not finished, and would like to pursue another menu choice, the process returns to block 120. If the user is finished, the process ends with a user logoff, at block 140.

Turning back to block 110 and FIG. 13B, the registration process is detailed. The process starts at block 111. The process moves to block 112, where the user selects the type of user that they are, for example, as per the nodes 32-38 of FIG. 1.

The user then enters their information, at block 113. If the user is a grain producer, as entered as per block 112, block 113 includes an authentication process. Specifically, the grain producer must enter three data items of: an Account Number; their name in the Control System 30; and, a randomly generated number. These three data items are provided to the grain producer by the warehouse (grain business) that signs up the producer. The warehouse sends these three data items to the control system 30 through the system 20, and provides the grain producer with these three data items. The grain producer then enters these three items, and if they match the corresponding stored items in the control system 30, typically in the home server 50 (or the associated storage media 52), as per block 114, the process moves to block 115. If there is not a match, there is not an approval at block 114, and the process returns to block 111.

At block 113, if the user is a user other than a grain producer, for example, as represented by nodes 33-38 of FIG. 1, the authentication process involves an approval of the user by the system administrator, and the system administrator activating the user in the control system 30. For example, Grain Business (node 33) is authenticated by providing copies of their licenses to the system administrator, along with proof of address. State and Federal Authorities (node 34) and FSA Price Support Offices (node 37) must designate names of actual users. Offline Data capture (node 35) is authenticated at the discretion of the System Administrator. Banks and Lenders (node 36) are authenticated by providing copies of their licenses, and typically providing names of actual users. Other Users (node 38) are authenticated by providing copies of any applicable licenses, plus proof of address. These authentications are typically off-line, and these users will only have access to the control system 30 once their accounts are created in the control system 30 and activated by the system administrator. If the user account is activated, the user is approved at block 114, and the process moves to block 115. However, if the user account is not activated in the control system 30, there is not an approval at block 114, and the process returns to block 111.

The process moves to block 115, where the user then enters their user contact information. This user contact information is typically in three parts: a User Identification (ID); a password; and, an answer to an identifying question. The process moves to block 116, where if the three pieces of entered data match those stored in the control system 30 for that user, the user is approved, and the process moves to block 120. Otherwise, the user is not approved, and the process returns to block 111. The user is not allowed to proceed further in the system, and typically after a predetermined number of failures, for example, three, the user is completely locked out of the system.

Figure 15:
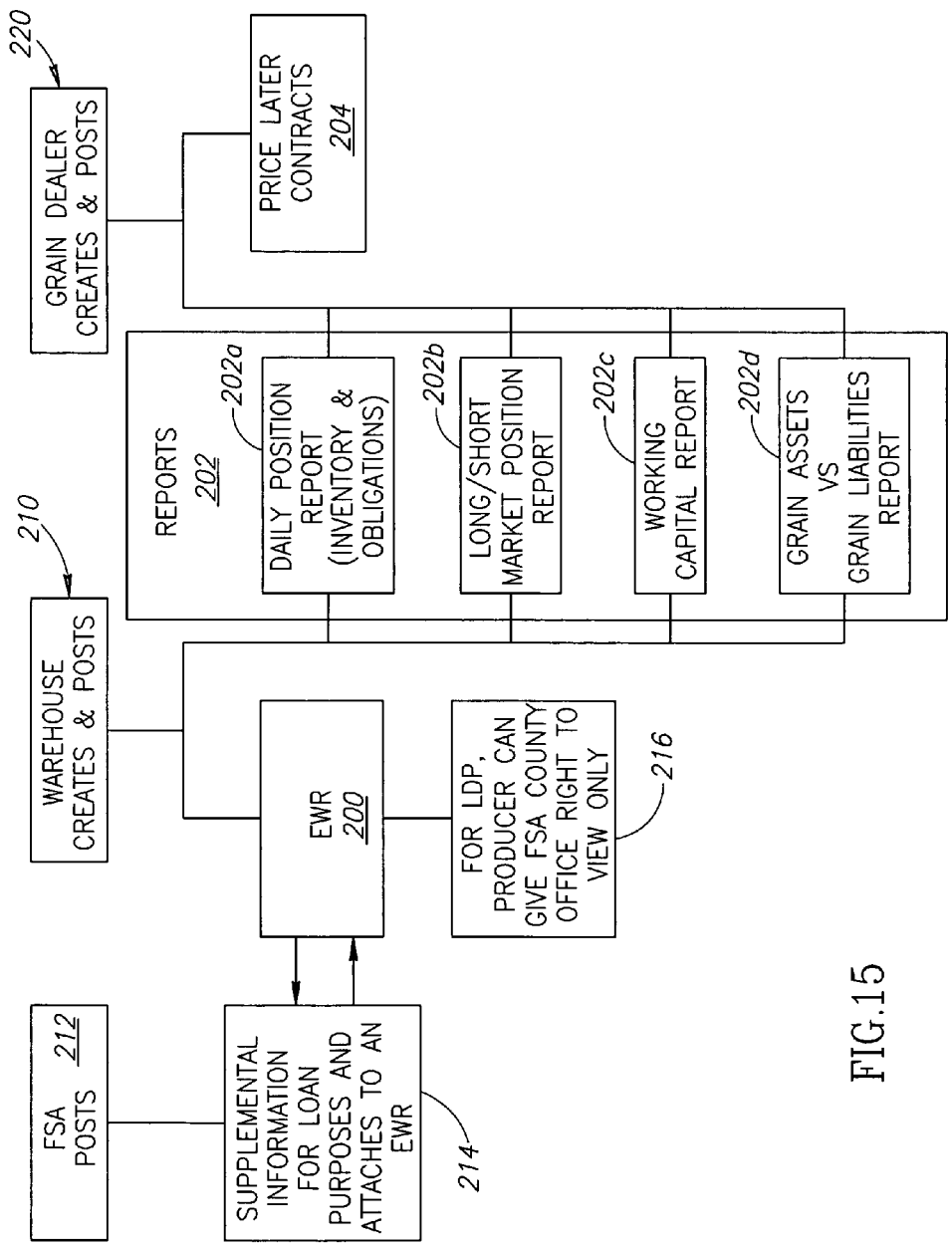
FIG. 15 is a schematic diagram of an embodiment of the invention.

FIG. 15 is a schematic diagram of an overview of the control system 30. In this diagram, actions are described between users and their associated nodes and the control system (and its components). This is for description purposes only, as the actual actions in the diagram and described below, typically occur in the control system 30.

In particular, there is shown the control system 30 as it relates to the production of Electronic Warehouse Receipts (EWRs) 200, reports 202 and Price Later Credit Sales Contracts (Price Later Contracts) 204. All EWRs 200, reports 202 and Price Later Contracts 204 are accessible and viewable by Federal, State and Local Authorities (represented by, for example, node 37 of FIG. 1), in the control system 30, on-line, over the network 24.

Electronic Warehouse Receipts (EWRs) 200 are created by the grain warehouse 210 (represented by, for example, node 33 in FIG. 1). The Farm Support Agency (FSA) 212 (represented by, for example, node 37 in FIG. 1) or other Governmental lending agency has access to all EWRs issued and may add supplemental information to the EWR 200 for loans, as per block 214. In the case of a loan deficiency payment (LDP), the grain producer (represented by, for example, node 32 of FIG. 1) may instruct the home server 50 (and also the home server backup 50a) to allow access to the EWR 200 in the home server 50 (and also the home server backup 50a) for viewing only, at block 216.

Reports 202 include, for example, Daily Position Reports (for example, of inventory and obligations) 202a, Long/Short Market Position Reports 202b, Working Capital Reports 202c, and Grain Assets Against Grain Liabilities Reports 202d. These reports are created and posted by the warehouse 202 and the grain dealers 220 (both the warehouse and grain dealers being grain businesses represented, for example, by node 33 of FIG. 1). As stated above, the warehouse and grain dealers may be the same or different entities, but are typically the same entity.

Price Later Contracts 210 are created and posted by the grain dealers 220. These grain dealers are typically the grain businesses, represented, for example, by node 33 of FIG. 1.

Turning also to FIG. 1, the control system 30, and typically the home server 50 (and its backup server 50a) is programmed to provide users, at their respective nodes, with access to various Price Later Contracts, Electronic Warehouse Receipts (EWRs) and Reports, stored in the control system 30 (typically in the home server 50 and its backup server 50a), or apparatus associated therewith. An exemplary set of rules and policies programmed into the home server 50 (and its backup server 50a), for allowing users of the system 20, represented by their respective nodes 32-38, access to these electronic documents, may as follows. Other sets of rules and policies are also permissible, and the home server 50 (and its backup server 50a) may be reprogrammed at any time to accommodate for any changes in the law, or in accordance with changes in practices of the grain industry.

With respect to Price Later Contracts, these contracts are accessible, and therefore, can only be viewed by the individual grain business, represented by, for example, node 33, that issued the specific Price Later Contract, and the individual grain producer, represented by, for example, node 32, to whom the specific Price Later Contract was issued. Similarly, if the grain producer (node 32) does not hold the Price Later Contract, or the Price Later Contract has been voided, or settled (and subsequently cancelled), the grain producer (node 32) typically only has access to historical data, such as contract number, commodity, amount (typically in bushels), etc., for the Price Later Contracts that they held. Similarly, for voided and settled (and subsequently cancelled) Price Later Contracts, the grain business (node 33) only has access to historical data, such as such as contract number, commodity, amount (typically in bushels), etc., for the Price Later Contracts that they issued.

The entire history of a Price Later Contract, including the Price Later Contract itself, is stored in the control system 30, typically at the home server 50 and its backup server 50a (and/or the associated storage media 52).

Electronic Warehouse Receipts (EWRs) are accessible by various entities represented by various nodes 32-38 on the system 20 as follows. Grain producers, represented, for example, by node 32, have access to complete EWRs for the EWRs that they presently hold, and typically limited access, such as access to historical data, such as, the receipt number, the commodity, the amount of the commodity on the receipt (typically in bushels), the date they passed the receipt to a new holder, for EWRs they previously held. This same type of access to EWRs is also true for grain business (that are not EWR issuers), represented, for example, by node 33, Banks/Lenders, represented, for example, by node 36, and other users, for example, exchanges, boards of trade and the like, represented, for example by node 38.

Grain businesses, represented, for example, by node 33, for example, warehouses that issue EWRs, have full access to all EWRs that they issued, presently hold or cancelled. These grain businesses typically only have access to historical data for EWRs that they previously held. This historical data may include, for example, any data they put into the EWR when they created it, the receipt number, the commodity, the amount of the commodity on the receipt (typically in bushels), and the date they passed the receipt to a new holder.

State and Federal Authorities, such as licensing authorities, inspectors, regulators and other government authorities, represented, for example, by node 34, have access to all EWRs stored in the control system 30. In particular, all federal authorities have access to all EWRs issued by all federally licensed grain businesses, typically federally licensed warehouses or other storage facilities, or those warehouses and storage facilities subject to the Uniform Grain and Rice Storage Agreement (UGRSA). Similarly, state authorities (including county and other local authorities) have access to all EWRs issued by all state licensed grain businesses, typically state licensed warehouses or other storage facilities.

The Farm Service Agency (FSA) (a branch of the United States Department of Agriculture), State and County Farm service offices, represented, for example, by node 37, has access to all EWRs issued for purposes of Loan Deficiency Payments (LDP) or a loan on an LDP, as well as any EWRs affected by Federal and/or State loans. An LDP may serve as the purpose of issuing the EWR. These entities also have access to EWRs that they hold, as well as access, typically historical data, as detailed above, for EWRs that they have held.

Additionally, as detailed below, EWR's are such that they can be transferred to a new holder, typically by being pushed from the previous holder to the new holder, the previous holder and the new holder being one of the nodes 32-38 detailed above. The entire history of this transaction, including the EWRs itself, before and after transfer is stored in the control system 30, typically at the home server 50 (and its backup server 50a).

Reports 202, including Reporting Services Reports, are electronic documents in the control system 30, that are read only documents once created. The creator of the report, for example, the warehouse or grain business, represented, for example, by node 33 of FIG. 1, can specify, to the control system 30, typically the home server 50 (and its backup server 50a), the other users of the system (represented by the nodes 32-38), that are permitted access to the reports, provided the reports have been sent to the home server 50 (and its backup server 50a) by the entity that created the report.

Price Later Contracts

Figure 16A:
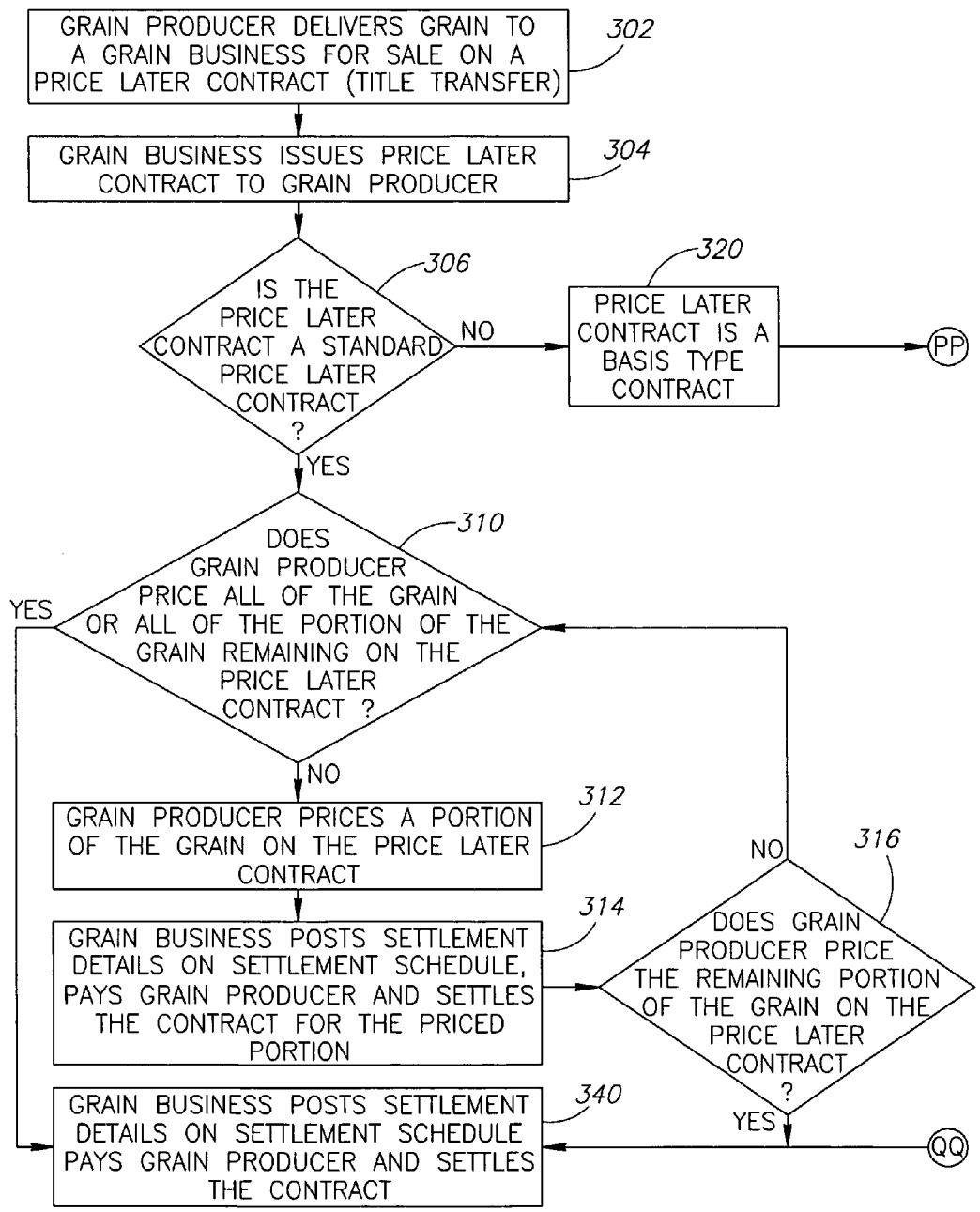
FIGS. 16A and 16B are a flow diagram of the handling of Price Later (PL) Contracts in the system in accordance with an embodiment of the invention.
Figure 16B:
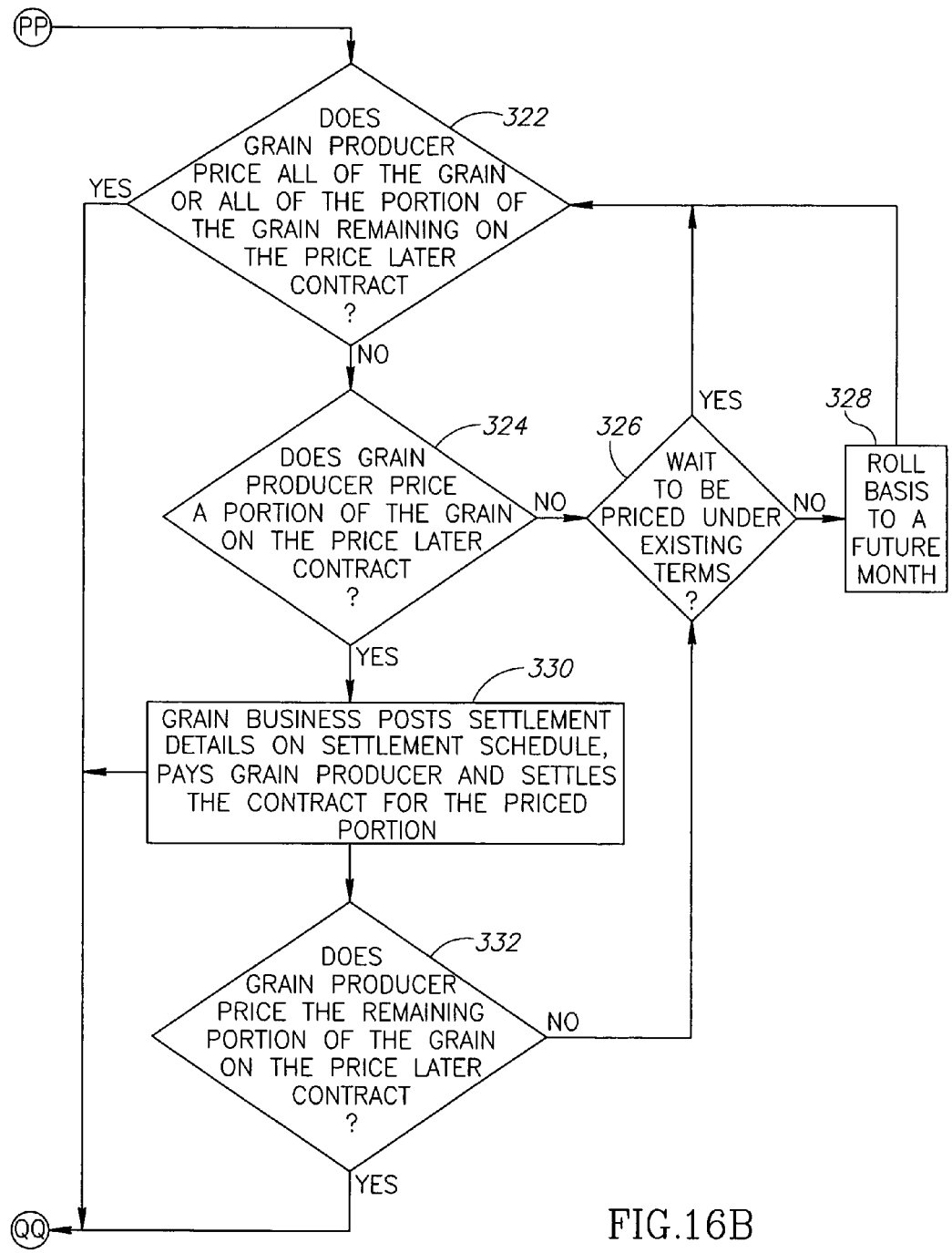

Turning to FIGS. 16A and 16B, there is a detailed flow diagram of an exemplary process associated with the issuance and settlement of Price Later (PL) Contracts. In this flow diagram, actions are described between users and their associated nodes and the control system (and its components). This is for description purposes only, as the actual actions in the flow diagram and described below typically occur in the control system 30.

Initially, at block 302, a grain producer, for example, a farmer (represented, for example, by node 32 of FIG. 1) delivers grain to a grain business (represented, for example, by node 33 of FIG. 1), such as a grain dealer or buyer, warehouse (that deals in price later contracts), or the like. The grain is delivered to the grain business for sale on a price later contract. Such a price later contract, by definition, involves a title transfer of the grain from the grain producer to the grain business. The grain buyer (grain business) issues a price later contract to the grain producer, at block 304.

In the system, blank Price Later Contracts (templates), are ordered in preset quantities (for example, multiples of 50 or 100), from the control system 30, and in particular, home server 50 and/or its associated storage media 52. However, an issuer, such as a grain business, never runs out of Price Later Contracts to issue, as additional blank Price Later Contracts (templates) are always available from the control system 30 on-line, typically by accessing the home server 50.

The process moves to block 306, where it is determined if the price later contract is a standard price later contract. Standard price later contracts, are, for example, contracts where a grain producer waits for an acceptable bid from the grain business, to whom the grain was delivered. Once a bid from the grain business is accepted, that bid price is used to settle some or all of the grain on the Standard Price Later Contract.

If the price later contract is a Standard Price Later contract, the process moves to block 310. Block 310 is a decision block, where it is determined if the grain producer prices all of the grain on the contract or all of the remaining portion of the grain on the contract. If all of the grain is priced on the contract or all of the remaining portion of the grain is priced on the contract, the process moves to block 340, where the grain business posts settlement details on a settlement schedule and pays the grain producer, settling the price later contract.

Returning to block 310, if the grain producer does not price all of the grain on the contract and does not price all of the remaining portion of the grain on the contract, the process moves to block 312. At block 312, the grain producer prices an amount of the grain on the contract. With the amount of the grain priced on the contract, the grain business posts settlement details on a settlement schedule and pays the grain producer, settling the price later contract for that amount of the grain that was priced, at block 314.

With the remaining unpriced portion of the grain on the contract, the process moves to block 316. This block is a decision block, where it is determined if the grain producer prices the remaining portion of the grain on the contract. If the grain producer prices the remaining portion of the grain on the contract, the process moves to settlement at block 340. At settlement, the grain producer (holder of the contract) receives payment on the contract from the grain business (i.e., the warehouse). Otherwise, the process returns to block 310, and continues as detailed above.

Turning back to block 306, if the price later contract is not a Standard Price Later Contract, it is a Basis Type Price Later Contract, at block 320. Basis Type Price Later Contracts are, for example, contracts where a pricing mechanism has been established, for example, an amount with relation to a futures price on a board of trade under a price (to be selected) in a specified futures month (e.g., the grain producer may set the basis to be ten cents per bushel under the monthly futures price for corn (in bushels) on the Chicago Board of Trade (CBOT)). Should the grain producer think that the price for the futures month is as high as it can get on the exchange, he calls the grain business to set the price for the grain as per the exchange, and hence, the basis (e.g., ten cents less that the exchange price on the called date per bushel) for the portion of the contract desired. The contract is settled for amount of the grain to be priced on the contract. The remaining amount, or if no amount was priced, is subject to the basis being rolled to the next futures month for that particular grain.

The process moves to the decision block 322, where it is determined if the grain producer prices all of the grain or all of the portion of the grain remaining on the price later contract.

If the grain producer prices all of the grain or all of the portion of the grain remaining on the price later contract, the process moves to block 340, where a settlement of the Basis Type Price Later Contract is made. Otherwise, the process moves to block 324, a decision block, where it is determined if the grain producer prices a portion of the grain on the price later contract.

If the grain producer does not price a portion of the grain on the price later contract, the process moves to block 326, a decision block where it is determined if the grain producer will wait to price the grain under existing terms. If the grain remaining on the contract will be priced under existing terms, the process moves to block 322, and continues as described herein. Otherwise, the process moves to block 328, where the basis of the contract is rolled (moved) to a future month. Once the basis has been rolled to a future month, the process returns to block 322, and continues as detailed herein.

Returning to block 324, if the grain producer prices a portion of the grain on the price later contract, the process moves to block 330. In block 330, the portion of the grain priced on the contract, results in the grain business posting settlement details on a settlement schedule and paying the grain producer, settling the price later contract for that portion of the grain that was priced on the Basis Type Price Later Contract. The process moves to block 332, a decision block, where it is determined if the grain producer prices the remaining portion of the grain on the Basis Type Price Later Contract. If the grain producer prices the remaining portion of the grain on the contract, the process moves to settlement at block 340. Otherwise, the process returns to block 326, and continues as detailed above.

The Price Later contract may also be voided. This voiding may occur when the Price Later Contract is in the control of the grain business, in accordance with the flow diagram of FIGS. 16A and 16B. The terms of the contract may also be changed. Again, this occurs similar to voiding, when the Price Later Contract is in the control of the grain business, in accordance with the flow diagram of FIGS. 16A and 16B.

Figure 17:
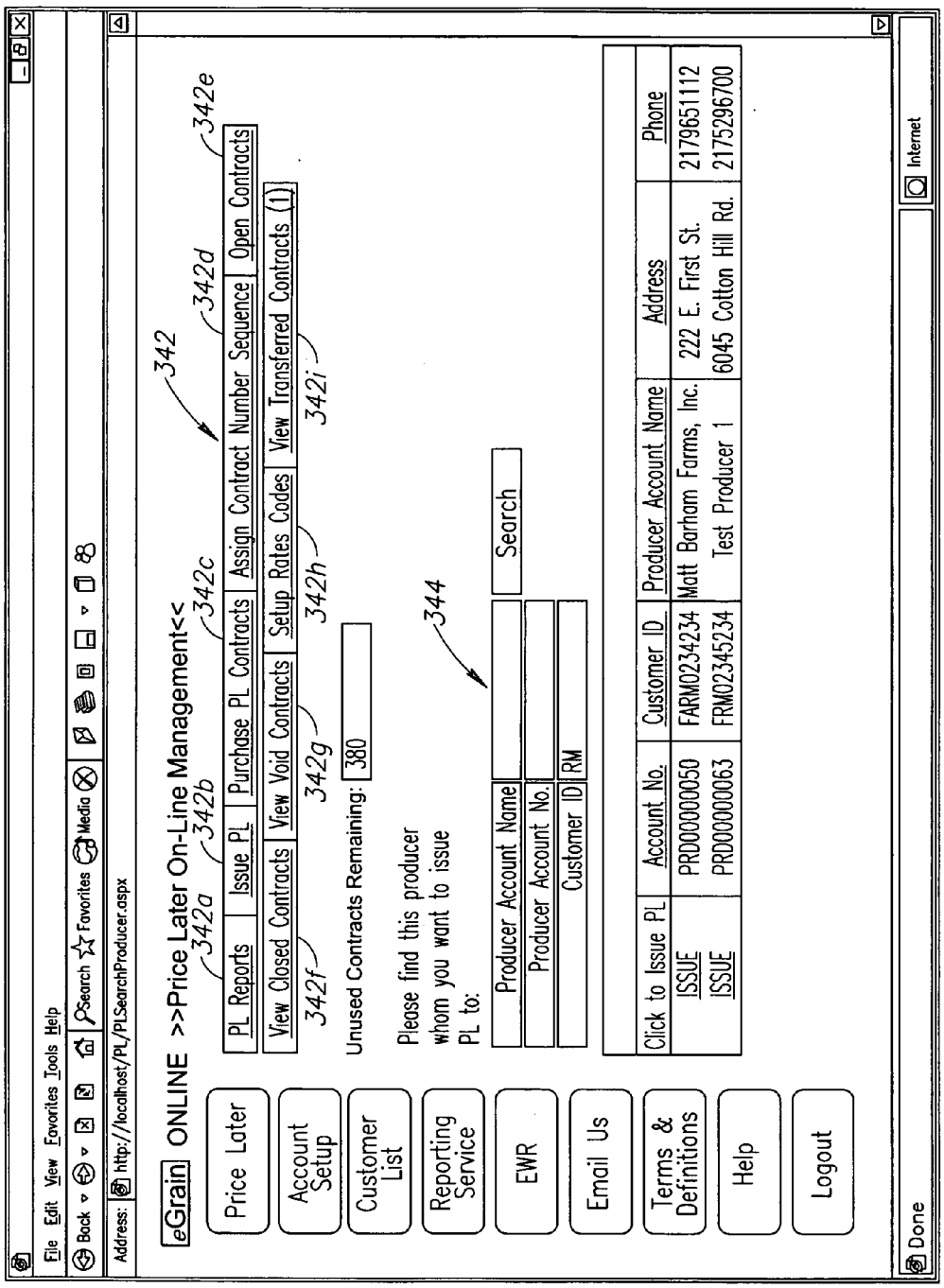

FIGS. 17-24 show screen displays or screen shots in accordance with process detailed above. FIG. 17 shows the template or screen that the user, for example, the issuer, receives when issuing the Price Later Contract, as per block 304. Here, the user has clicked button 122' of the main menu (FIG. 14) to arrive at the template of FIG. 17. This template includes a horizontal bar 342, with the links 342a-342i, for PRICE LATER (PL) REPORTS 342a, ISSUE PRICE LATER (PL) CONTRACT 342b, PURCHASE PL CONTRACTS 342c, ASSIGN CONTRACT NUMBER SEQUENCE 342d, OPEN CONTRACTS 342e, VIEW CLOSED CONTRACTS 342f, VIEW VOID CONTRACTS 342g, SET UP RATE CODES 342h, and VIEW TRANSFERRED CONTRACTS 342i. When one of these links is clicked, the user may transact Price Later contracts. Once the information as to the conditions for the Price Later Contract are entered into the template, at section 344, the issuer "clicks" on the ISSUE PL link 342b.

The issuer receives a Price Later Contract template, as shown in FIG. 18A. The user enters data or information into the required spaces, corresponding to the fields of the database file 64 (FIGS. 6A and 6B). If there are any errors or omissions in the entered conditions, the issuer will see error messages. If there are not any errors or omissions, the issuer will see two additional buttons CANCEL 352 and EDIT 354, and will be prompted onscreen, by the prompt 356 to again click the ISSUE button 358, to issue the Price Later Contract.

Figure 18B:
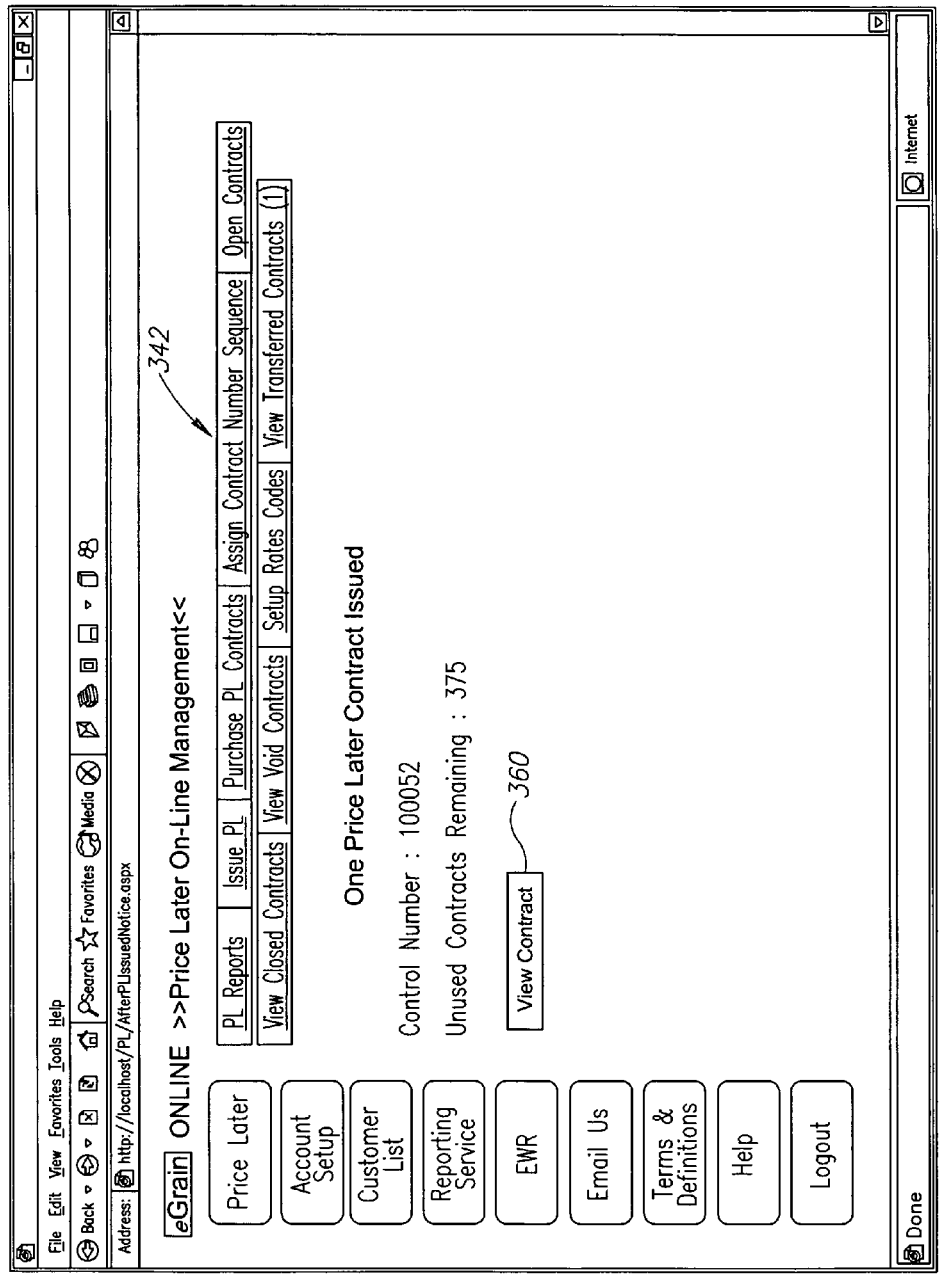

The issuer then sees the control number assigned to the contract issued and the number of unused contracts remaining, at FIG. 18B. The issuer can view the actual contract by clicking the VIEW CONTRACT button 360.

Should the issuer seek to void a Price Later contract, they click on the link for OPEN CONTRACTS 342e, and will obtain a list of open contracts, for example, in accordance with the list 361 of FIG. 19. In FIG. 19 there is a column 361b with a clickable link (hyperlink) "Void". If the "void" link (hyperlink) is selected, by clicking on this Void link, the template of FIG. 20 appears.

Figure 20:
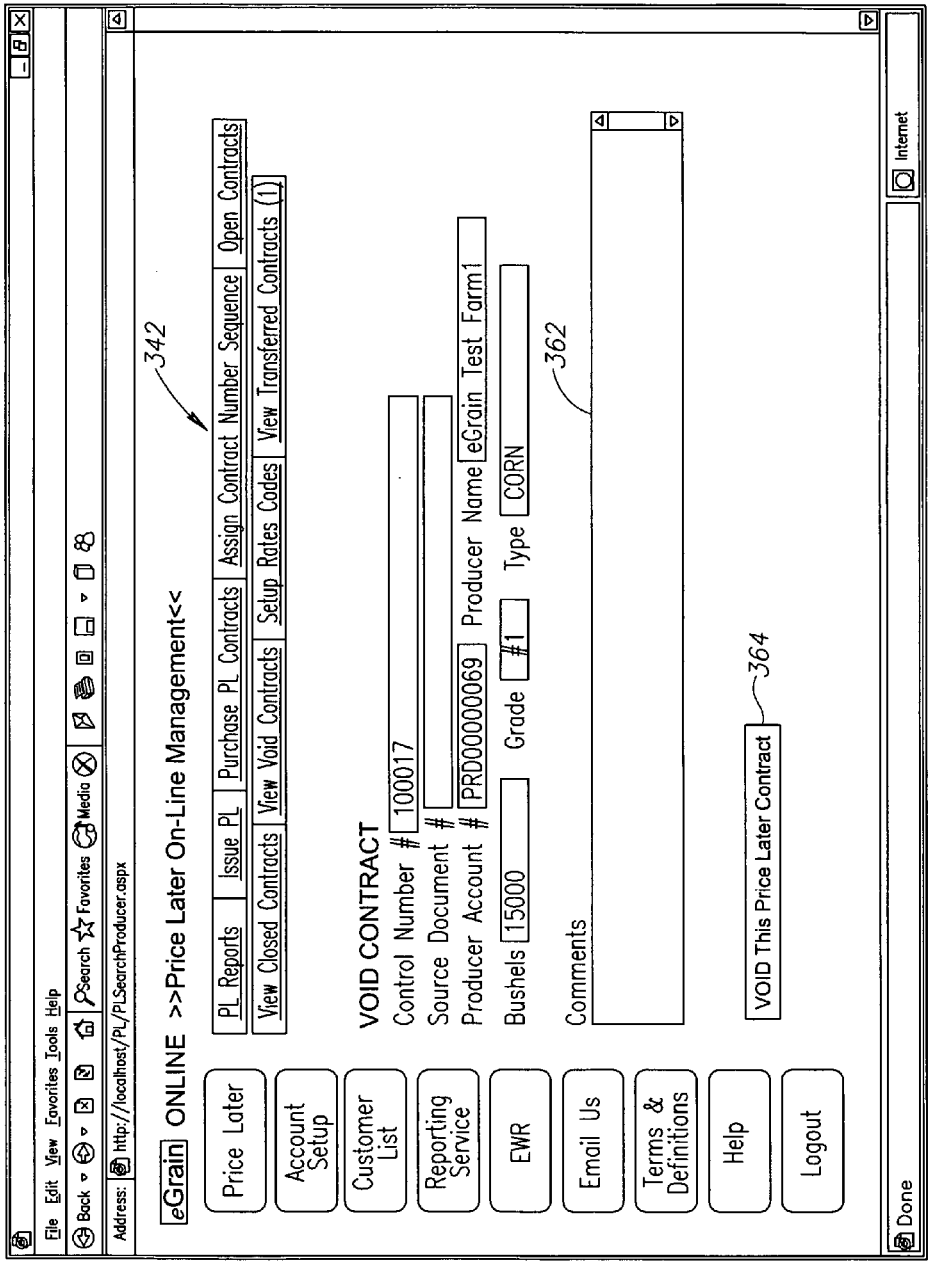

In FIG. 20, a comment as to why the contract is being voided is entered into the comment block 362. Once a VOID THIS PRICE LATER CONTRACT button 364 is clicked, the contract is voided.

Should the issuer seek to change or roll over the basis of the Price Later contract, as per block 328 of FIG. 16B, he clicks on the link for OPEN CONTRACTS 342e, and will obtain a list of open contracts, for example, the list 361 of FIG. 19. There is an option to select the clickable link "Basis", in column 361c of FIG. 19. If "Basis" is selected (by clicking on the link in the column 361c, the template of FIG. 21 appears, where the basis may be changed (rolled to the next futures month) by entering data (information) into the requisite boxes of the template, and once complete, clicking the ADD THIS AS CURRENT BASIS button 366.

Should a settlement be desired on the contact, as per blocks 314, 330 and 340, of FIGS. 16A and 16B, he clicks on the link for OPEN CONTRACTS 342e, and will obtain a list of open contracts, for example, the list 361 of FIG. 19. There is an option to select the clickable link "Settlement", at column 361c.

If the link "Settlement" is selected, the template of FIG. 22 appears, where settlement of the Price Later Contract occurs by the user by entering data (information) into the requisite boxes of the template, and clicking on the POST THIS SETTLEMENT button 368 or TRANSFER TO A NEW CONTRACT button 369.

Should a change in contract terms be desired, the user clicks on the link for OPEN CONTRACTS 342e, and will obtain a list of open contracts, for example, the list 361 of FIG. 19. There is an option to select the clickable link "Change Terms", in column 361d.

Figure 23:
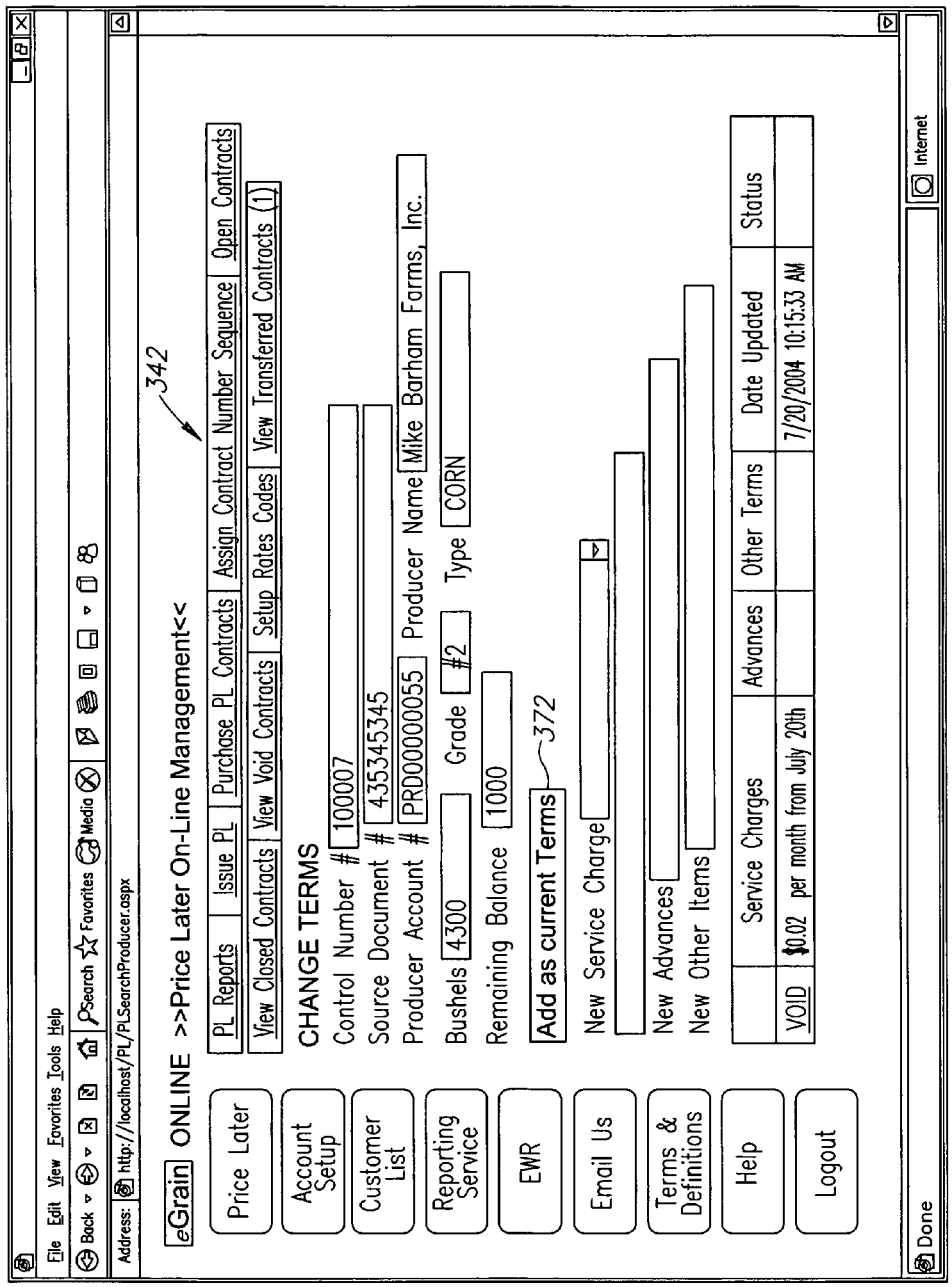

If the link "Change Terms" is selected, the template of FIG. 23 appears, where changing of contract terms occurs by the user by entering data (information) into the requisite boxes of the template, and clicking on the ADD AS CURRENT TERMS button 372.

Figure 24:
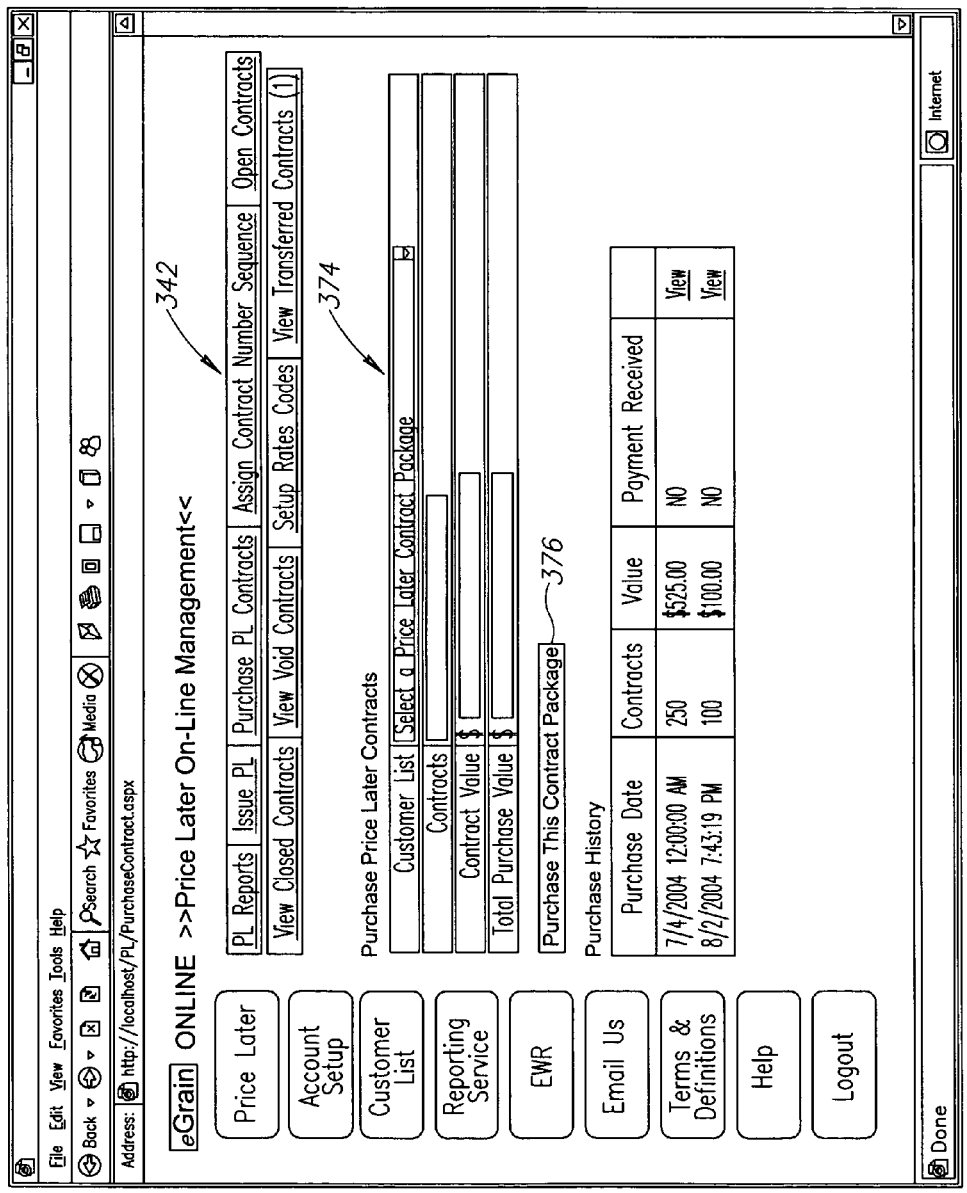

When a user seeks to purchase additional price later contracts from an issuer, they click on the PURCHASE PL CONTRACTS link 342c of the bar 342, and the screen display of FIG. 24 appears. The issuer provides data (information) into the Purchase Price Later Contracts section 374, including selecting the desired contract package. Once the section 374 is complete, the user clicks on the PURCHASE THIS CONTRACT Package button 376, and the user now has access to the corresponding number of Price Later Contract templates ordered, from the home server 50 of the control system 30, over the network 24.

Electronic Warehouse Receipts (EWRs)

Figure 25:
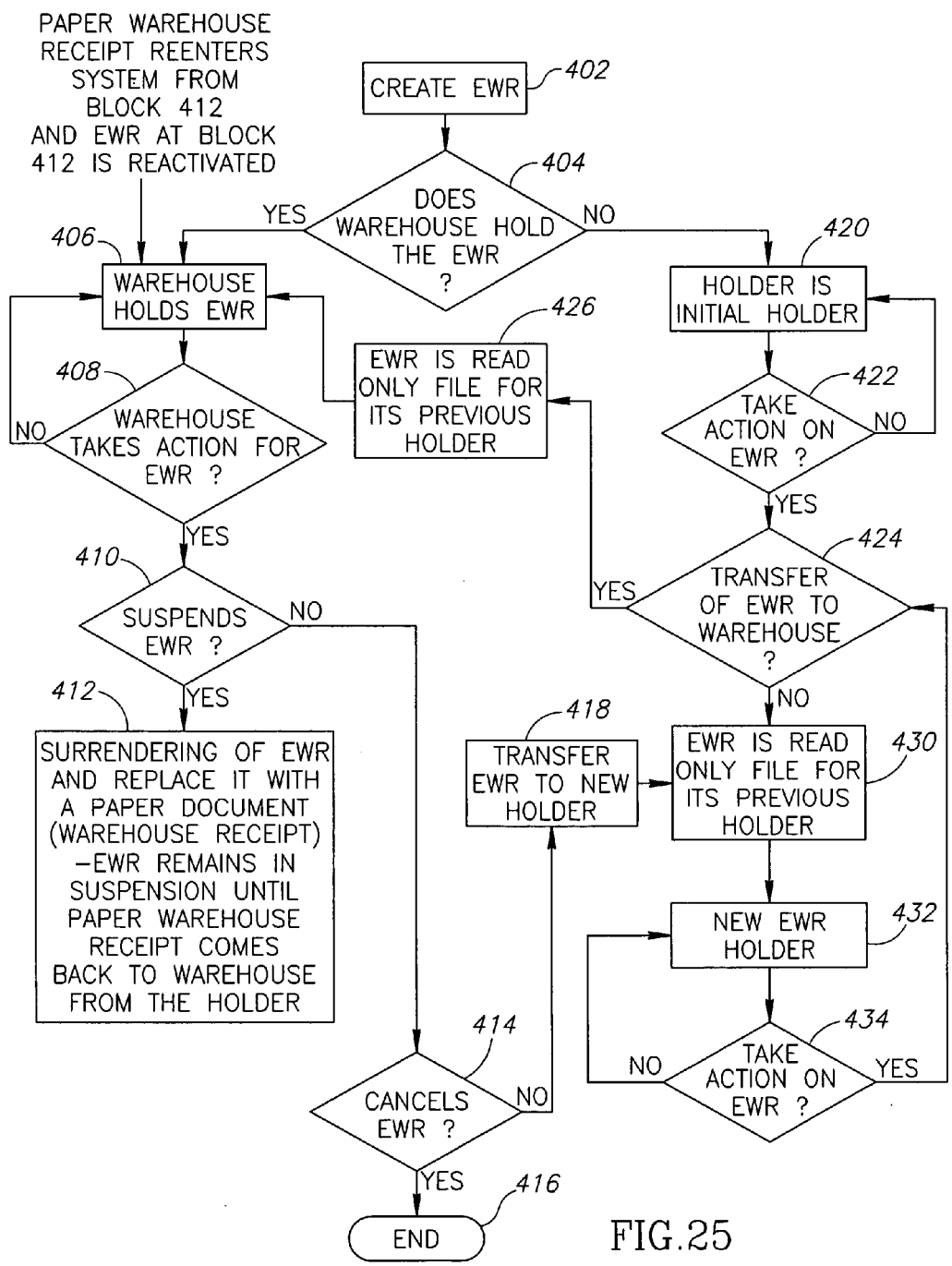
FIGS. 25 and 26 are flow diagrams of the handling of Electronic Warehouse Receipts (EWRs) in the system in accordance with an embodiment of the invention.

Turning to FIG. 25, there is detailed a flow diagram of an exemplary process associated with the issuance, processing, transacting, and cancellation of Electronic Warehouse Receipts (EWRs). In this flow diagram, actions are described between users and their associated nodes and the control system (and its components). This is for description purposes only, as the actual actions in the flow diagram and described below typically occur in the control system 30.

Initially, at block 402, an electronic warehouse receipt (EWR) is created. The EWR is created as a grain producer (node 32 of FIG. 1), delivers grain to a grain business, such as a warehouse (node 33 of FIG. 1). The warehouse, that has access to blank EWRs (typically in on-screen templates to be completed by the warehouse), receives an on-screen template from the control system 30, and typically the home server 50 (FIG. 1) (or the storage media 52 associated therewith), and completes the EWR. The warehouse then enters (pushes) the completed EWR into the control system 30 (FIG. 1), typically the home server 50 (and its backup server 50a).

In the system, blank EWRs (templates), are ordered in preset quantities (for example, multiples of 50 or 100), from the control system 30, typically home server 50 (and/or its associated storage media 52). However, an issuer, such as a warehouse, never runs out of EWRs to issue, as additional blank EWRs (templates) are always available from the home server 50 on-line, simply by accessing the home server 50. These templates remain stored on the home server 50 or storage associated therewith, such as the storage media 52, but are accessible by the node to which the issuer of the EWR is associated.

It is then determined if the warehouse is the holder of the EWR for the subject grain, at block 404. If yes, the warehouse is the holder of the EWR, as shown in block 406. At block

408, it is determined if the warehouse takes action on the EWR. If action is not taken at this time, the process returns to block 406.

If action is taken on the EWR, at block 408, the action may be a suspension of the EWR, as per the decision block 410. If the EWR is suspended, the process moves to block 412. At block 412, a suspension of the EWR involves replacing the EWR with a traditional paper warehouse receipt, and providing it to the holder, and the EWR remains in suspension until the paper warehouse receipt is returned to the warehouse from the holder. The paper warehouse receipt is eventually returned to the warehouse, where it is cancelled, and the EWR is reactivated (the suspension on the EWR is lifted), and the process returns to block 406.

Returning to block 410, if the action taken on the EWR is not a suspension, the action may be a cancellation of the EWR by the warehouse, at decision block 414. A cancellation of the EWR typically involves where the warehouse now owns the grain and cancels the EWR online, with this cancellation noted typically in the home server 50 of the control system 30 (FIG. 1). If there is a cancellation of the EWR, the process ends at block 416.

Returning to block 414, if the action is not a cancellation of the EWR, the process moves to block 418. At block 418, the warehouse transfers the EWR to a new holder, and the process moves to block 430, detailed below.

Turning back to block 404, if the warehouse that holds the grain of the subject EWR, is not the holder of the EWR, there is an initial holder at block 420. The process moves to block 422, where it is determined if the initial holder desires to take action on the EWR. If action is not taken, for example, the initial holder continues to hold the EWR, and the process returns to block 420. If the initial holder takes action on the EWR, typically by transferring the EWR to a new holder, it is determined if the EWR is to be transferred to the warehouse that holds the subject grain of the EWR, whereby the warehouse becomes the holder, at the decision block 424. If the transfer is to the warehouse, the EWR becomes a read only file for its previous holder in the home server unit 30 (FIG. 1), at block 426. The read only file is typically not the complete file, but historical data, for example, any data they entered when the EWR was created, the EWR number, the commodity, the amount of the commodity, the date they transferred the EWR to the new holder. The process then moves to block 406 (as detailed above).

Returning to block 424, if the EWR is transferred to a new holder, not the aforementioned warehouse, the process moves to block 430, the EWR becomes a read only file for its previous holder typically in the home server 50 and/or its associated storage media 52 of the control system 30 (FIG. 1). The read only file is typically not the complete file, but historical data, for example, any data they entered when the EWR was created, the EWR number, the commodity, the amount of the commodity, the date they transferred the EWR to the new holder. There is a new holder of the EWR, at block 432. If this new holder does not take action on the EWR, for example, continues to hold the EWR, as per the decision block 434, the process returns to block 432. Otherwise, action is taken, typically in the form of a transfer of the EWR, and the process returns to block 424. The process continues until the EWR is cancelled, at block 416.

Figure 26:
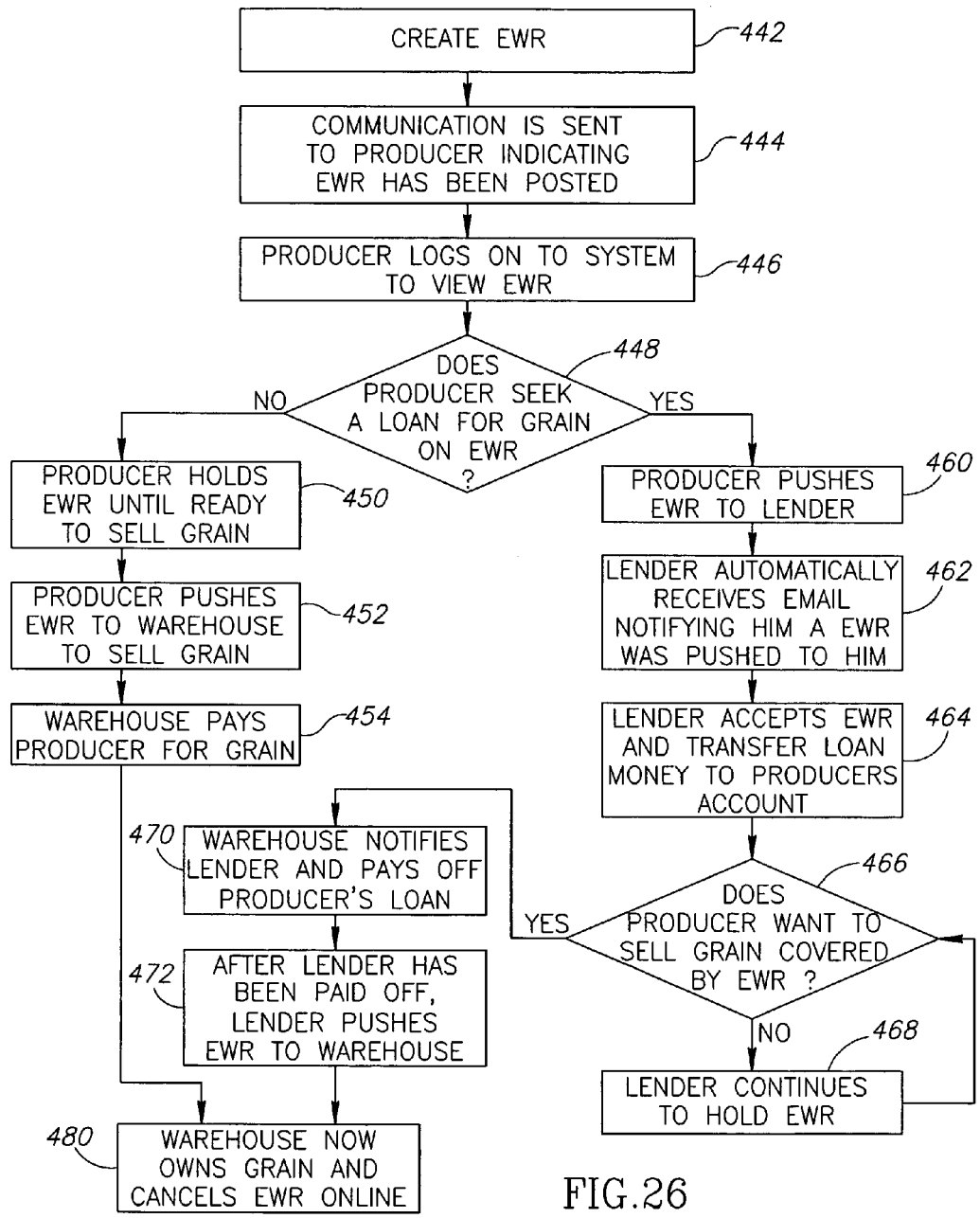

Turning to FIG. 26, there is detailed a flow diagram of for a process involving EWRs when a loan is taken against the EWR. Initially, at block 442, the EWR is created, similar to that of block 402 detailed above, and shown in FIG. 21. A communication, typically an electronic mail (e-mail) is sent to the grain producer (node 32 of FIG. 1) by the home server 50 of the control system 30, indicating that the issuing warehouse (node 33 of FIG. 1) has posted this issued EWR, at block 444. At block 446, the grain producer logs onto the system 20, and accesses the control system 30, to view the posted EWR. The process moves to block 448, where the producer decides if they will seek a loan for the grain of the EWR. This loan is typically from an FSA County Office, represented, for example, by the node 37, but may also be a bank or lender, represented, for example, by node 36 of FIG. 1.

If at block 448, a loan will not be taken against the EWR, the grain producer holds the EWR until they are ready to sell the grain, at block 450. The grain producer then pushes the EWR over the system 20 to the warehouse (node 33 of FIG. 1) to sell the grain, at block 452. The warehouse pays the producer for the grain, at block 454, and at block 480, the warehouse now owns the grain and cancels the EWR online in the control system 30.

If at block 448, a loan is to be taken against the EWR, the grain producer (represented by, for example, node 32 of FIG. 1), pushes the EWR to the lender (represented by, for example, node 36 of FIG. 1) over the system 20 (FIG. 1), at block 460. The lender automatically receives a communication, typically an e-mail over the system 20, from the control system 30, that he is now the holder of an EWR, that has been Transferred (i.e., pushed) to him, at block 462. The lender confirms that they are the holder of the EWR, and transfers funds to the grain producer's account, at block 464. This funds transfer is by conventional electronic funds transfer methods, or issuance of a check, outside of the system 20. The lender, as holder of the EWR, has a security interest in the EWR and has access to the EWR in the control system 30.

The process reaches a decision block 466, where the grain producer decides if he is selling the grain covered by the EWR. If there is not a sale, at block 468, the process returns to block 466. If there is a sale, the process moves to block 470, where by an electronic communication over the system 20, such as an e-mail, the warehouse notifies the lender, and pays off the loan taken by the grain producer. Alternately, if the grain producer pays the loan off himself, the grain producer notifies the lender, and the process continues. The funds used to satisfy this loan are transferred by conventional funds transfer methods between the warehouse (its bank account), or the grain producer (if the grain producer pays off the loan) and the lender, outside of the system 20.

With the lender now paid, the lender transfers (i.e., pushes) the EWR to the warehouse (or grain producer), over the system 20, at block 472. Alternately, if the grain producer paid off the loan, the grain producer holds the EWR, and then transfers (i.e., pushes) the EWR to the warehouse. The warehouse is now the holder of the EWR, and the process moves to block 480. At block 480, the warehouse now owns the grain and cancels the EWR online in the control system 30.

The Electronic Warehouse Receipt (EWR) may also be voided. This voiding may occur at the warehouse (grain business), by the warehouse (grain business), in accordance with the flow diagrams of FIGS. 25 and 26. Voiding of EWRs is typically rare, but is done when where the EWR is issued in error, for example, through misunderstandings, typographical errors, and the like.

FIGS. 27-34 show screen displays or screen shots in accordance with process detailed above. All users holding or have held, or issuing or have issued, are canceling or cancelled EWRs, when desiring to take any action associated with an EWR first see the screen display of FIG. 27.

Figure 27:
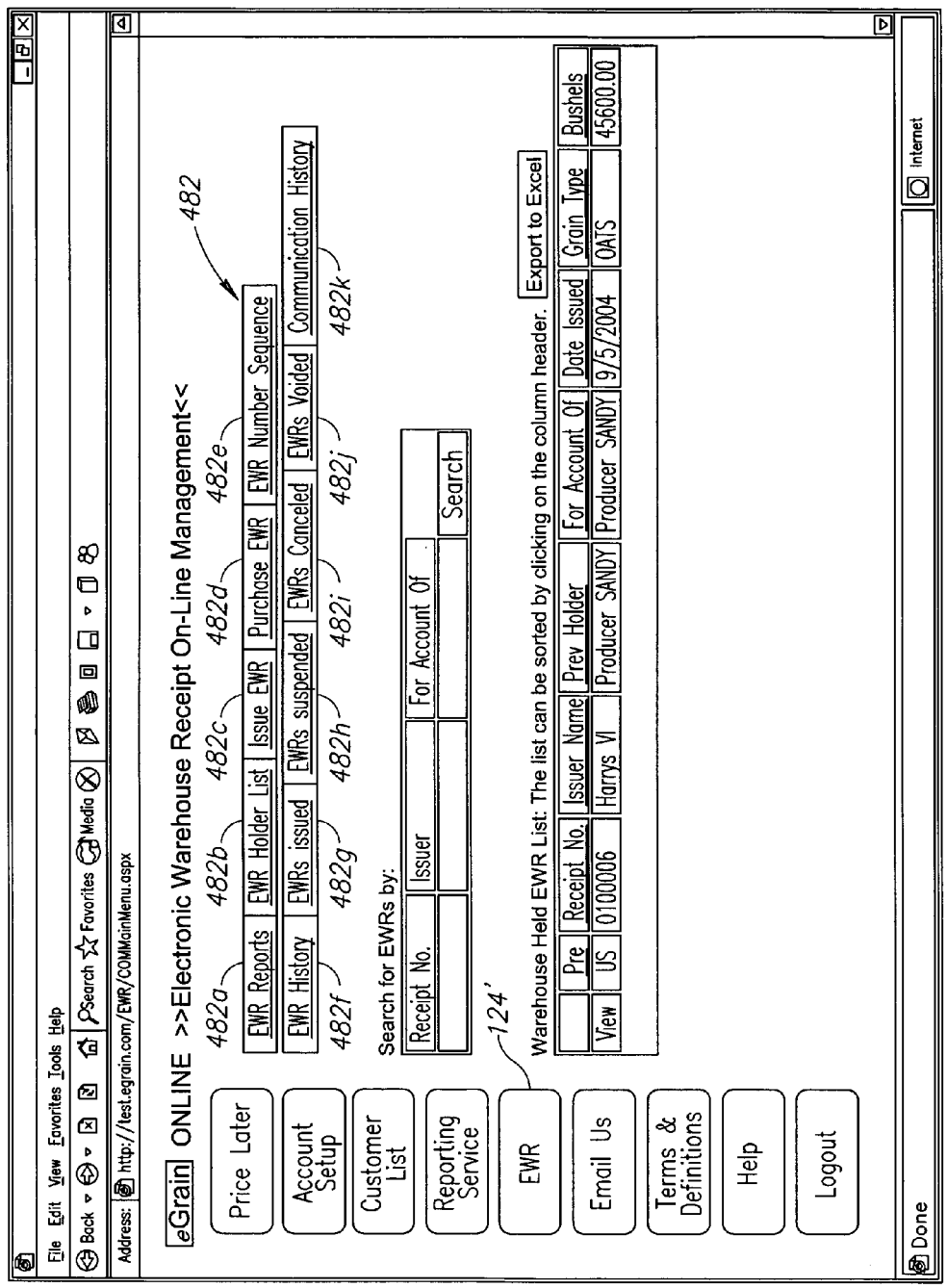

FIG. 27 shows the template or screen that the user, for example, the issuer, receives when desiring to make an EWR transaction. Here, the user has clicked button 124' of the main menu (FIG. 14) to arrive at the template of FIG. 27. This template includes a horizontal bar 482, with links (also known as hyperlinks) 482*a*-482*k*, that when clicked, allow the user to take action (transact) Electronic Warehouse Receipts (EWRs).

Figure 28:
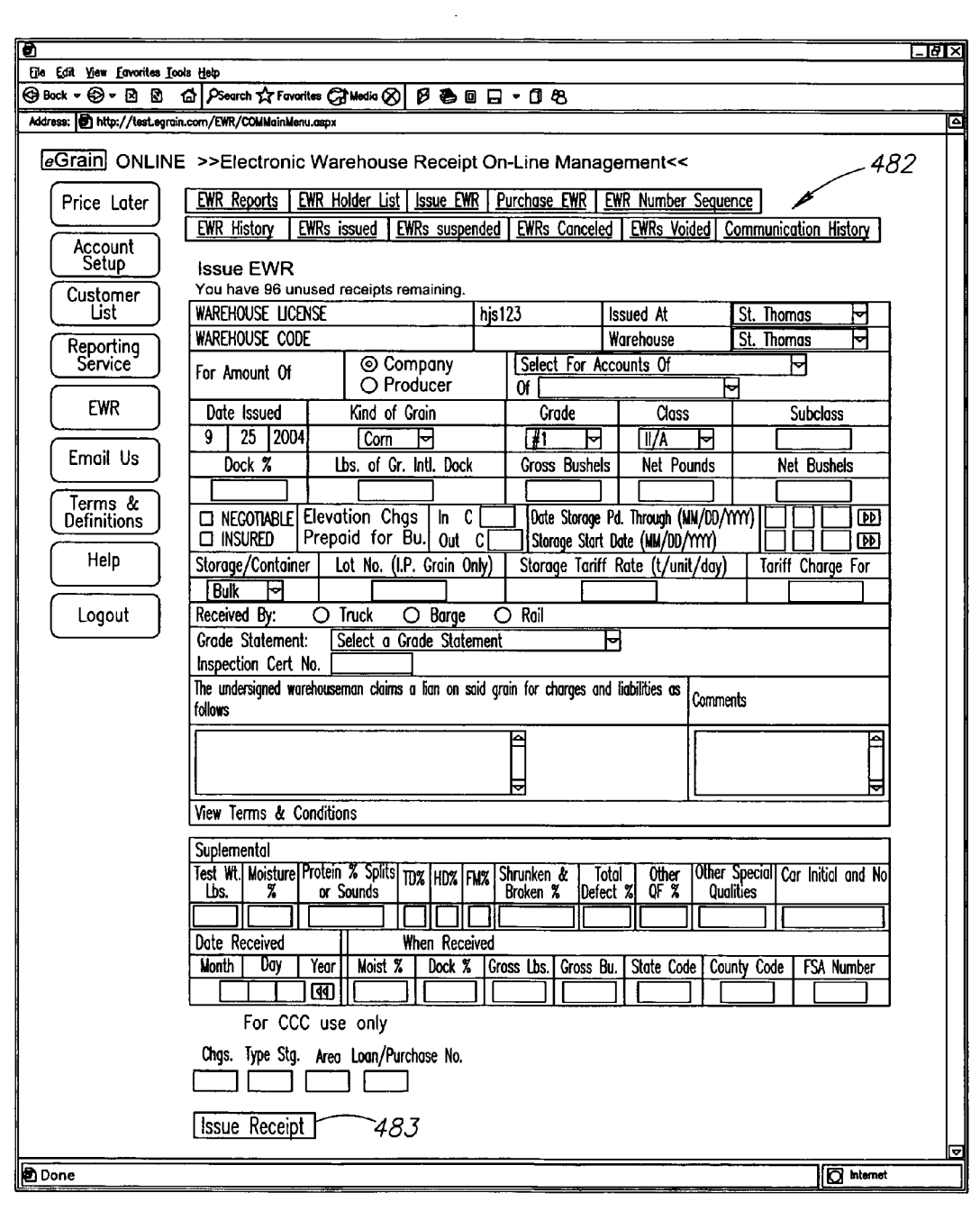

In FIG. 28, the link ISSUE EWR 482*c* of the bar 482 has been "clicked", allowing for a new EWR to be issued or created. The warehouse creating the EWR, as per blocks 402 and 442 above, fills in information in the boxes corresponding to the associated fields. These fields form the database files 65, 66 in the database 54, as shown in FIG. 2 (and detailed above). When all of the boxes have been filled, the template is complete, and the user clicks on the ISSUE RECEIPT button 483, and the EWR is now issued and stored in the home server 50 of the control system 30. Access to the EWR, from the various nodes 32-38, is controlled by rules and policies programmed into the home server, as detailed above.

Should a transfer of the holder of the EWR desired, as per blocks 418 and 425 of FIG. 25 and blocks 452 and 460 of FIG. 26, the user clicks on the link for EWR HOLDER LIST 482*b*, and will obtain a list of open EWR's that he holds and is permitted (by the rules and policies programmed into the home server 50) to transfer. An exemplary list of EWRs, that will appear on screen when the EWR HOLDER LIST link 482*b* is clicked, is shown in FIG. 29.

Figure 29:
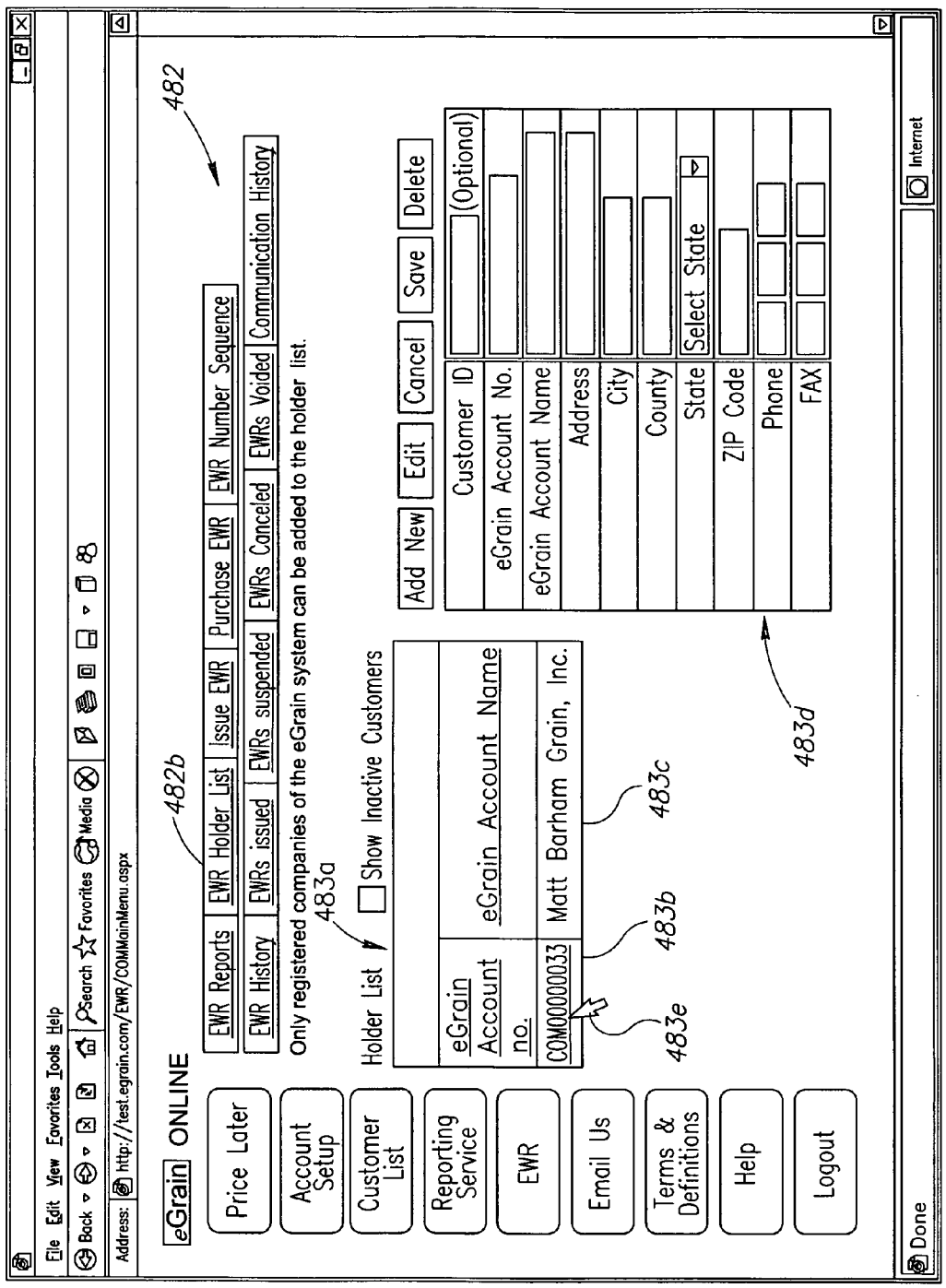

FIG. 29 shows an exemplary list 483*a*, of two columns, a column 483*b* for the account number in the system (control system 30), that also serves as a link (hyperlink), and the account name, in column 483*c*. Other columns with other identifying data and links (hyperlinks) are also permissible. There is also a space 483*d* for adding potential EWR holders to the system. When the holder desires to take action on the EWR, he clicks on account number column 483*b* (as indicated by the arrow 483*e*), that activates the underlying link.

Figure 30:
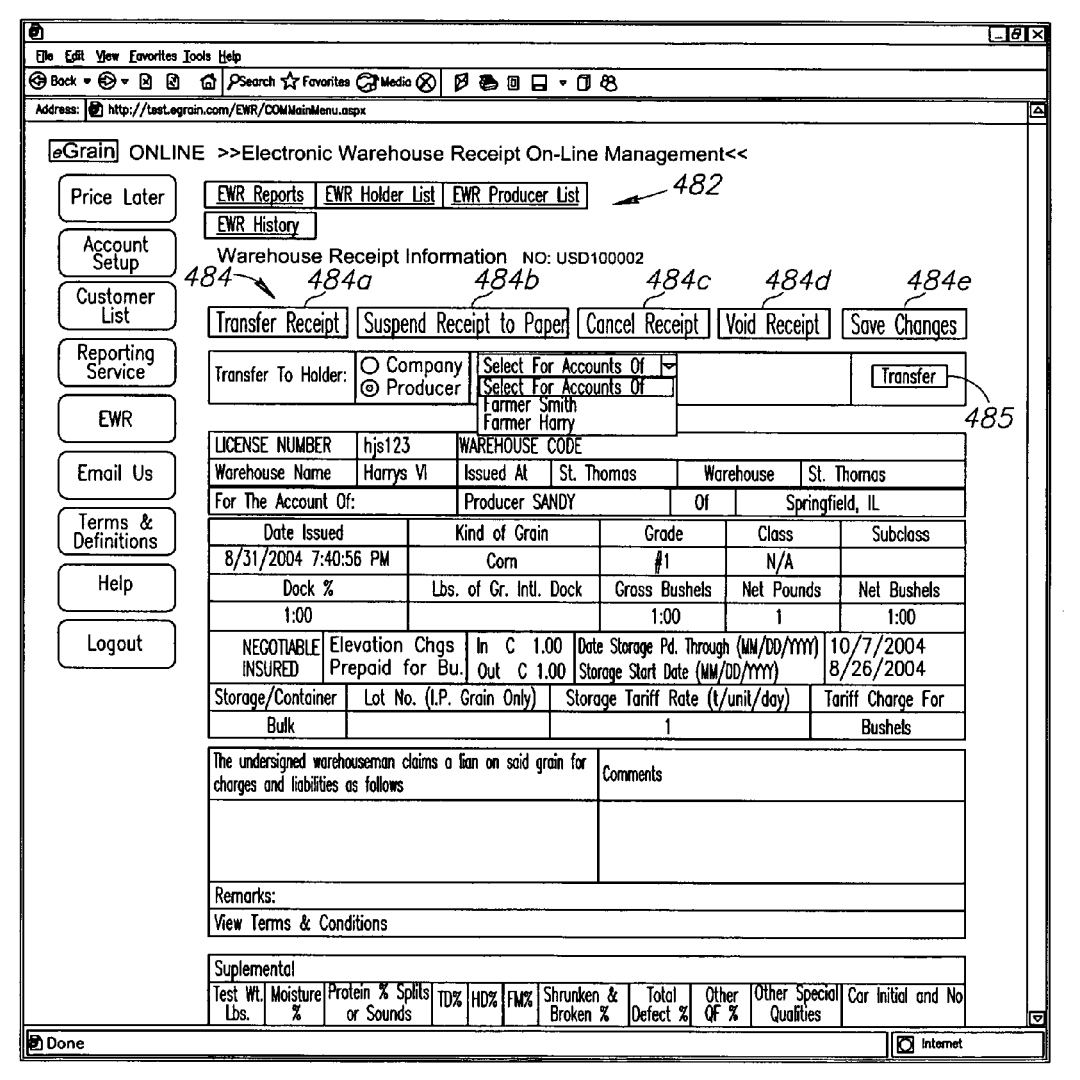

The user receives, for example, a screen display or screen shot similar to that of FIG. 30, with a bar of buttons 484 that cover links, these buttons are for TRANSFER RECEIPT 484*a*, SUSPEND RECEIPT TO PAPER 484*b*, CANCEL RECEIPT 484*c*, VOID RECEIPT 484*d*, and SAVE CHANGES 484*e*.

While the four buttons 484*a*-484*d* indicate actions, the system (control system 30) recognizes the user (and their associated node) who is taking action on the EWR. As such, in accordance with rules and policies programmed into the control system 30, only certain actions may be taken by certain users. For example, any holder may transfer an EWR that they hold to a new holder, such that clicking button 484*a* for TRANSFER RECEIPT works for all holders at nodes of the system 20. However, only a warehouse may typically suspend, cancel or void an EWR, so should the user be recognized as a non-warehouse, clicking on buttons to SUSPEND RECEIPT TO PAPER 484*b*, CANCEL RECEIPT 484*c*, and, VOID RECEIPT 484*d*, would be recognized by the control system 30 as impermissible. The requesting non-warehouse user (through their web browser), may remain at the present screen display or screen shot, receive an error message, or may be directed to another screen display or screen shot, such as the main menu of FIG. 14, or the like.

With the button for TRANSFER RECEIPT 484*a* clicked, the screen display or screen shot of FIG. 30 appears, for example, and the TRANSFER button 485 appears on screen as well as other information necessary for the transfer of the EWR to a new holder.

The holder of the EWR enters data (information) into the requisite boxes of the template, corresponding to fields in the database files 65, 66 (and Tables 7A-7E and 8A-8E). When finished, the user clicks on the TRANSFER button 485, and the receipt is transferred to the new holder. The transfer of holders is updated in the home server 50 of the control system 30.

Figure 31A:
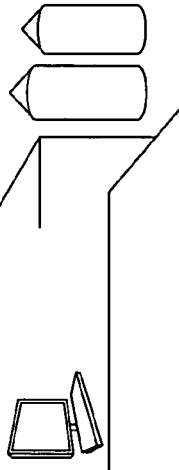
Figure 31B:
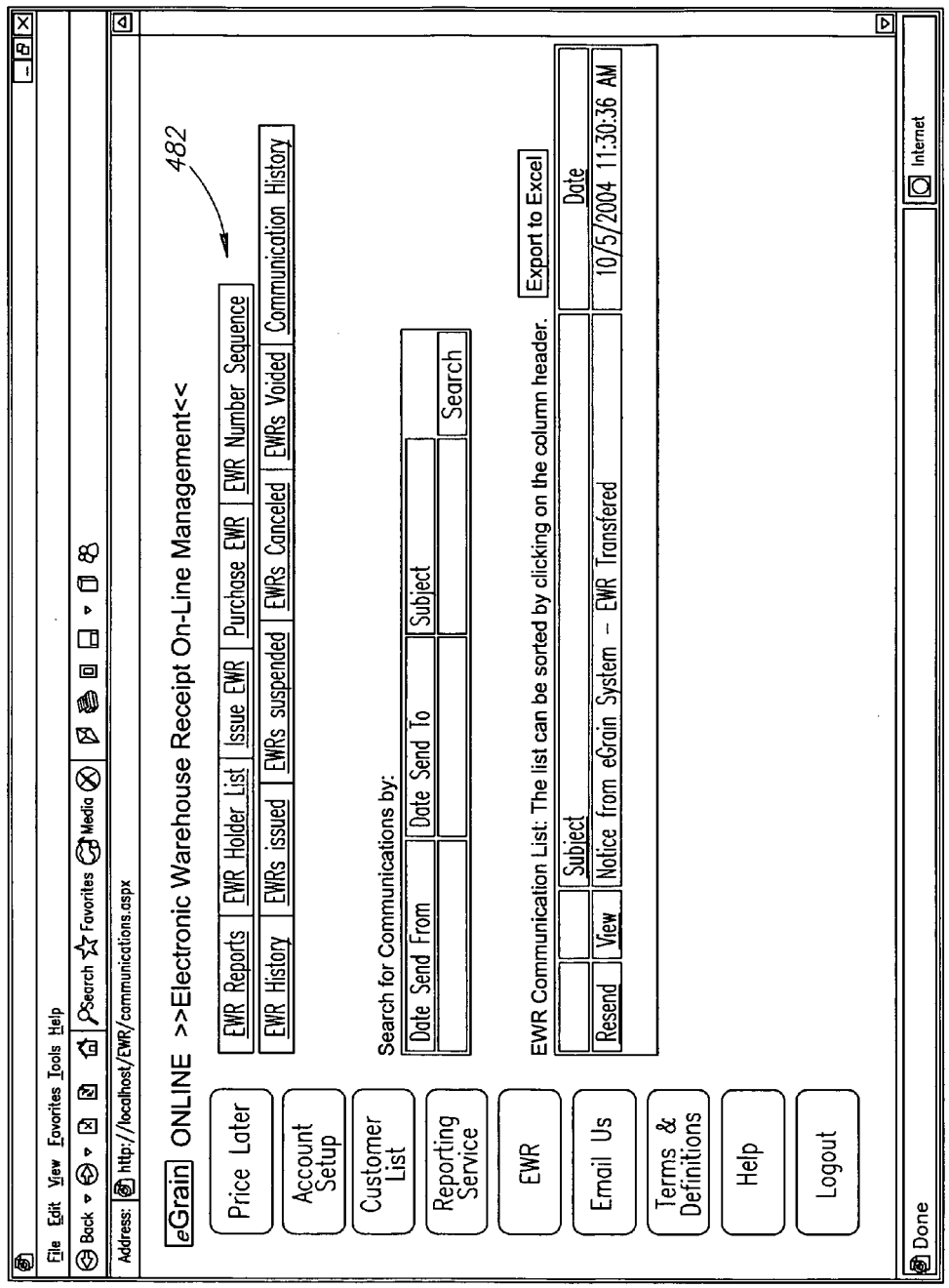

With the transfer of the holder of the EWR complete, and approved in accordance with the rules and policies programmed into the by the home server 50 of the control system 30, the new holder receives a communication from the control system 30, that an EWR has been transferred to them, in accordance with the exemplary e-mail of FIG. 31A. This e-mail communication typically forms a portion of the EWR holder transfer of blocks 418 and 424 of FIG. 25, and block 462 of FIG. 26. The user can view a list of all e-mail communications sent to him, indicating the transfer of EWR's by clicking on the link for COMMUNICATION HISTORY 482*k*, and a list of communications, typically e-mails is accessible to them, for example, as shown in the screen shot of FIG. 31B.

Should a suspension of the EWR be desired, as per block 412 of FIG. 25, the warehouse clicks on the link for EWR HOLDER LIST 482*b*, and obtains a list of EWRs that they hold, like the list, for example, of FIG. 29 (as discussed above for transferring EWRs).

Figure 32:
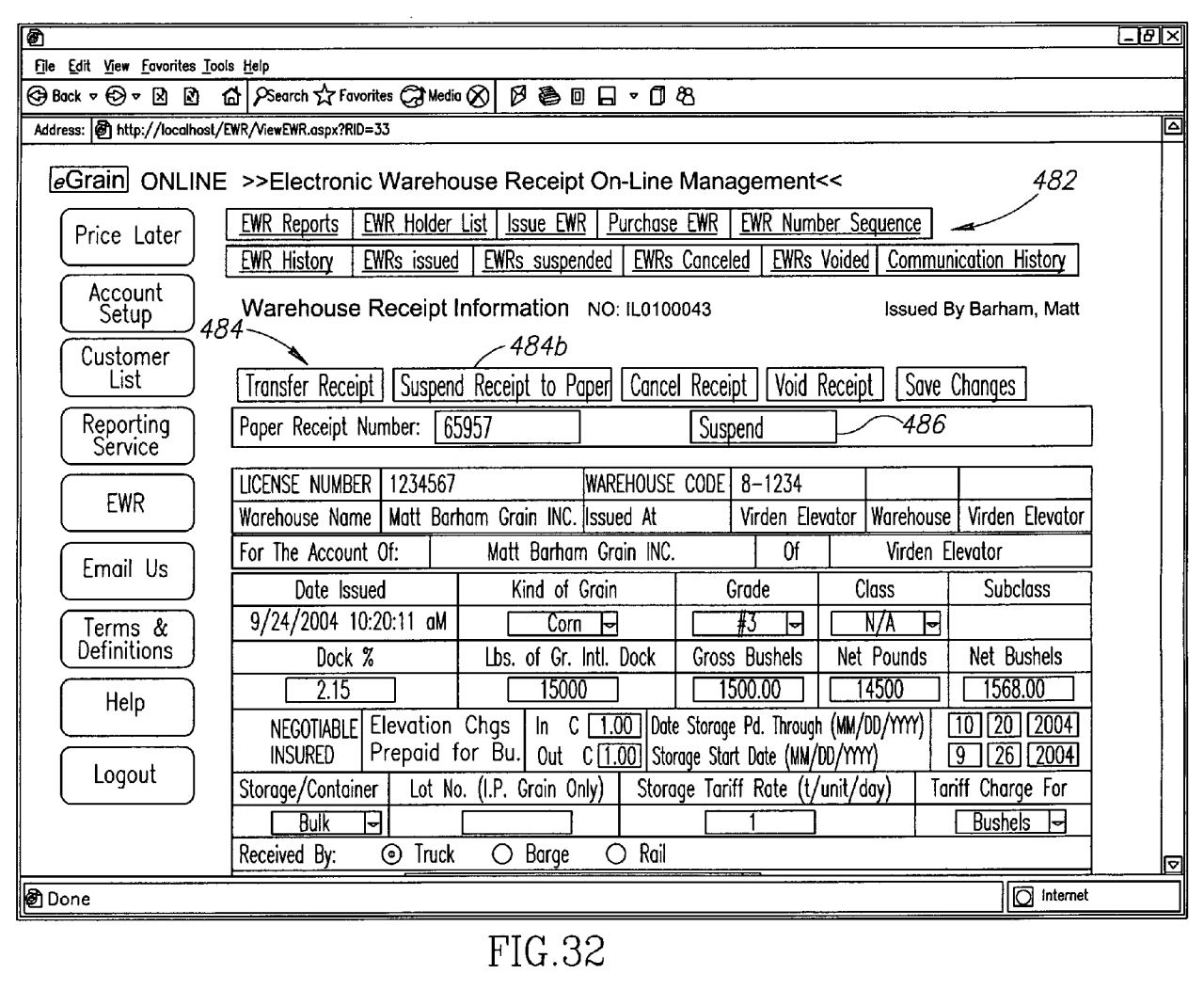

The user receives a screen display or screen shot similar to that of FIG. 32, and clicks the button for SUSPEND RECEIPT TO PAPER 484*b*. This click activates the underlying link, and the screen display or screen shot of FIG. 32, appears, for example. Suspension of the EWR typically involves transferring it to the traditional paper receipt. With a template now appearing in the screen display or screen shot, the user enters the number of the EWR and the number of the paper receipt that issued in its place, as well as any other information necessary to facilitate the suspension, in the requisite boxes of the template. When finished, the user clicks on the SUSPEND button 486, and the EWR is suspended, in lieu of the paper warehouse receipt.

The control system 30, typically at the home server 50, keeps track of both the cancelled EWR number and the paper receipt number, so that users may refer to the same receipt by either the EWR number or the number of the paper receipt. This enables the user to have a complete history of an EWR throughout the entire life cycle of the receipt, regardless of the form of the warehouse receipt.

Should a cancellation of the EWR be desired, as per block 414 of FIG. 25 and block 480 of FIG. 26, the warehouse clicks on the link for EWR HOLDER LIST 482*b*, and obtains a list of EWRs that they hold, like the list, for example, of FIG. 29 (as discussed above for transferring EWRs).

Figure 33:
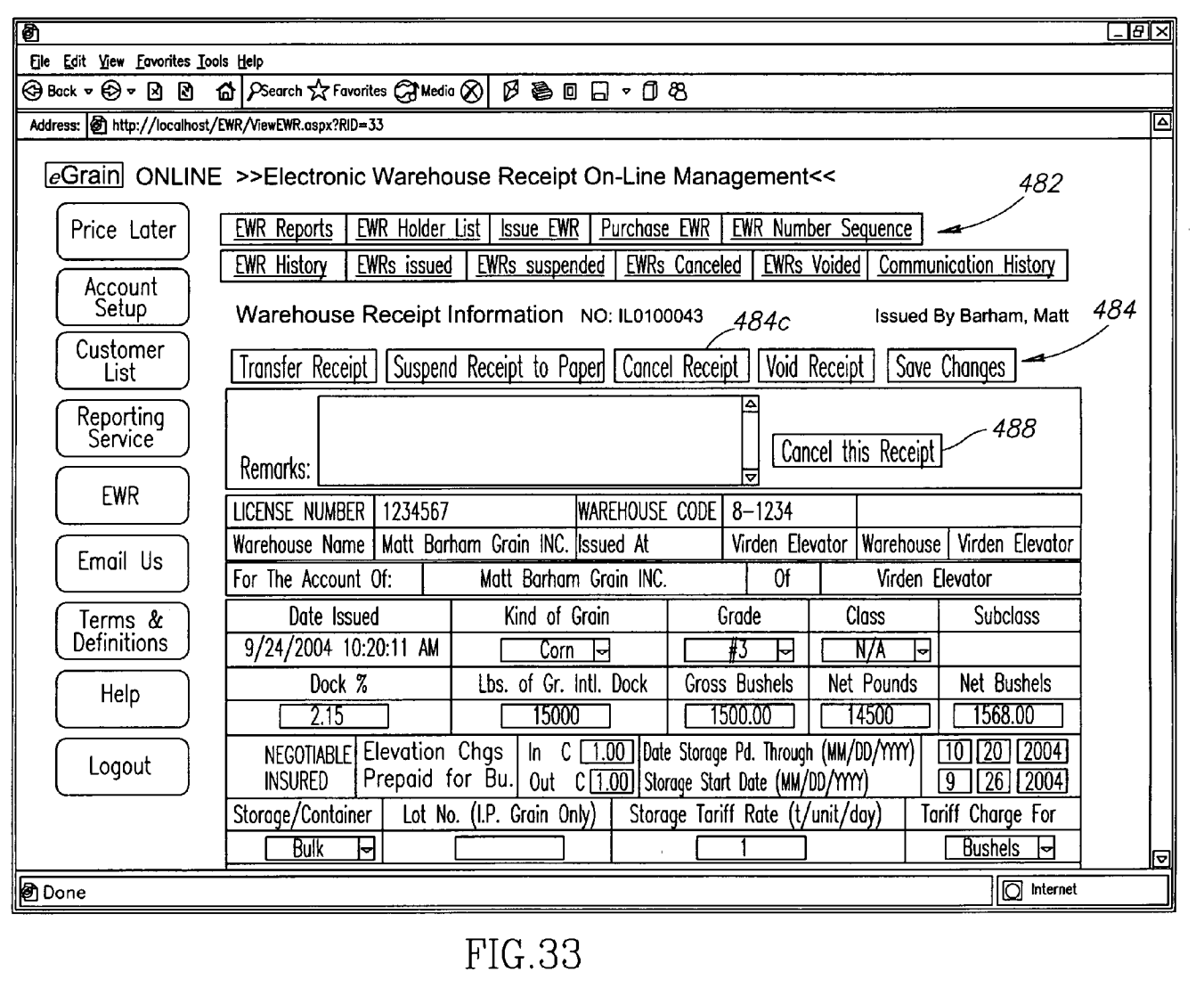

The user receives a screen display or screen shot shot similar to that of FIG. 33, and clicks the button for CANCEL RECEIPT 484*c*. This click activates the underlying link, and the screen display or screen shot of FIG. 33, that includes a template, appears, for example. The user (warehouse or other authorized entity) enters any necessary information into the requisite boxes of the template. When finished, the user clicks on the CANCEL THIS RECEIPT button 488, and the EWR is cancelled.

The control system 30, typically at the home server 50, changes the status of the EWR from OPEN to CANCELLED. The entry is timestamped and the logged in warehouse or other canceling entity, that created the cancellation entry, is identified.

Should a voidance of the EWR be desired, the warehouse clicks on the link for EWR HOLDER LIST 482*b*, and obtains a list of EWRs that they hold, like the list, for example, of FIG. 29 (as discussed above for transferring EWRs).

Figure 34:
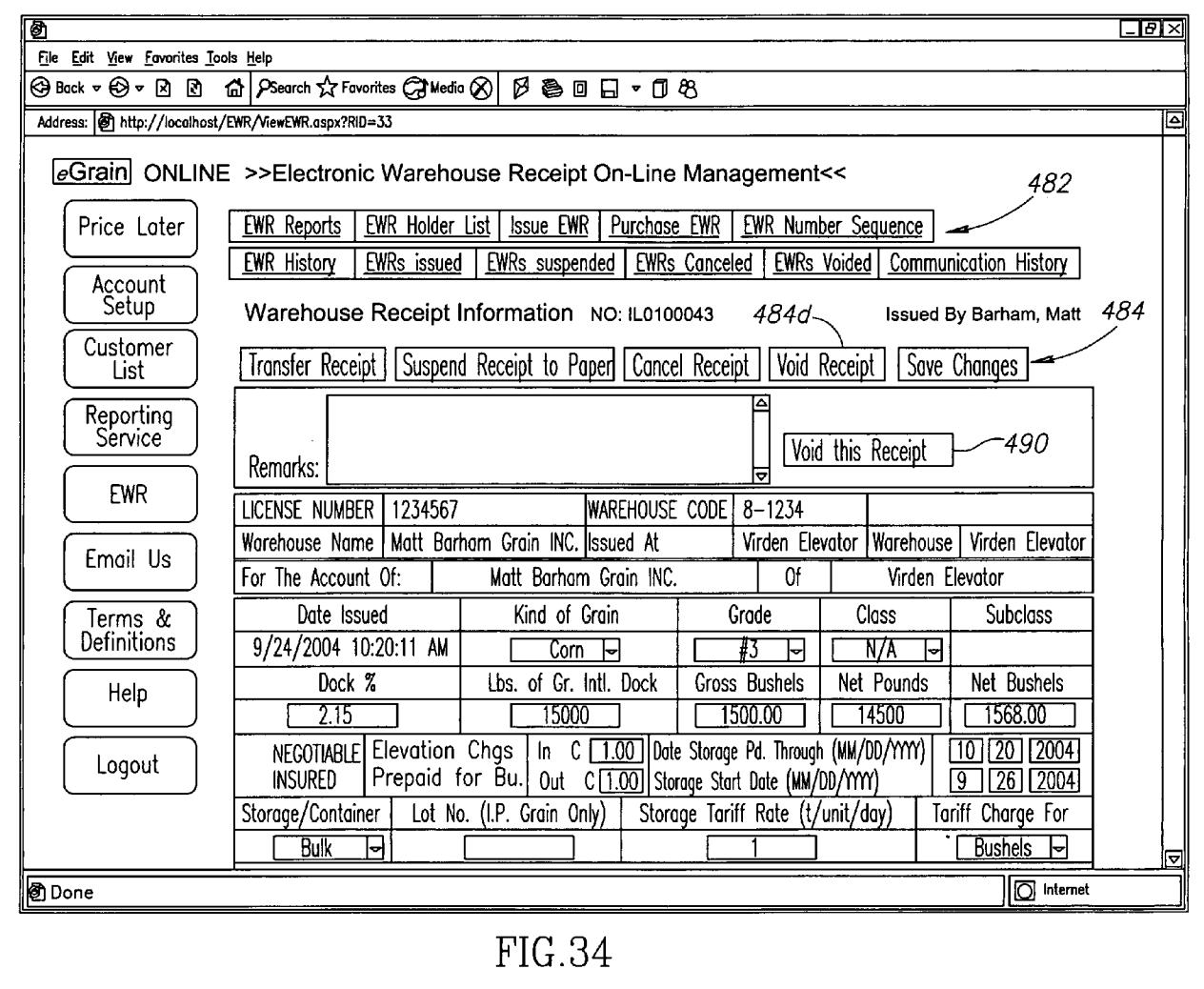

The user receives a screen display or screen shot shot similar to that of FIG. 34, and clicks the button for VOID RECEIPT 484d. This click activates the underlying link, and the screen display or screen shot of FIG. 34, that includes a template, appears, for example. The user (warehouse or other authorized entity) enters any necessary information into the requisite boxes of the template. When finished, the user clicks on the VOID THIS RECEIPT button 490, and the EWR is voided.

The control system 30, typically at the home server 50, changes the status of the EWR from OPEN to VOID. The entry is time stamped and the logged in warehouse or other voiding entity, that created the void entry, is identified.

Reports

Figure 35:
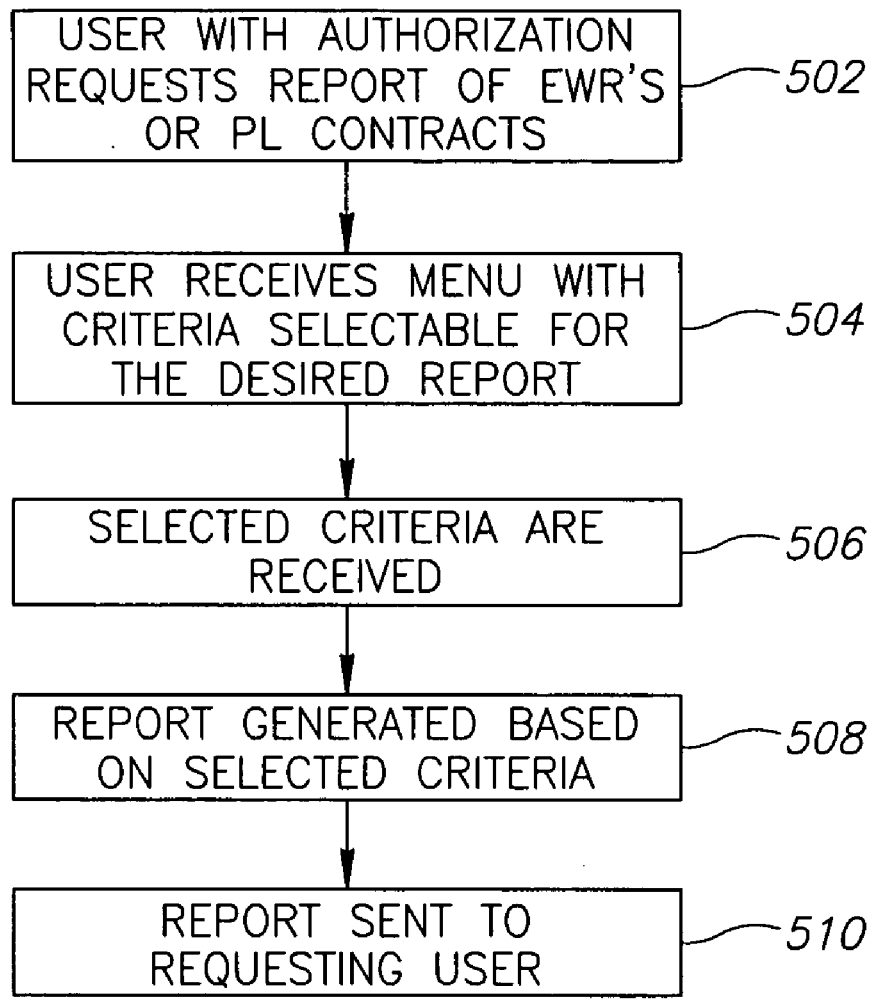
FIG. 35 is a flow diagram for Account Management Reports in accordance with an embodiment of the invention.
Figure 36:
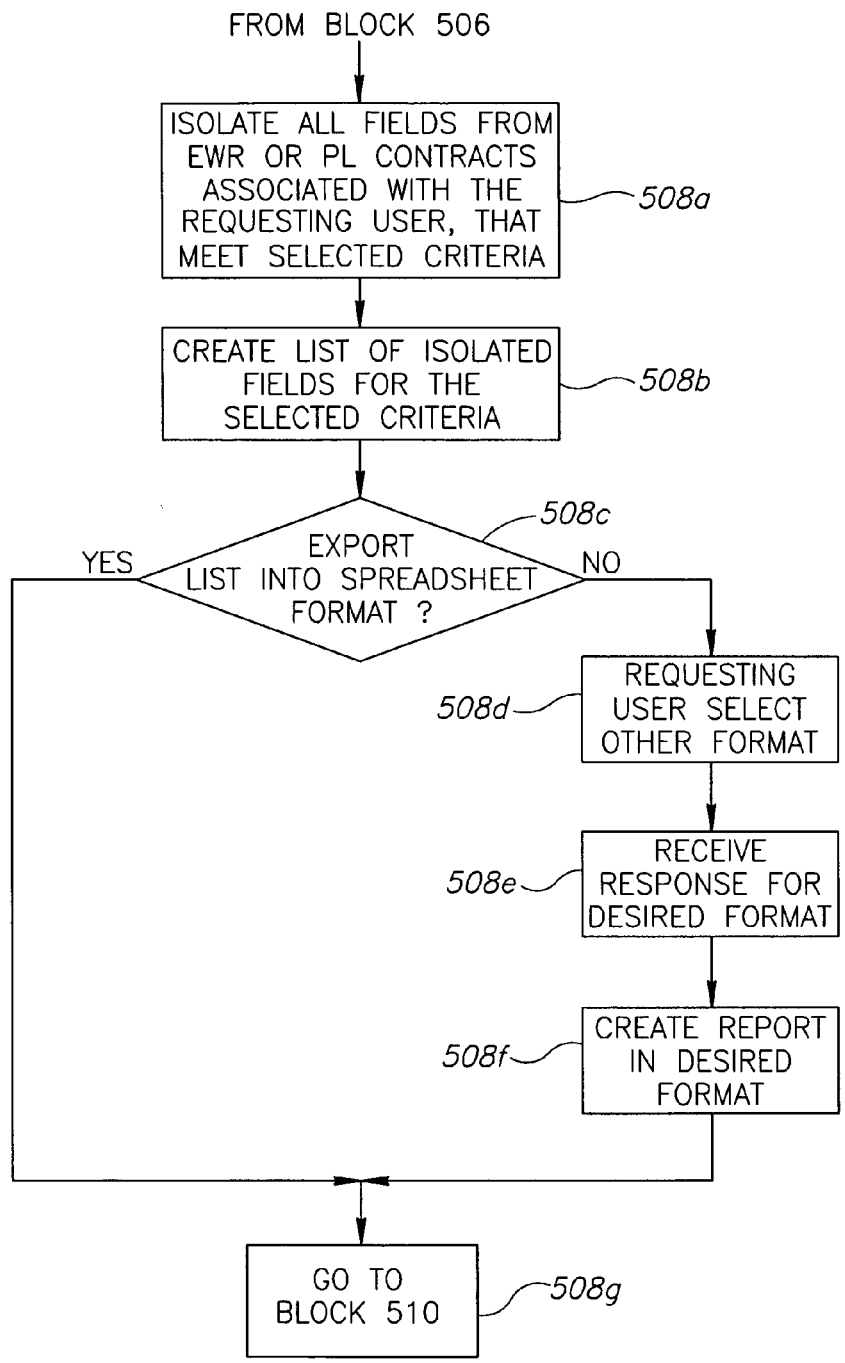
FIG. 36 is a detailed flow diagram for the generation of reports (block 508) of FIG. 35.
Figure 37:
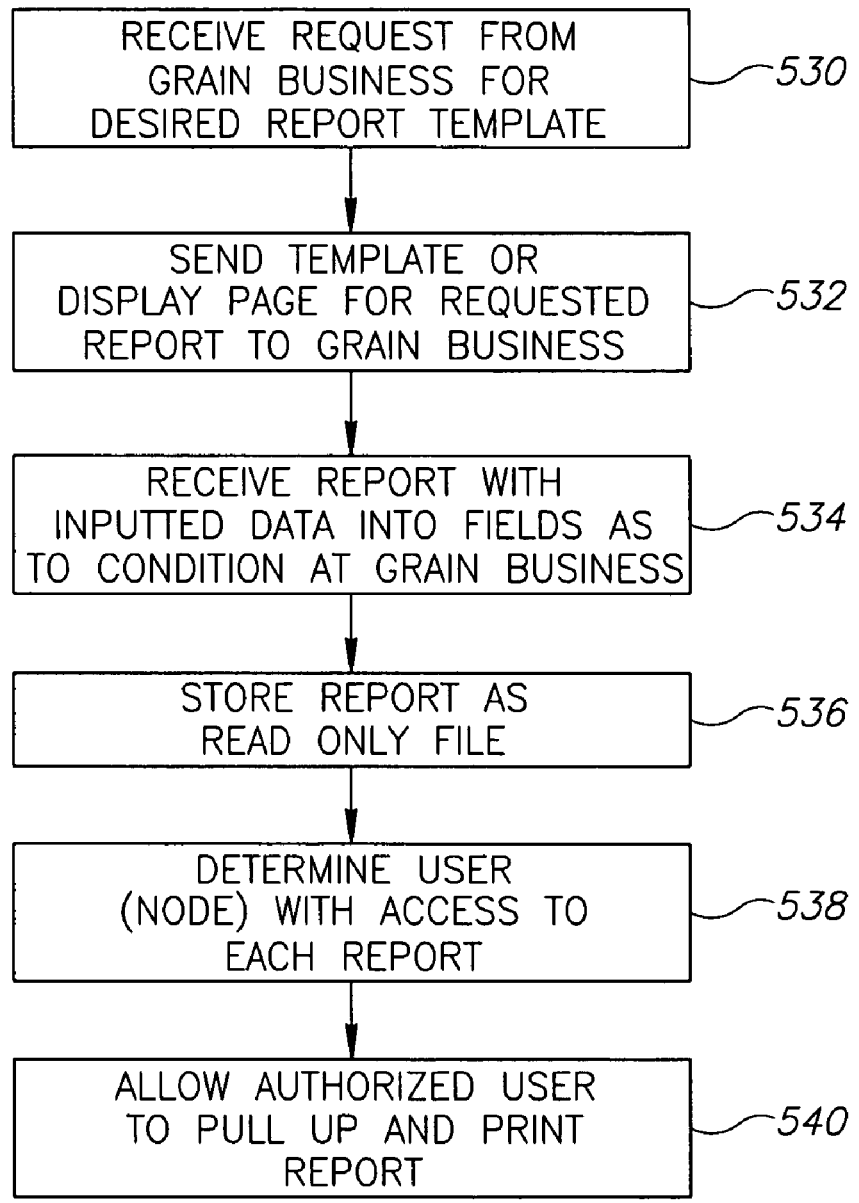
FIG. 37 is a flow diagram for Reporting Service Reports in accordance with an embodiment of the invention.

Flow diagrams detailing the generation of reports are shown in FIGS. 35-37. In these flow diagrams, actions are described between users and their associated nodes and the control system (and its components). This is for description purposes only, as the actual actions in the flow diagram and described below typically occur in the control system 30.

a. Account Management Reports

Turning to FIGS. 35 and 36, there are detailed flow diagrams of an exemplary process associated with the issuance and processing of user generated or user account management reports. These reports are typically used by various users, as represented, for example, by the nodes 32-38 of the system 20 of FIG. 1, to typically view current and past status of Electronic Warehouse Receipts (EWRs) and Price Later (PL) Contracts, including historical data as to EWRs and Price Later Contracts in some cases.

In FIG. 35, the user, represented, for example, by any of the nodes 32-38, who has authorization to access the EWR or Price Later Contract, or historical data associated therewith, requests a report of Electronic Warehouse Receipts (EWRs) or Price Later (PL) Contracts, from the control system 30 (FIG. 1) at block 502. The requesting user (at their respective node 32-28 of FIG. 1) then receives an on screen menu, with criteria selectable in order to produce the desired report with the desired information, at block 504. The control system 30 (FIG. 1), typically at the home server 50 (and its backup server 50a) receives the selected criteria, at block 506, and generates a report, at block 508. The generation of the requested report is shown in detail in FIG. 28, in blocks 508a-508f. The report is then sent to the requesting user, at their node 32-38 (FIG. 1), at block 510.

Turning to FIG. 36, the report is generated as data corresponding to the selected (user requested) criteria, is isolated in the requisite fields, for example from the database files corresponding to Price Later Contracts 64, Electronic Warehouse Receipts 65 and Electronic Warehouse Receipt History 66 (FIG. 2), from the database 54, and the corresponding fields of FIGS. 7A-7E and 8A-8E, at block 508a. A list of the isolated fields for the selected criteria, is created, typically in the home server 50 (and its backup server 50a), at block 508b.

It is then determined, at block 508c, whether or not to export the list, created in block 508b, into spreadsheet format, for distribution to the requesting user. If the requesting user has indicated the desire to receive the report in spreadsheet format, the process moves to block 508g. If the requesting user seeks to receive the report in another format, the process moves to block 508d, where another format is selected. The home server 50 (and its backup server 50a) receive a response from the user (who requested the report), for the report in the desired format, at block 508e. The report is created in the desired (requested) format, at block 508f, and the process moves to block 508g. The process then moves to block 510, as shown in FIG. 35.

b. Reporting Service Reports

Turning to FIG. 37, there is a detailed flow diagram of an exemplary process associated with the issuance and processing of reports for reporting services. These reports are produced by grain businesses, represented, for example, by node 33 of FIG. 1. In particular, the grain businesses who produce these reports are, for example, warehouses or other grain storage facilities, grain dealers, including grain buyers and sellers. As stated above, the warehouse or storage facility may also be a grain dealer.

Initially, at block 530, the control system 30, and in particular, the home server 50 (and its backup server 50a) receive a request from a user, typically a grain business, as represented, for example, by node 33 of FIG. 1, for a template for one of four status reports, at block 530. These reports are typically daily reports, but could be completed at any time interval desired. These templates are templates to be filled in by the user, for reports including: 1) Daily Position Report; 2) Long/Short Market Position Report; 3) Working Capital Report; and, 4) Grain Assets VS. Gain Liabilities Report. The templates include spaces for data that fill fields, the fields being in the respective files 67a-67d of the database 54 of FIG. 2 and the corresponding Tables of FIGS. 9, 10, 11A-11C, and 12.

The template for the requested report, is then sent over the Internet 54, from the control system 30, typically the home server 50, to the grain business, at block 532. The report, as per the received template, is typically completed on screen while the warehouser is on-line, but could also be completed off-line.

The completed report, with data inputted by the grain business into its various fields, indicating the conditions of the grain business at or proximate to the time the report was completed, is then sent to, and received by the home server 50 (and its backup server 50a), at block 534. The home server 50 (and its backup server 50a) and/or its associated storage media 52, stores the received report as a read only file, at block 536. Based on rules and policies programmed into the home server 50 (and its backup server 50a), the users (represented by nodes 32-38) with access to each report, are determined at block 538. Authorized users are then allowed to access to the requisite reports and for purposes of viewing and printing, at block 540.

The subprocesses of blocks 534, 536, 538 and 540 are optional, and not required. This is because the grain business or user, may elect to keep the report in its own storage. The grain business may then transfer, typically electronically, over the Internet 25, to the entity seeking to view the report, for example, Federal and State Authorities, represented, for example, by the node 34 of FIG. 1. However, for safety and redundancy, the grain business or user may wish to submit the completed report to the home server 50 (and its backup server 50a), and/or its associated storage media 52, as per blocks 534, 536, 538 and 540, in order to use the control system 30 as a central filing system for these reports.

Account management reports are created on screen for Price Later contracts and EWRs by clicking button 122', for Price Later Contracts, and button 124' for EWRs in order to be directed to the main menu screens for Price Later Contracts (FIG. 17) and EWRs (FIG. 27).

Figure 38:
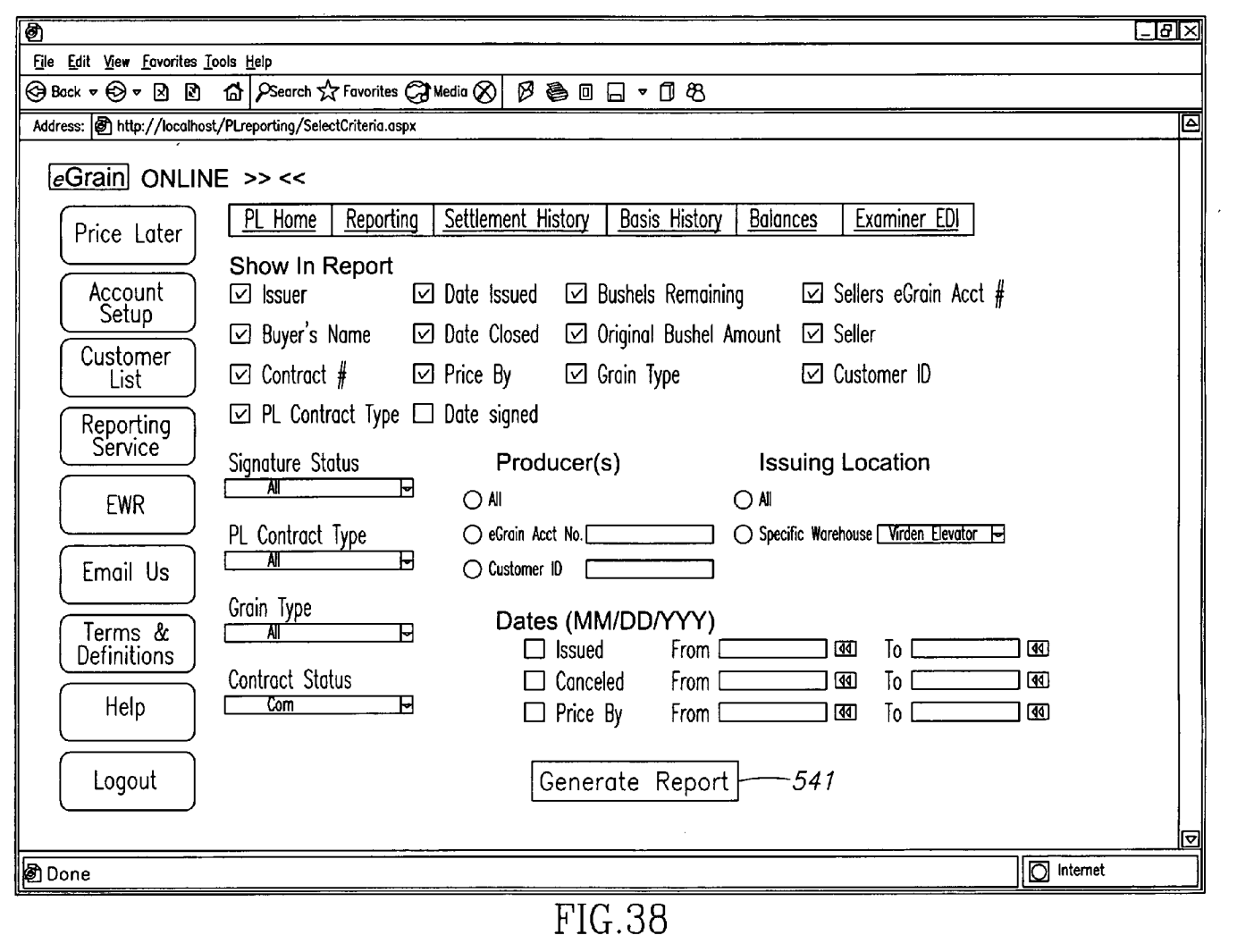

For Price Later Contracts, in FIG. 17, the link PL REPORTS 342a of the bar 342 is clicked, and the template of FIG. 38 appears. The user then clicks the desired boxes for the criteria desired, in the Report to be generated. Once the user is satisfied, the GENERATE REPORT button 541 is clicked, and the desired report is produced.

For Electronic Warehouse Receipts (EWRs), in FIG. 27, the link EWR REPORTS 482a of the bar 482 is clicked, and the template of FIG. 39 appears. The user then clicks the desired boxes for the criteria desired, in the Report to be generated. Once the user is satisfied, the GENERATE REPORT button 542 is clicked, and the desired report is produced.

Figure 40:
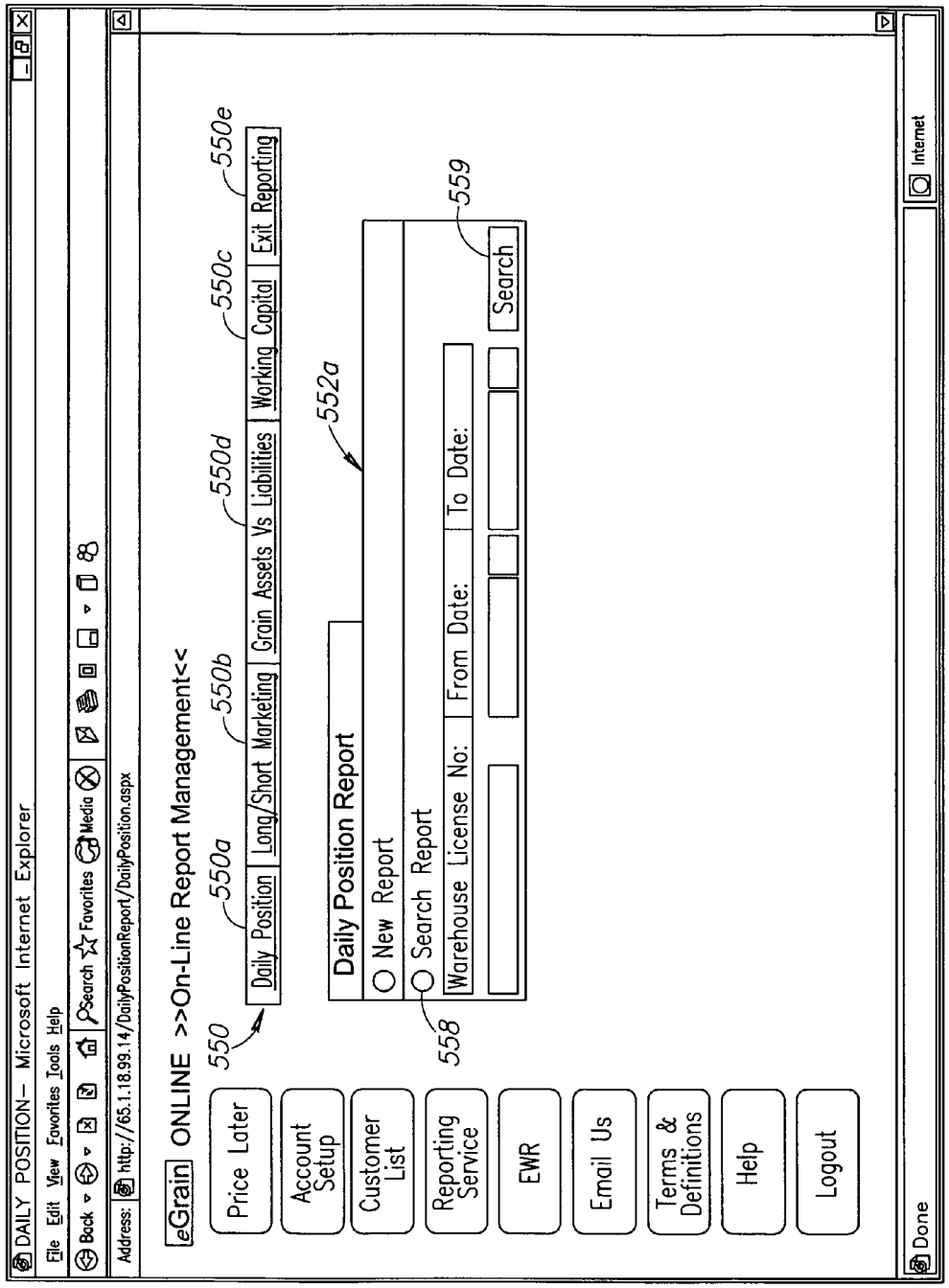
FIG. 40 is a screen display or screen shot of an introductory menu for generating Reporting Service reports in accordance with an embodiment of the invention.
Figures 41A, 41B:
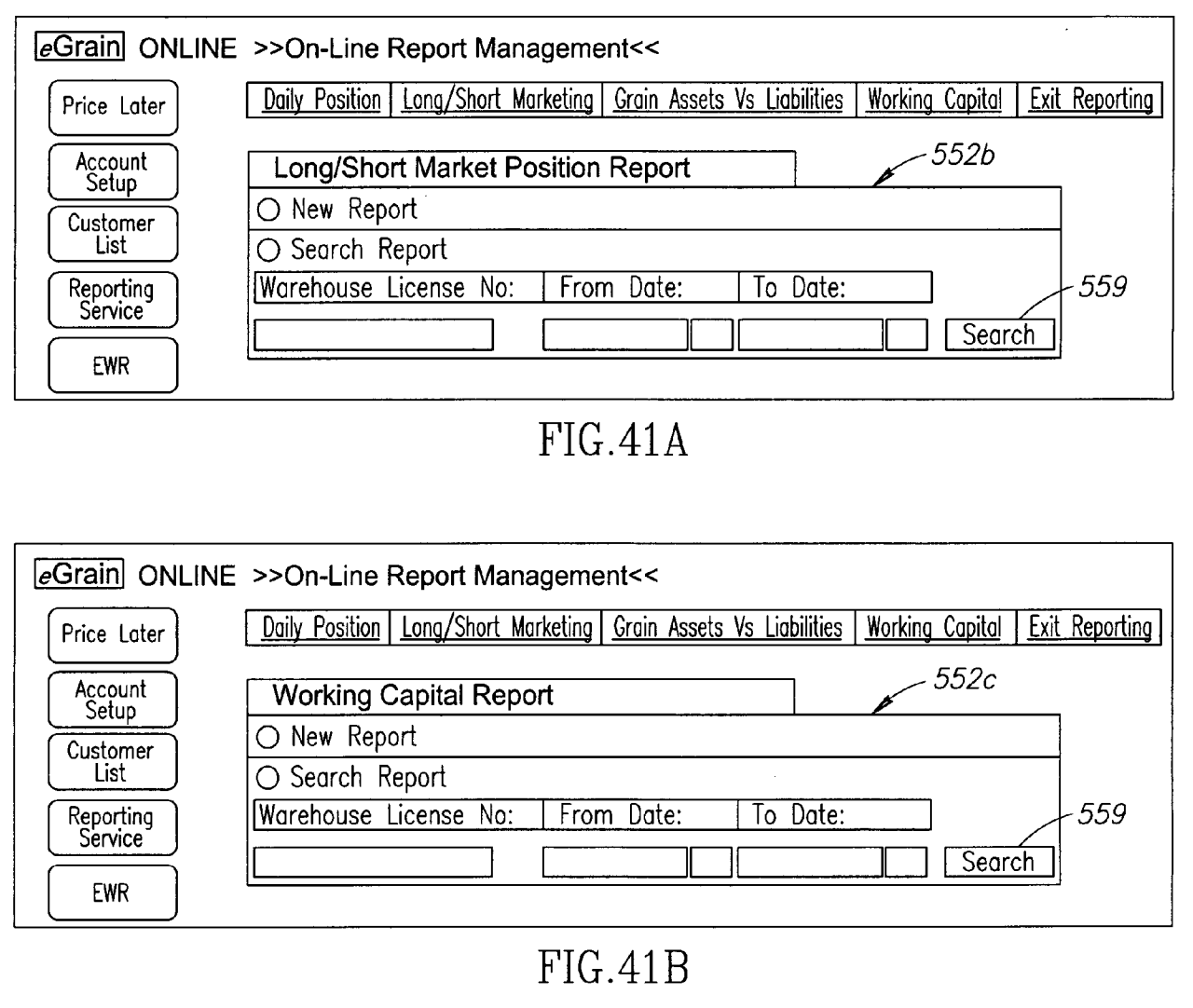
Figure 41C:
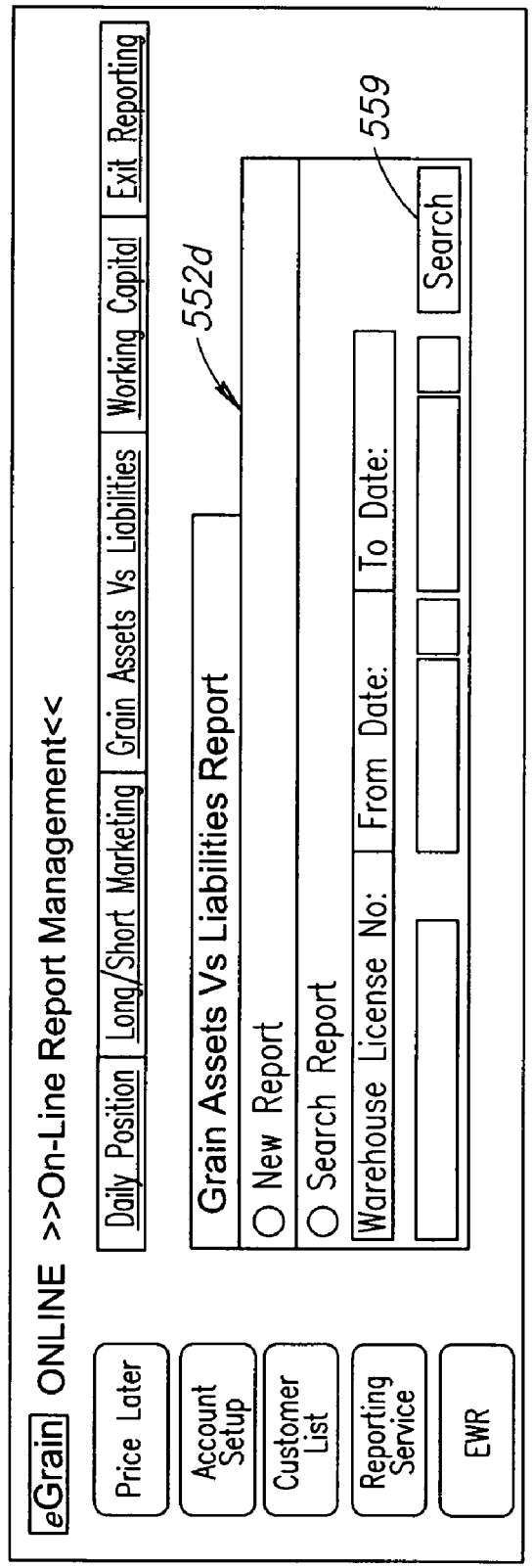

FIGS. 40-44 show screen displays or screen shots of Reporting Services Reports in accordance with process of FIG. 37 detailed above. In FIG. 40, the user, for example, a warehouse or other grain business user has requested the Reporting Service, by clicking on button 121' of the Main Menu screen of FIG. 14. This click results in the user being brought to the template of FIG. 40.

The template of FIG. 40 includes a horizontal bar 550, with links for creating the Daily Position Report 550a, Long/Short Marketing Report 550b, Working Capital Report 550c, and Grain Assets vs. Grain Liabilities Report 550d. There is also a link 550e to exit this reporting. From this bar 550, the desired report to be made, may be selected, by clicking on the requisite link.

Continuing in FIG. 40, the user has selected the link for the Daily Position Report 550a (shown by the arrow 551 of FIG. 42). Accordingly, a template 552a, to be completed for the Daily Position Report, appears on screen. This Daily Position Report template 552a, may be the default template, that appears when the REPORTING SERVICE button 121' of the Main Menu screen of FIG. 14 is clicked.

Other templates for Long/Short Market Position Report 552b, Working Capital Report 552c, and Grain Assets Vs. Grain Liabilities Report 552d, that appear in FIGS. 41A-41C, respectively, would appear in the position of the template 552a, when their corresponding links 550b, 550c and 550d, on the bar 550 in the screen of FIG. 40 are clicked.

In all of the templates 552a-552d for the reports, by clicking on "NEW REPORT", the user can create a new report that can be saved by the user, and stored in the home server 50 and/or the storage media 52 associated therewith, of the control system 30, typically as a read only file, with access to this report provided to the users at the nodes 32-38, in accordance with rules and policies programmed into the home server 50. If "SEARCH REPORT" is clicked, the user can search for existing reports stored in the home server 50.

Turning to FIG. 42, in the Daily Position Report, the user enters all data into the template 552a, and can submit this report, such that it becomes a read only file by clicking on the SUBMIT button 556 of the screen display (as per block 534).

An authorized user may search a report by accessing the screen of FIG. 43 (and also of FIG. 40), and clicking the SEARCH REPORT circle 558. The user then enters search criteria in the areas provided on the template 552a, and clicks on the SEARCH BUTTON 559. The user will receive a list 560 of the reports meeting the search criteria, as shown in FIG. 43.

Should VIEW button 562 be clicked, the corresponding Daily Position Report, is made viewable as a read only file to those users who are allowed access to these reports, as per block 540. An exemplary Daily Position Report 564, viewable on-screen as a read only file appears as the screen display of FIG. 44. This report can be printed by clicking the PRINT button 566, and closed by clicking on the CLOSE button 568. Once the report (the screen with the report) is closed, the system returns the user to the previous screen, here, for example, the list of FIG. 43.

While the system 20 above has been shown for use in the United States of America, in accordance with current U.S. Department of Agriculture Rules and Regulations, this is exemplary only. The system 20 can easily be modified for other national and regional systems, for example, Canada, Mexico, and the European Union, and their agricultural administration bodies.

While preferred embodiments of the present invention have been described, so as to enable one of skill in the art to practice the present invention, the preceding description is intended to be exemplary only.

The above described methods (processes) including portions thereof can be performed by software, hardware or combinations thereof. These processes and portions thereof can be performed by computing and other computer-type devices, such as computers, workstations, processors, microprocessors, and/or other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

What is claimed is:

1. A method for conducting electronic transactions of warehouse receipts comprising:

receiving at a processor an input from an issuer requesting access to one or more blank templates, wherein at least one of the one or more blank templates corresponds to at least one electronic warehouse receipt for at least one commodity;

identifying an entity type for the issuer based on registration data associated with the input;

retrieving a particular template for the at least one electronic warehouse receipt from a storage media;

generating at the processor the particular template for display to the issuer based on the entity type identified, wherein the issuer is associated with at least one node along a network;

receiving another input from the issuer to complete the particular template, the other input identifying an amount of a particular commodity;

creating the at least one electronic warehouse receipt for the particular commodity in response to the other input;

issuing the at least one electronic warehouse receipt corresponding to the entity type identified and the amount of the particular commodity, the at least one electronic warehouse receipt serving as evidence of a title to the amount of the particular commodity;

permitting the transfer of the at least one electronic warehouse receipt from one holder of the at least one electronic warehouse receipt to another holder of the at least one electronic warehouse receipt, the holders of the at least one electronic warehouse receipt associated with at least one node along the network;

maintaining the at least one electronic warehouse receipt in the storage media in electronic communication with the network, wherein maintaining the at least one electronic warehouse receipt includes updating the at least one electronic warehouse receipt to reflect the present holder of the at least one electronic warehouse receipt; and providing access to the at least one electronic warehouse receipt to multiple users that are associated with the at least one node along the network by placing the at least one node into electronic communication with the storage media over the network, each of the multiple users provided access to the at least one electronic warehouse receipt in accordance with their relationship to the at least one electronic warehouse receipt.

2. The method of claim 1, wherein the network includes a wide area public network.

3. The method of claim 1, wherein the network includes the Internet.

4. The method of claim 1, wherein providing access to the at least one electronic warehouse receipt includes, providing the present holder with permission to view the at least one electronic warehouse receipt and take action on the at least one electronic warehouse receipt.

5. The method of claim 1, wherein providing access to the at least one electronic warehouse receipt includes, providing a former holder of the at least one electronic warehouse receipt with permission to view at least a portion of the at least one electronic warehouse receipt.

6. The method of claim 1, wherein providing access to the at least one electronic warehouse receipt includes, providing a lender who has collateral in the at least one electronic warehouse receipt, and is associated with at least one node along the network with at least permission to view the at least one electronic warehouse receipt.

7. The method of claim 1, wherein providing access to the at least one electronic warehouse receipt includes, providing a government regulatory entity, associated with at least one node along the network, at least permission to view the at least one electronic warehouse receipt.

8. The method of claim 1, wherein the at least one commodity includes grain.

9. A system for conducting electronic transactions of warehouse receipts over a network comprising:

a first processing component to:
  receive an input from an issuer requesting access to one or more blank templates, wherein at least one of the one or more blank templates corresponds to at least one electronic warehouse receipt for at least one commodity;
  identify an entity type for the issuer based on registration data associated with the input;
  retrieve a particular template for the at least one electronic warehouse receipt from a storage media;
  generate the particular template for display to the issuer based on the entity type identified, wherein the issuer is associated with at least one node along a network
  receive another input from the issuer to complete the particular template, the other input identifying an amount of a particular commodity;—
  create the at least one electronic warehouse receipt for the particular commodity in response to the other input; and
  issue the at least one electronic warehouse receipt corresponding to the entity type identified and the amount of the particular, the at least one electronic warehouse receipt serving as evidence of a title to the amount of the particular commodity;

a second processing component to:
  permit the transfer of the at least one electronic warehouse receipt from one holder of the electronic warehouse receipt to another holder of the electronic warehouse receipt, the holders of the at least one electronic warehouse receipt associated with at least one node along the network;
  maintain the at least one electronic warehouse receipt in the storage media, wherein the at least one electronic warehouse receipt maintained in the storage media is updated to reflect the present holder of the at least one electronic warehouse receipt, the storage media in electronic communication with the network; and, a third processing component to provide access to the at least one electronic warehouse receipt to multiple users that are associated with the at least one node along the network, the third processing component further configured for placing the at least one node into electronic communication with the storage media over the network, each of the multiple users being provided access to the at least one electronic warehouse receipt in accordance with their relationship to the at least one electronic warehouse receipt.

10. The system of claim 9, wherein the network includes the Internet.

11. The system of claim 9, additionally comprising:
a fourth component in communication with the storage media, the fourth component configured for updating the at least one electronic warehouse receipt to reflect the present holder of the at least one electronic warehouse receipt.

12. The system of claim 11, wherein at least the first component, the second component, the third component and the fourth component are located on a server.

* * * * *

UNITED STATES PATENT AND TRADEMARK OFFICE
CERTIFICATE OF CORRECTION

| | | |
|---|---|---|
| PATENT NO. | : 7,827,078 B2 | Page 1 of 1 |
| APPLICATION NO. | : 11/138232 | |
| DATED | : November 2, 2010 | |
| INVENTOR(S) | : N. Richard King et al. | |

It is certified that error appears in the above-identified patent and that said Letters Patent is hereby corrected as shown below:

Claim 9, line 5: "network" should read --network;--

Claim 9, line 8: "commodity;-" should read --commodity;--

Claim 9, line 14: "the particular, the" should read --the particular commodity, the--

Signed and Sealed this
Twenty-seventh Day of December, 2011

David J. Kappos
*Director of the United States Patent and Trademark Office*

UNITED STATES PATENT AND TRADEMARK OFFICE
CERTIFICATE OF CORRECTION

PATENT NO.        : 7,827,078 B2                                   Page 1 of 1
APPLICATION NO.   : 11/138232
DATED             : November 2, 2010
INVENTOR(S)       : N. Richard King et al.

It is certified that error appears in the above-identified patent and that said Letters Patent is hereby corrected as shown below:

Column 33, line 48 (Claim 9, line 5) "network" should read --network;--

Column 33, line 51 (Claim 9, line 8) "commodity;-" should read --commodity;--

Column 34, line 14 (Claim 9, line 24) "the particular, the" should read --the particular commodity, the--

This certificate supersedes the Certificate of Correction issued December 27, 2011.

Signed and Sealed this
Thirty-first Day of January, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,827,078 B2 | Page 1 of 1 |
| APPLICATION NO. | : 11/138232 | |
| DATED | : November 2, 2010 | |
| INVENTOR(S) | : N. Richard King et al. | |

It is certified that error appears in the above-identified patent and that said Letters Patent is hereby corrected as shown below:

Column 34, line 5 (claim 9, line 15): "network" should read --network;--

Column 34, line 8 (claim 9, line 18): "commodity;-" should read --commodity;--

Column 34, line 14 (claim 9, line 24): "the particular, the" should read --the particular commodity, the--

This certificate supersedes the Certificates of Correction issued December 27, 2011 and January 31, 2012.

Signed and Sealed this
Twenty-first Day of February, 2012

David J. Kappos
*Director of the United States Patent and Trademark Office*